US010038491B2

(12) United States Patent
Fang

(10) Patent No.: US 10,038,491 B2
(45) Date of Patent: Jul. 31, 2018

(54) PROXY MOBILE INTERNET PROTOCOL (PMIP) TUNNEL SELECTION BY A WIRELESS RELAY IN A DATA COMMUNICATION NETWORK

(71) Applicant: Sprint Communications Company L.P., Overland Park, KS (US)

(72) Inventor: Zheng Fang, McLean, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 154 days.

(21) Appl. No.: 15/067,844

(22) Filed: Mar. 11, 2016

(65) Prior Publication Data

US 2017/0265119 A1 Sep. 14, 2017

(51) Int. Cl.
*H04W 40/00* (2009.01)
*H04B 7/155* (2006.01)
(Continued)

(52) U.S. Cl.
CPC ..... *H04B 7/15528* (2013.01); *H04L 12/4633* (2013.01); *H04W 8/26* (2013.01);
(Continued)

(58) Field of Classification Search
None
See application file for complete search history.

(56) References Cited

U.S. PATENT DOCUMENTS 7,385,973 B1 6/2008 Johnson et al.
8,150,397 B2 4/2012 Khetawat et al.
(Continued)

FOREIGN PATENT DOCUMENTS

EP 2485564 8/2012
EP 2645780 10/2013
(Continued)

OTHER PUBLICATIONS

Fumio Teraoka, et al.; "PNEMO: a Network-Based Localized Mobility Management Protocol for Mobile Networks;" IEEE; Jun. 15, 2011; pp. 168-173; IEEE.
(Continued)

*Primary Examiner* — Edan Orgad
*Assistant Examiner* — Sithu Ko

(57) ABSTRACT

A wireless relay serves User Equipment (UE) over Proxy Mobile Internet Protocol (PMIP) tunnels. The wireless relay receives a wireless network address from a wireless network and a wireline network address from a wireline network. The wireless relay receives a bearer request from a network controller that identifies a gateway network address. The wireless relay selects the wireless network address or the wireline network address responsive to the bearer request. In some examples, the wireless relay selects the network address based on a UE ID. The wireless relay generates and transfers a PMIP update that indicates the selected network address to the gateway network address. The wireless relay receives a PMIP response. The wireless relay exchanges user data over the wireless PMIP tunnel if the wireless network address was selected. The wireless relay exchanges the user data over the wireline PMIP tunnel if the wireline network address was selected.

18 Claims, 28 Drawing Sheets

(51) Int. Cl.

| | |
|---|---|
| ***H04L 12/46*** | (2006.01) |
| ***H04W 8/26*** | (2009.01) |
| ***H04W 76/12*** | (2018.01) |
| *H04W 80/04* | (2009.01) |
| *H04W 88/16* | (2009.01) |
| *H04W 84/04* | (2009.01) |

(52) U.S. Cl.

CPC ............ *H04W 76/12* (2018.02); *H04W 80/04* (2013.01); *H04W 84/045* (2013.01); *H04W 88/16* (2013.01)

(56) References Cited

U.S. PATENT DOCUMENTS

| | | | |
|---|---|---|---|
| 8,565,129 B1 | 10/2013 | Bertz et al. | |
| 8,699,461 B2 | 4/2014 | Qian et al. | |
| 8,699,462 B2 | 4/2014 | Spinelli et al. | |
| 8,724,648 B2 | 5/2014 | Zeng et al. | |
| 8,761,021 B2 | 6/2014 | Ray et al. | |
| 8,787,331 B2 | 7/2014 | Liu et al. | |
| 8,831,679 B2 | 9/2014 | Bajj et al. | |
| 8,965,331 B2 | 2/2015 | Ray et al. | |
| 9,065,533 B2 | 6/2015 | Teyeb et al. | |
| 9,084,150 B2 | 7/2015 | Kazmi et al. | |
| 9,094,814 B1 | 7/2015 | Kullman et al. | |
| 2003/0174713 A1 | 9/2003 | Linden | |
| 2008/0285492 A1 | 11/2008 | Vesterinen | |
| 2009/0109858 A1 | 4/2009 | Yamasaki et al. | |
| 2009/0161538 A1 | 6/2009 | McGuire | |
| 2010/0046418 A1 | 2/2010 | Horn et al. | |
| 2010/0322151 A1 | 12/2010 | Racz et al. | |
| 2011/0007706 A1 | 1/2011 | Shaikh | |
| 2011/0075675 A1* | 3/2011 | Koodli | H04L 12/14 370/401 |
| 2011/0103296 A1 | 5/2011 | Ji et al. | |
| 2011/0113250 A1 | 5/2011 | Li et al. | |
| 2011/0128908 A1 | 6/2011 | Lee et al. | |
| 2012/0044908 A1 | 2/2012 | Spinelli et al. | |
| 2012/0084840 A1 | 4/2012 | Higuchi et al. | |
| 2012/0120831 A1 | 5/2012 | Gonsa et al. | |
| 2012/0224536 A1* | 9/2012 | Hahn | H04L 45/00 370/328 |
| 2013/0010686 A1* | 1/2013 | Shatzkamer | H04W 40/00 370/328 |
| 2013/0028139 A1 | 1/2013 | Sanneck et al. | |
| 2013/0044608 A1 | 2/2013 | Qiang et al. | |
| 2013/0061034 A1 | 3/2013 | Walheim, Sr. | |
| 2013/0176934 A1 | 7/2013 | Malladi et al. | |
| 2013/0188481 A1* | 7/2013 | Maehara | H04W 28/14 370/230 |
| 2013/0189994 A1* | 7/2013 | Maehara | H04W 36/22 455/439 |
| 2013/0315134 A1 | 11/2013 | Halfmann et al. | |
| 2013/0324125 A1* | 12/2013 | Bachmann | H04W 36/0066 455/436 |
| 2013/0336202 A1 | 12/2013 | Oh et al. | |
| 2014/0098671 A1 | 4/2014 | Raleigh et al. | |
| 2014/0098741 A1 | 4/2014 | Joyce | |
| 2014/0106709 A1 | 4/2014 | Palamara et al. | |
| 2014/0162544 A1 | 6/2014 | Edge | |
| 2014/0195655 A1 | 7/2014 | Jha | |
| 2014/0204903 A1 | 7/2014 | Kim et al. | |
| 2014/0254471 A1 | 9/2014 | Fang et al. | |
| 2015/0010010 A1 | 1/2015 | Xie et al. | |
| 2015/0029947 A1* | 1/2015 | Gundavelli | H04W 88/16 370/329 |
| 2015/0049663 A1 | 2/2015 | Mukherjee et al. | |
| 2015/0078173 A1 | 3/2015 | Javed | |
| 2015/0092743 A1 | 4/2015 | Ji et al. | |
| 2015/0117197 A1 | 4/2015 | Radulescu et al. | |
| 2015/0140965 A1 | 5/2015 | Qiang et al. | |
| 2015/0155930 A1 | 6/2015 | Liu et al. | |
| 2015/0195858 A1 | 7/2015 | Jin et al. | |
| 2015/0365414 A1 | 12/2015 | Liang et al. | |
| 2016/0142321 A1 | 5/2016 | Gage | |
| 2016/0173262 A1 | 6/2016 | Davydov et al. | |
| 2016/0192403 A1 | 6/2016 | Gupta et al. | |
| 2016/0255021 A1 | 9/2016 | Renfrew | |
| 2017/0064579 A1 | 3/2017 | Park et al. | |
| 2017/0086165 A1 | 3/2017 | Tarradell et al. | |
| 2017/0163685 A1 | 6/2017 | Schwartz et al. | |
| 2017/0231020 A1* | 8/2017 | Tomici | H04W 76/021 |

FOREIGN PATENT DOCUMENTS

| | | |
|---|---|---|
| WO | 2011087407 | 7/2011 |
| WO | 2012092966 | 7/2012 |
| WO | 2015005900 | 1/2015 |
| WO | 2015126999 | 8/2015 |

OTHER PUBLICATIONS

Giuseppe Ruggeri, et al.; "802.11-Based Wireless-LAN and UMTS interworking: requirements, proposed solutions and open issues;" Computer Networks, Feb. 4, 2005; pp. 151-166; vol. 47, No. 2; Elsevier; Amsterdam, Netherlands.

Jamshid Khun-Jush; "Integration of WLAN and Wide Area Mobile Networks;" IEEE; Jan. 2002; pp. 1-19; vol. 802.11, No. 02/106; IEEE; Piscataway, New Jersey, U.S.A.

Samsung: "Introduction of Relay GW", 3GPP TSG RAN WG3 Meeting #65, R3-091681, 3rd Generation Partnership Project (3GPP), Shezhen, China Aug. 24-28, 2009, Agenda Item: 13.1.2.6; 3 pages.

"3rd Generation Partnership Project; Technical Specification Group Radio Access Network; Evolved Universal Terrestrial Radio Access (E-UTRA); Study on mobile relay (Release 12)", 3GPP draft; 36836-C00, 3rd Generation Partnership Project (3GPP), Mobile Competence Centre; 650, Route Des Lucioles; F-06921 Sophia-Antipolis Cedex; France, Jun. 27, 2014, XP050907468, Retrieved from the Internet: URL:http//www.3gpp.org/ftp/Specs/2014-12/Rel-12/36_series/[retreived on Jun. 27, 2014].

CATT (Rapporteur: "Offline discussion on mobile relay architecture options", 3GPP Draft; R3-120423, 3rd Generation Partnership Project (3GPP), Mobile Competence Centre; 650, Route Des Lucioles; F-06921 Sophia-Antipolis Cedex; France, vol. RAN WG3, no. Dresden, Germany; Feb. 6, 2012-Feb. 10, 2012, Feb. 10, 2012, XP050566838, retrieved on Feb. 10, 2012, pp. 1-7.

"3rd Generation Partnership Project; Technical Specification Group Radio Access Network; Evolved Universal Terrestrial Radio Access (E-UTRA); Relay Architectures for E-UTRA (LTE-Advanced) (Release 9)", 3GPP Standard; TR 36.806, 3rd Generation Partnership Project (3GPP), Mobile Competence Centre; 650, Route Des Lucioles; F-06921 Sophia-Antipolis Cedex; France, vol. RAN WG2, No. VO.3.1 Jun. 23, 2010, pp. 1-34, XP050553703.

D. Farinacci, et al., Generic Routing Encapsulation (GRE), Network Working Group, Request for comments: 2784; Category: Standard Tracks, Mar. 2000, p. 1-9.

Yingrong Coral Sung, et al., "An efficient robust header compression mechanism for Long Term Evolution Advanced Relay Architecture", Network Operations and Management Symposium (APNOMS), 2012 14th Asia-Pacific, IEEE, Sep. 25, 2012, p. 1-4, XP032270869, ISBN: 978-1-4673-4494-4.

S. Alexander, et al.; "DHCP Options and BOOTP Vendor Extensions;" Network Working Group; Mar. 1997; pp. 1-34; Request for Comments: 2132.

* cited by examiner

PROXY MOBILE INTERNET PROTOCOL (PMIP) TUNNEL SELECTION BY A WIRELESS RELAY IN A DATA COMMUNICATION NETWORK

TECHNICAL BACKGROUND

Wireless communication networks exchange user data between communication devices to facilitate various data services, like internet access, voice calling, media streaming, data messaging, and the like. Wireless communication networks allow users to move about as they communicate. A popular form of wireless communication network is Long Term Evolution (LTE). Wireless relays are used to extend the coverage area of wireless networks including LTE networks.

The wireless relays serve user devices and exchange user data with wireless base stations or another network gateway. In LTE networks, femtocell relays and picocell relays exchange user data and user signaling over the air between User Equipment (UE) and eNodeBs. The wireless relays also exchange data and signaling between the UEs and a Secure Gateway (Se-GW) over a Local Area Network/Wide Area Network (LAN/WAN). These wireless relay communications use various combinations of Ethernet, Data over Cable System Interface Specification (DOCSIS), Wave Division Multiplex (WDM), Wireless Fidelity (WIFI), Long Term Evolution (LTE), WIFI/LTE Aggregation (LWA), or some other data communication protocol.

The Proxy Mobile Internet Protocol (PMIP) is used over different types of IP networks to provide UE mobility. With PMIP, the mobile UE attaches to various Media Access Gateways (MAGs) as it moves about. The MAGs communicate with a Local Mobility Anchor (LMA) that forms the connection point for the mobile UE to other systems like the Internet. Wireline and wireless networks both deploy LMAs and MAGs. In particular, wireless relays host MAGs that communicate over PMIP tunnels to LMAs in the networks. Unfortunately, current wireless networks do not effectively use PMIP tunnels. The wireless relays do not efficiently interact with the networks to select PMIP tunnels.

TECHNICAL OVERVIEW

A wireless relay serves User Equipment (UE) over Proxy Mobile Internet Protocol (PMIP) tunnels. The wireless relay receives a wireless network address from a wireless network and a wireline network address from a wireline network. The wireless relay receives a bearer request from a network controller that identifies a gateway network address. The wireless relay selects the wireless network address or the wireline network address responsive to the bearer request. In some examples, the wireless relay selects the network address based on a UE ID. The wireless relay generates and transfers a PMIP update that indicates the selected network address to the gateway network address. The wireless relay receives a PMIP response. The wireless relay exchanges user data over the wireless PMIP tunnel if the wireless network address was selected. The wireless relay exchanges the user data over the wireline PMIP tunnel if the wireline network address was selected.

DETAILED DESCRIPTION

Figure 1:
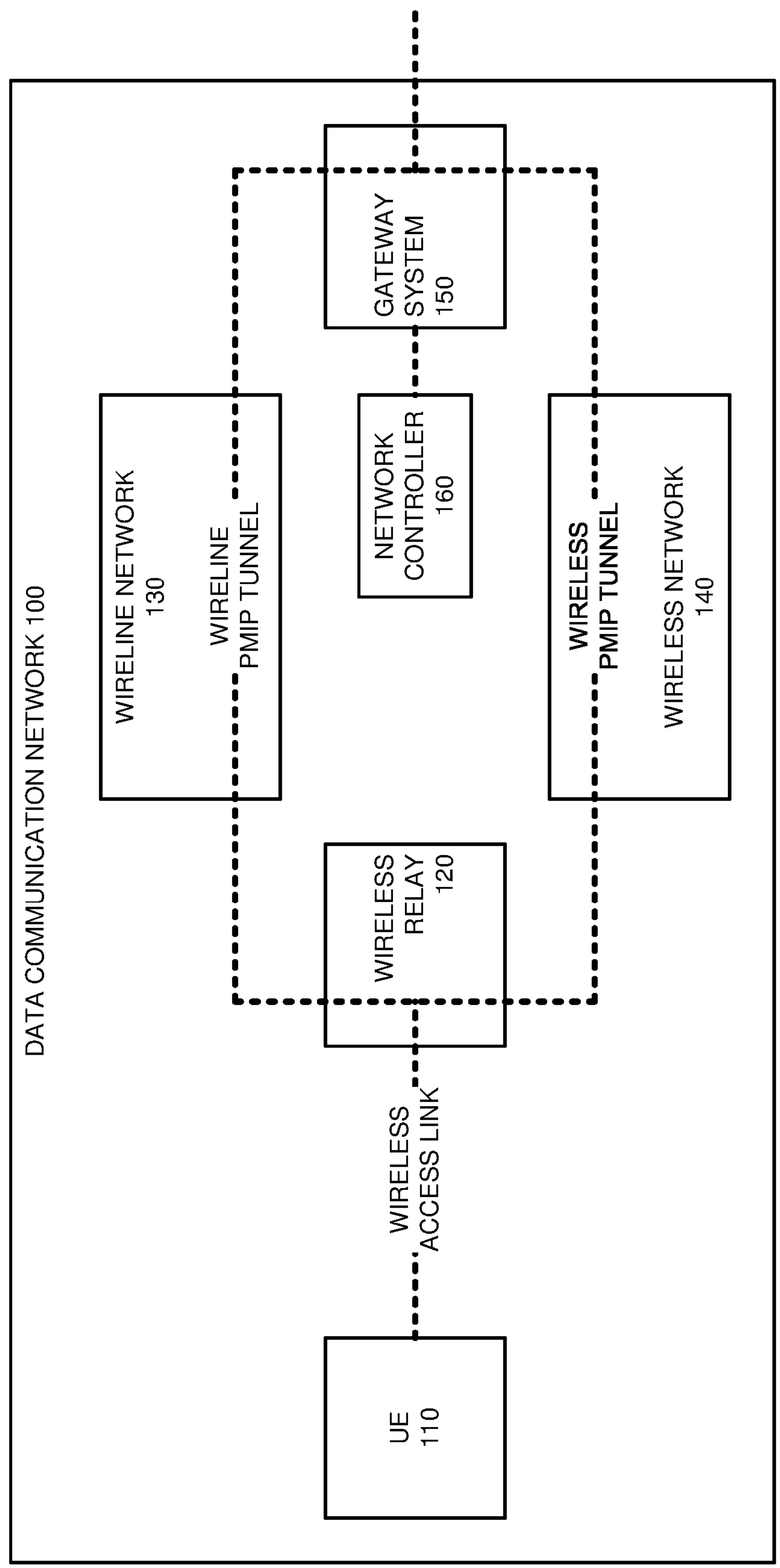
FIGS. 1-3 illustrate a data communication network having a wireless relay that selects Proxy Mobile Internet Protocol (PMIP) tunnels for user communications.
Figure 2:
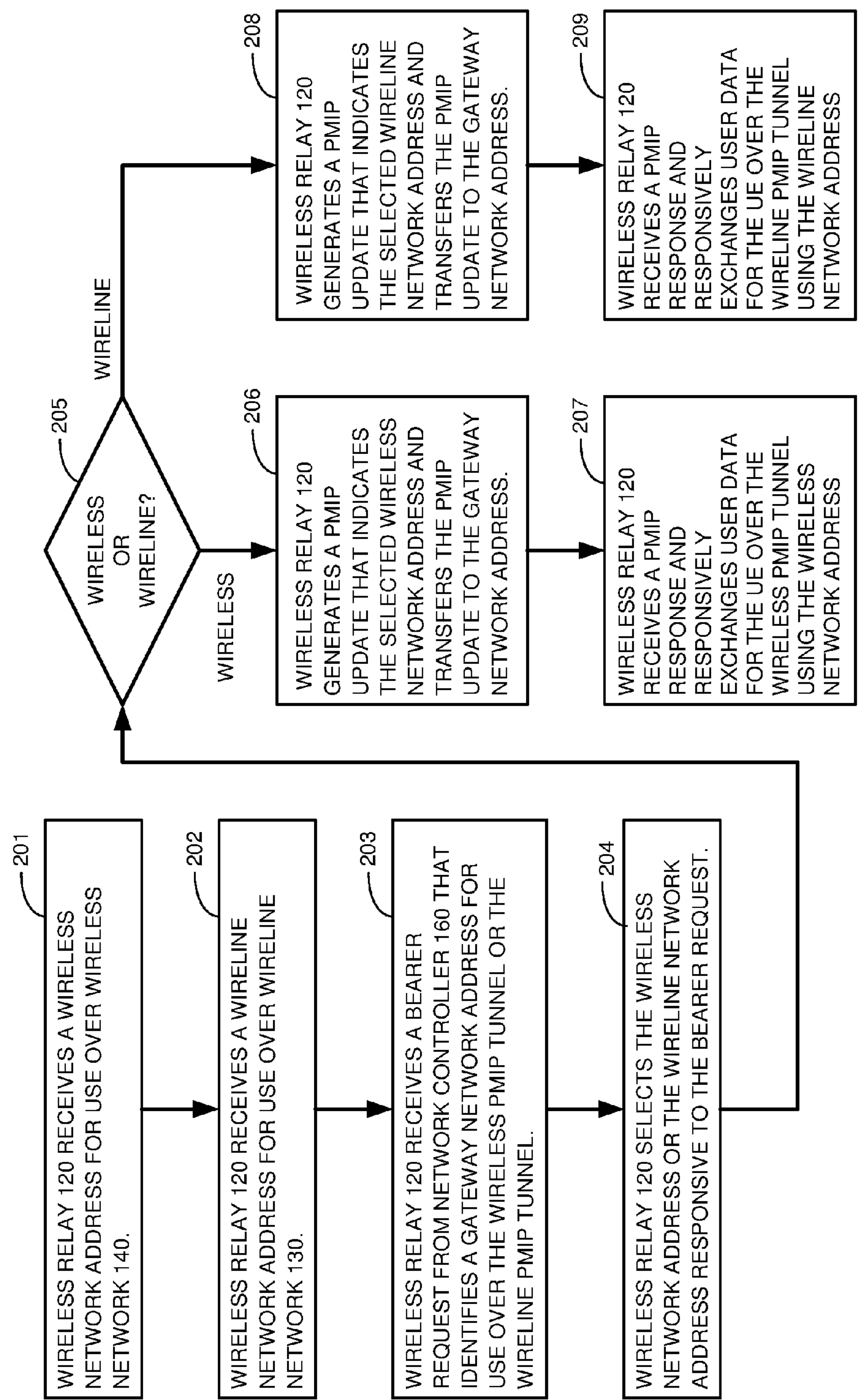
Figure 3:
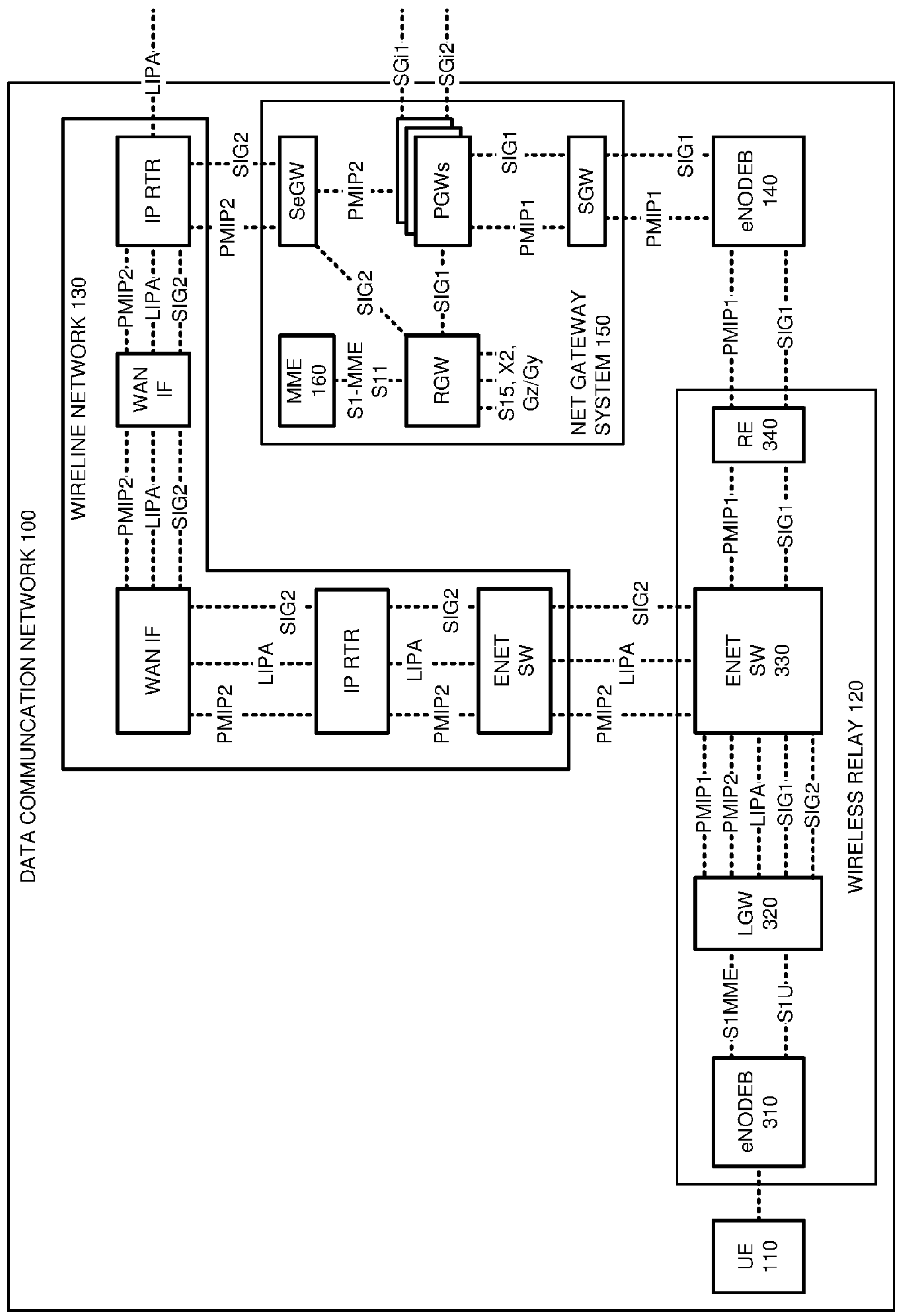

FIGS. 1-3 illustrate data communication network 100 having wireless relay 120 that selects Proxy Mobile Internet Protocol (PMIP) tunnels for user communications. Referring to FIG. 1, data communication network 100 comprises UE 110, wireless relay 120, wireline network 130, wireless network 140, gateway system 150, and network controller 160. UE 110 comprises a phone, computer, or some other apparatus having a wireless transceiver. The user communications comprise video, audio, messaging, web browsing, file transfers, and the like.

Wireless relay 120 comprises a PMIP Media Access Gateway (MAG). Wireless relay 120 also includes data transceivers, digital processing circuitry, data storage memories, and various software components. The communication transceivers support protocols like Long Term Evolution (LTE), Wireless Fidelity (WiFi), Ethernet, Internet Protocol (IP), PMIP, and the like.

Wireline network 130 comprises network elements that are linked by communication bearers. The network elements comprise switches, modems, routers, network controllers, user databases, and the like. The communication bearers comprise physical media and communication protocols to transport user data and network signaling. The physical media comprises metal or glass and possibly air. The communication protocols comprise Ethernet, Data Over Cable Service Information Specification (DOCSIS) system, Time Division Multiplex (TDM), Wave Division Multiplexing (WDM), Internet Protocol (IP), and possibly some wireless protocols.

Wireless network 140 comprises network elements that are linked by communication bearers. The network elements comprise relays, base stations, routers, network controllers, user databases, and the like. The communication bearers comprise physical media and communication protocols to transport user data and network signaling. The physical media comprises air and possibly metal and/or glass. The communication protocols comprise LTE, WiFi, Ethernet, IP, TDM, WDM, and the like.

Gateway system 150 comprise a PMIP Local Mobility Anchor (LMA). Gateway system 150 also includes routers, firewalls, and data filters. In LTE examples, gateway system 150 includes a Serving Gateway (S-GW), Packet Data Network Gateway (P-GW), Secure Gateway (Se-GW), and Relay Gateway (R-GW). Network controller 160 comprises a computer and communication platform with networking control software. In LTE examples, network controller 160 includes a Mobility Management Entity (MME), Home Subscriber System (HSS), Policy Charging and Rules Function (PCRF), and an accounting system.

Wireless relay 120 attaches to wireless network 140 and receives a wireless network address for use over wireless network 140. Wireless relay 120 registers with wireline network 130 and receives a wireline network address for use over wireline network 130. Wireless relay 120 then receives a bearer request transferred by network controller 160. The bearer request identifies a gateway network address for a PMIP tunnel that will terminate in network gateway system 150. The bearer request may also indicate an Access Point Name (APN) and a Quality-of-Service Class Identifier (QCI) for the PMIP tunnel.

In response to the bearer request, wireless relay 120 selects either the wireless network address or the wireline network address. In some examples, wireless relay 120 translates an identifier (ID) for UE 110 into the network selection by using a UE ID-to-network type data structure. The UE ID could be an International Mobile Subscriber Identifier (IMSI), International Mobile Equipment Identifier (IMEI), account code, or the like. Additional factors like APN, network quality, media type, QCI, and Public Land Mobile Network (PLMN) ID could be used in the data structure to control the selection. Thus, the selected wireless or wireline network could be determined based on various factors including the UE ID and service descriptors like APN and PLMN.

Wireless relay 120 generates a PMIP update that indicates the selected wireline/wireless network address. The PMIP update may also include an APN and previously registered network address. Wireless relay 120 transfers the PMIP update with the selected network address to the gateway network address. Wireless relay 120 receives a PMIP response over the selected PMIP tunnel. The PMIP response may also indicate a QCI for the APN.

UE 110 and wireless relay 120 exchange user data over a wireless access link—possibly based on the APN and QCI in the PMIP response. Wireless relay 120 and gateway system 150 exchange user data over the wireless PMIP tunnel or the wireline PMIP tunnel based on the network address selected by wireless relay 120 and using the QCI (or similar quality). If the wireline network address is selected, then the user data traverses the wireline PMIP tunnel through wireline network 130 using a quality like the indicated QCI. If the wireless network address is selected, then the user data traverses the wireless PMIP tunnel through wireless network 140 using the QCI—and the user data is typically compressed for wireless transmission. Gateway system 150 terminates the PMIP tunnel and exchanges the user data with other systems like the Internet or another gateway system.

The APNs and/or QCIs can be used in the bearer request, the PMIP request, and/or the PMIP response to control the quality-of-service over the PMIP tunnels. For example, a voice service APN in the bearer request could drive the use of QCI 1 over the wireless PMIP tunnel. A video service QCI in the PMIP response could drive the use of QoS like QCI 2 over the wireline PMIP tunnel. In addition, multiple PMIP tunnels may be active at the same time for the same UE. The APNs and QCIs can be used to set an individual quality-of-service for each PMIP tunnel.

FIG. 2 illustrates the operation of wireless relay 120 to select PMIP tunnels for user communications. Wireless relay 120 receives a wireless network address for use over wireless network 140 (201). Wireless relay 120 receives a wireline network address for use over wireline network 130 (202). Wireless relay 120 then receives a bearer request transferred by network controller 160 that identifies the gateway network address for use over the wireline PMIP tunnel or the wireless PMIP tunnel (203). The bearer request usually indicates an APN, such as voice or video, for the PMIP tunnel. Thus, network controller 160 exerts control over the PMIP tunnel through its selection of the APN.

In response to the bearer request, wireless relay 120 selects either the wireless network address or the wireline network address (204). In some examples, wireless relay translates the UE ID and APN into the network selection using a UE/APN/network data structure. In some examples, a white list of UE IDs and associated APNs is used to push select user data over wireline network 130. Thus, wireless relay 120 exerts control over the PMIP tunnel through its selection of the access network for the PMIP tunnel.

If wireless relay 120 selects the wireless network address (205), then wireless relay 120 generates a PMIP update that indicates the selected wireless network address and typically the APN from the bearer request (206). Wireless relay 120 transfers the PMIP update to the gateway network address (206). Wireless relay 120 then receives a PMIP response that usually indicates a QCI for the APN (207). Thus, gateway system 150 exerts control over the PMIP tunnel through its selection of the QCI. Wireless relay 120 then exchanges the user data over the wireless PMIP tunnel to gateway system 150 using the selected wireless network address and the gateway network address (207). The specified QCI should be applied to this PMIP tunnel by wireless relay 120, wireless network 140, and gateway system 150.

If wireless relay 120 selects the wireline network address (205), then wireless relay 120 generates a PMIP update that indicates the selected wireline network address and typically the APN from the bearer request (208). Wireless relay 120 transfers the PMIP update to the gateway network address (208). Wireless relay 120 then receives a PMIP response that usually indicates a QCI (or other quality metric) for the APN (209). Thus, gateway system 150 exerts control over the PMIP tunnel through its selection of the QCI. Wireless relay 120 exchanges the user data over the wireline PMIP tunnel to gateway system 150 using the selected wireline network address and the gateway network address (209). A quality that corresponds to the specified QCI should be applied to this PMIP tunnel by wireless relay 120, wireline network 140, and gateway system 150.

FIG. 3 further illustrates data communication network 100 to select PMIP tunnels for user communications through wireless relay 120. Note that all of the features described with respect to FIG. 3 are not required in all examples of network 100. Data communication network 100 comprises UE 110, wireless relay 120, wireline network 130, eNodeB 140, and network gateway system 150. Wireless relay 120 comprises eNodeB 310, Local Gateway (L-GW) 320, Ethernet Switch (ENET SW) 330, and Relay Equipment (RE) 340. Network gateway system 150 comprises a Serving Gateway (S-GW), multiple Packet Data Network Gateways (P-GWs), Relay Gateway (R-GW), Secure Gateway (Se-GW), and MME 160. Wireless network 130 comprises an ENET SW, IP Routers (RTRs), and WAN Interfaces (IFs).

Initially, RE 340 establishes a communication link to network gateway system 150 over eNodeB 140. RE 340 obtains an IP address and a P-GW address for this first link. RE 340 receives an Se-GW address as well. RE 340 extends the communication link data to L-GW 320 over ENET SW 330. This communication link could be a default LTE data bearer. ENET SW 330 obtains a wireline IP address from wireline network 130 and extends this link to L-GW 320. This link could be a default ISP bearer. L-GW 320 uses wireline network 130 and network addresses for the Se-GW/P-GW to establish another communication link to network gateway system 150.

L-GW 320 establishes a signaling link (SIG1) to the R-GW over wireless network 140 and network gateway system 150. The R-GW exchanges SIG1 (S1-MME, S11, S15, X2, Gz/Gy) with various systems including MME 160. L-GW 320 establishes another signaling link (SIG2) to the R-GW over wireline network 130 and network gateway system 150. The R-GW also exchanges SIG2 (S1-MME, S11, S15, X2, Gz/Gy) with various systems including MME 160.

L-GW 320 receives an S11 bearer request from MME 160. The bearer request identifies a P-GW network address and APN for a PMIP tunnel. Thus, MME 160 controls the individual P-GWs and APNs used by wireless relay 120 for the PMIP tunnels. In response to the S11 bearer request, L-GW 320 selects either the wireless network address or the wireline network address. In this example, L-GW translates the IMSI for UE 110 into the selected network type and selects the network address based on the network type.

L-GW 320 generates a PMIP update that indicates the selected network address, the previous network address if any, and the APN. L-GW 320 transfers the PMIP update to the P-GW address. The selected P-GW typically uses a PCRF to translate the UE ID and APN into a QCI for the PMIP tunnel. The selected P-GW returns a PMIP response with the QCI to the selected network address of L-GW 320. L-GW 320 receives the PMIP response with the QCI for the PMIP tunnel.

UE 110 and eNodeB 310 exchange user data over a wireless access link—possibly based on the APN in the bearer request or the QCI in the PMIP response. eNodeB 310 and L-GW 320 exchange the user data over the S1-U link. L-GW 320 interworks between General Purpose Radio Service Transfer Protocol (GTP) and Generic Routing Encapsulation (GRE). L-GW 320 and ENET SW 330 exchange the GRE user data over the selected PMIP tunnel.

If the wireless network address is selected, then L-GW 320 and the selected P-GW exchange the GRE user data over a wireless PMIP tunnel (PMIP1) that traverses ENET SW 330, RE 340, eNodeB 140, and the S-GW. PMIP1 uses the specified QCI and is typically compressed over the air. If the wireline network address is selected, then L-GW 320 and the selected P-GW exchange the GRE user data over a wireline PMIP tunnel (PMIP2) that traverses ENET SW 330, wireline network 130, and the Se-GW. PMIP2 typically uses a best-effort quality-of-service, but may be configured to apply a quality-of-service that is similar to the specified QCI.

The selected P-GW terminates the PMIP tunnel and the GRE. The selected P-GW exchanges the user data with other systems like the Internet or another P-GW over SGi links. In this manner, L-GW 320 and network gateway system 150 may implement multiple simultaneous wireless and wireline PMIP tunnels over both networks 130 and 140. Each PMIP tunnel may have an individually specified quality-of-service.

In some examples, L-GW 320 also establishes a Local IP Access (LIPA) communication link through wireline network 130. L-GW 320 may use the LIPA link for user data as an alternative to the PMIP tunnels. The UE ID data structure that L-GW 320 uses for network selection may include entries that associate the LIPA link with UE IDs, APNs, and the like. Thus, L-GW 320 may select the LIPA link instead of the PMIP tunnels based on the UE ID, APN, QCI, and/or other factors.

Figure 4:
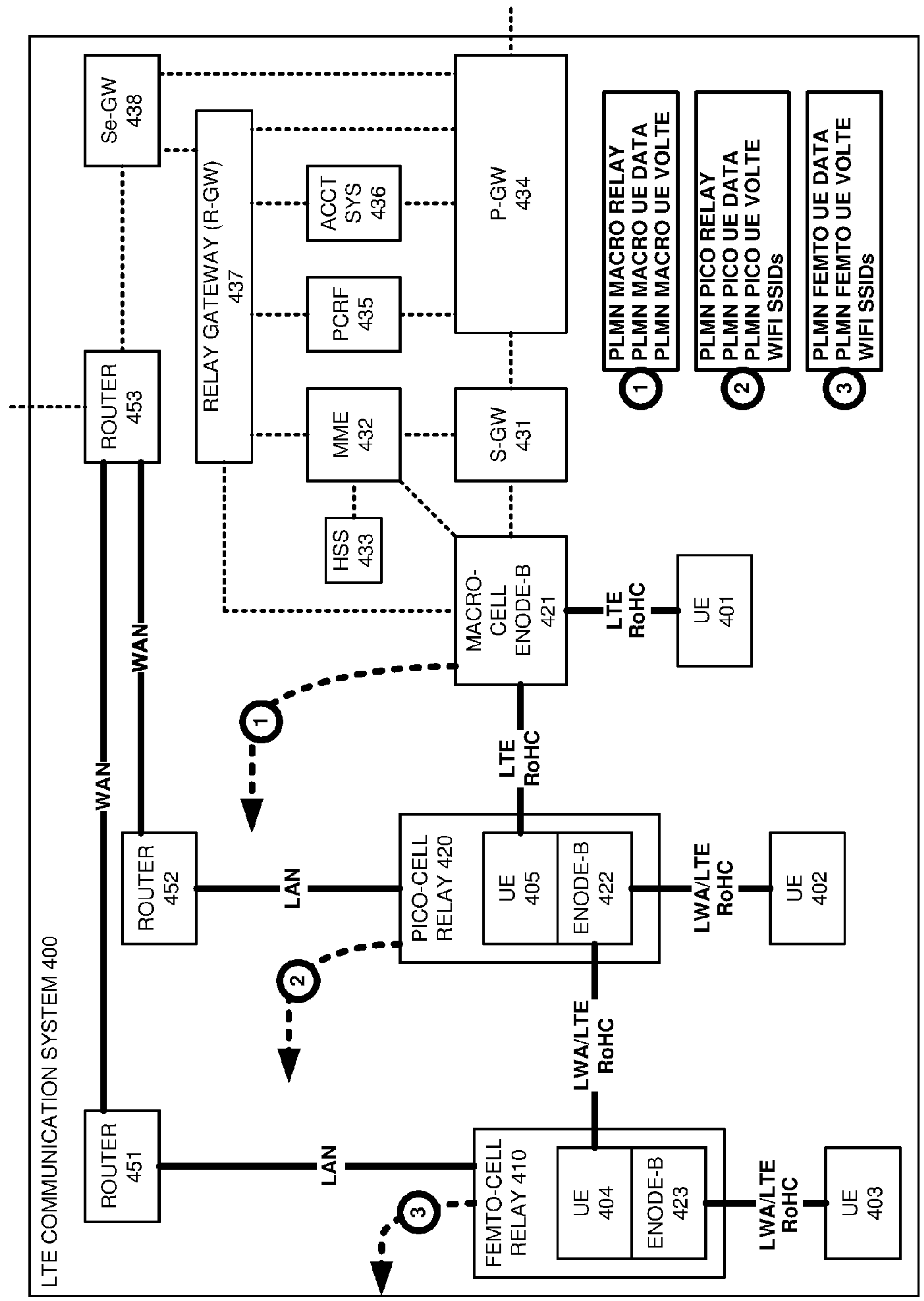
FIG. 4 illustrates a Long Term Evolution (LTE) data communication system having a Relay Gateway (R-GW) to proxy signaling for picocell relays and femtocell relays.

FIG. 4 illustrates Long Term Evolution (LTE) communication system 400 that comprises Relay Gateway (R-GW) 437 to proxy LTE signaling for femtocell relay 410 and picocell relay 420. LTE communication system 400 comprises: User Equipment (UEs) 401-403, femtocell relay 410, picocell relay 420, macrocell eNodeB 421, Serving Gateway (S-GW) 431, Mobility Management Entity (MME) 432, Home Subscriber System (HSS) 433, Packet Data Network Gateway (P-GW) 434, Policy and Charging Rules Function (PCRF) 435, Accounting system (ACCT) 436, R-GW 437, Security Gateway (Se-GW) 438, and routers 451-453. Femtocell relay 410 comprises UE 404 and eNodeB 423. Picocell relay 420 comprises UE 405 and eNodeB 422.

Femtocell relay 410 is coupled to router 451 over a Local Area Network (LAN) such as an Ethernet LAN. Router 451 is coupled to router 453 over a Wide Area Network (WAN) such as a Data Over Cable Service Information Specification (DOCSIS) system, Time Division Multiplex (TDM), Wave Division Multiplexing (WDM), Ethernet, or some other data network. Picocell relay 420 is coupled to router 452 over a LAN. Router 452 is coupled to router 453 over a WAN. Router 453 is coupled to Se-GW 438. The number and configuration of routers illustrated is representative and may vary.

To attract UEs using LTE, eNodeBs 421-423 broadcast various Public Land Mobile Network Identifiers (PLMN IDs). UEs 401-405 receive the PLMN broadcasts and identify their desired LTE network during LTE attachment using the broadcast PLMN IDs. Referring to the circled number one on FIG. 4, macrocell eNodeB 421 broadcasts a PLMN ID of MACRO RELAY to attract relays like femtocell relay 410 and picocell relay 420. Macrocell eNodeB 421 broadcasts PLMN IDs for MACRO UE DATA and MACRO UE VOLTE to attract UEs like UE 401. Likewise, picocell eNodeB 422 broadcasts PLMN IDs for PICO UE DATA, PICO UE VOLTE, and PICO RELAY. Femtocell eNodeB 421 broadcasts PLMN IDs for FEMTO UE DATA and FEMTO UE VOLTE. A PLMN ID is typically associated with one or more Access Point Names (APNS) that are selected by MME 432 and HSS 433 when a UE attaches using that PLMN ID.

To attract UEs using WiFi, eNodeBs 422-423 also broadcast various WiFi Service Set Identifiers (SSIDs). UEs 402-404 receive the SSID broadcasts and identify their desired WiFi network during WiFi attachment using the broadcast SSIDs. For example, a picocell SSID might be as simple as "PICO 420" or be more complex like "PICO 420 RELAY", "PICO 420 UE DATA", or "PICO 420 UE VOLTE." Using Packet Data Convergence Protocol (PDCP), eNodeBs 422-423 convert between the Wifi data and the LTE data.

UEs 402-404 and eNodeBs 422-423 exchange wireless data communications using LTE/WiFi Aggregation (LWA). With LWA, eNodeBs 422-423 expose both WiFi and LTE access interfaces to UEs 402-404 over unlicensed spectrum at 2.4 GHz, 5 GHz, or some other band. In addition, eNodeBs 422-423 expose LTE access interfaces to UEs 402-404 over licensed spectrum between 0.3 GHz-3 GHz or some other band. Thus, UEs 402-404 may use LTE or WiFi over licensed or unlicensed spectrum. UE 404 may use LWA to exchange compressed user data and LTE signaling with eNodeB 422 by using WiFi over unlicensed spectrum. UE 405 may use LTE to exchange compressed user data and LTE signaling with eNodeB 421—perhaps over unlicensed spectrum.

To facilitate LWA, UEs 402-404 and eNodeBs 422-423 perform PDCP aggregation for the WiFi user data and signaling. The LTE PDCP layer handles user data and LTE signaling between the LTE IP layer and the LTE Radio Link Control (RLC) layer. The LTE RLC layer handles user data and signaling between the PDCP layer and the LTE Medium Access Control (MAC) Layer. With PDCP aggregation, an LTE/WiFi RLC layer is adapted to exchange user data between the WiFi MAC layer and the LTE PDCP layer. The LTE/WiFi RLC layer interworks between WiFi and LTE.

UEs 401-405 and eNodeBs 421-423 perform compression/decompression on the user data and signaling to wirelessly exchange compressed user data and LTE signaling over the air. The PDCP layers in UEs 401-405 and in eNodeBs 421-423 perform user data compression/decompression using Robust Header Compression (RoHC) at the Real-time Transfer Protocol (RTP) layer, User Datagram Protocol (UDP) layer, and Internet Protocol (IP) layer. The PDCP layers in UEs 401-405 and in eNodeBs 421-423 perform LTE signaling compression/decompression using general compression at the User Datagram Protocol (UDP) layer and the Internet Protocol (IP) layer.

UEs 402-404 exchange WiFi and/or LTE data with eNodeBs 422-423. Relays 410 and 420 have the option of exchanging the user data with the Internet over the LAN/WAN using their Local Internet Protocol Access (LIPA) interfaces. Relays 410 and 420 may also exchange their user data with P-GW 434 over the backhaul provided by the LWA/LTE interfaces. In addition, Relays 410 and 420 may exchange the user data with P-GW 434 over the backhaul provided by the LAN/WAN interfaces.

To backhaul their user data, eNodeBs 421-423 generate S1-U General Packet Radio Service Transfer Protocol User (GTP-U) data tunnels to their respective S-GWs. The S-GWs terminate these 51-U GTP-U data tunnels from eNodeBs 421-423. In femtocell relay 410, a Local S-GW (L-SGW) terminates the S1-U GTP-U tunnel from eNodeB 423. UE 404 and eNodeB 422 may exchange this user data using LWA/LTE and RoHC. In picocell relay 420, an L-SGW terminates the S1-U GTP-U tunnel from eNodeB 422. UE 405 and eNodeB 421 may exchange the user data using LTE and RoHC.

To service the user data, relays 410 and 420 generate LTE signaling (S1-MME, S11, S15, X2, and Gy/Gz). Relays 410 and 420 exchange the LTE signaling with R-GW 437 over the backhaul provided by the LWA/LTE interfaces or the backhaul provided by the LAN/WAN interfaces. R-GW 437 exchanges the LTE signaling with eNodeB 421 (X2), MME 432 (S1-MME and S11), P-GW 434 (PMIP), PCRF 435 (S15), and ACCT 436 (Gz/Gy). At the macro layer, eNodeB 421 and MME 432 exchange S1-MME signaling. S-GW 431 and MME 432 exchange S11 signaling. P-GW 434 and PCRF 435 exchange Gx signaling. P-GW 434 and ACCT 436 exchange Gz/Gy signaling. Macro eNodeB 421 and S-GW 431 exchange S1-U data. S-GW 431 and P-GW 434 exchange S5 data. P-GW 434 exchanges SGi data with various systems including R-GW 437.

Figure 5:
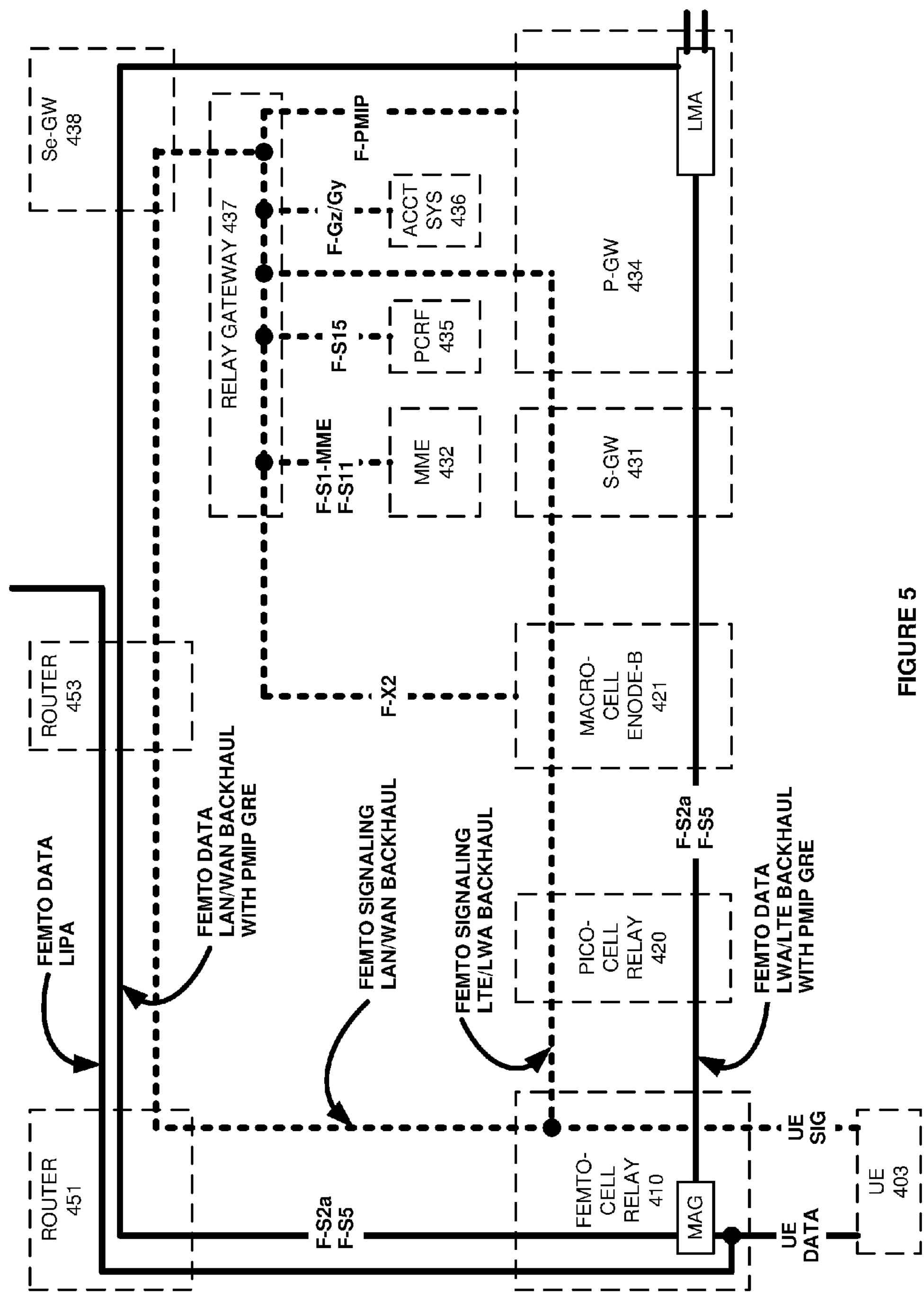
FIGS. 5-17 illustrate a variant of the LTE data communication system that uses Proxy Mobile Internet Protocol (PMIP) Generic Routing Encapsulation (GRE) tunnels between Local Serving Gateways (L-SGWs) in the relays and macro Packet Data Security Gateways (P-GWs).

FIGS. 5-17 illustrate a variant of the LTE data communication system 400 that uses Proxy Mobile Internet Protocol (PMIP) Generic Routing Encapsulation (GRE) tunnels between Local Serving Gateways (L-SGWs) in relays 410 and 420 and macro P-GW 434. The use of the PMIP GRE tunnels facilitates UE IP address continuity when UE 403 is mobile. Referring to FIG. 5, a Local Mobility Anchor (LMA) in P-GW 434 is coupled to a Mobile Access Gateway (MAG) in the Local S-GW (L-SGW) of femtocell relay 410.

UE 403 has a data bearer and a signaling bearer with femtocell relay 410. The L-SGW in femtocell relay 410 may exchange some of this user data with the Internet over routers 451 and 453 in a LIPA data service. The MAG in femtocell relay 410 may exchange some of the user data with the LMA in P-GW 434 over a PMIP GRE tunnel through picocell relay 420, eNodeB 421, and S-GW 431. The MAG in femtocell relay 410 may also exchange some of the UE data with the LMA in P-GW 434 over a PMIP GRE tunnel through router 451, router 453, and Se-GW 438.

For Voice over LTE (VoLTE) or other Internet Multimedia Subsystem (IMS) services, the MAG in femtocell relay 410 and the LMA in a VoLTE P-GW (not shown) establish VoLTE PMIP GRE tunnels upon femtocell relay attachment. The VoLTE PMIP GRE tunnels traverse both the LAN/WAN and LWA/LTE interfaces. The VoLTE PMIP GRE tunnels each transport F-S2a and F-S5 user data flows that carry user audio/video data and Session Initiation Protocol (SIP) signaling.

Femtocell relay 410 terminates the UE signaling and transfers Non-Access Stratum (NAS) messages between UE 403 and MME 432 in its own LTE Femtocell (F) signaling. Femtocell relay 410 may exchange its F-signaling with R-GW 437 in an LTE signaling tunnel through picocell relay 420, eNodeB 421, S-GW 431, and P-GW 434. Femtocell relay 410 may also exchange its F-signaling with R-GW 437 in another LTE signaling tunnel through router 451, router 453, and Se-GW 438. R-GW 437 exchanges the F-signaling with eNodeB 421 (F-X2), MME 432 (F-S1-MME and F-S11), P-GW 434 (F-PMIP), other P-GWs (F-PMIP), PCRF 435 (F-S15), and ACCT 436 (F-Gz/Gy).

Femtocell relay 410 has associated LTE Access Point Names (APNs) to establish its user data and signaling bearers. A femto data APN supports the F-S5/2a user data flows in the PMIP GRE tunnel between the MAG in femtocell relay 410 and the LMA in P-GW 434 through picocell relay 420, eNodeB 421, and S-GW 431. For IMS services like VoLTE, the femto data APN also supports F-S5/2a user data flows in a VoLTE PMIP GRE tunnel between the MAG in femtocell relay 410 and the LMA in a VoLTE P-GW (not shown) through picocell relay 420, eNodeB 421, and S-GW 431. A femto signaling APN supports the LTE signaling tunnel (F-X2, F-S1-MME, F-S11, F-S15, F-PMIP, and F-Gz/Gy) between femtocell relay 410 and R-GW 437 through picocell relay 420, eNodeB 421, S-GW 431, and P-GW 434. R-GW 437 supports the femto signaling APN by exchanging the LTE signaling with eNodeB 421 (F-X2), MME 432 (F-S1-MME, F-S11), P-GW 434 (F-PMIP), other P-GWs (F-PMIP), PCRF 435 (F-S15), and ACCT 436 (F-Gz/Gy).

Figure 6:
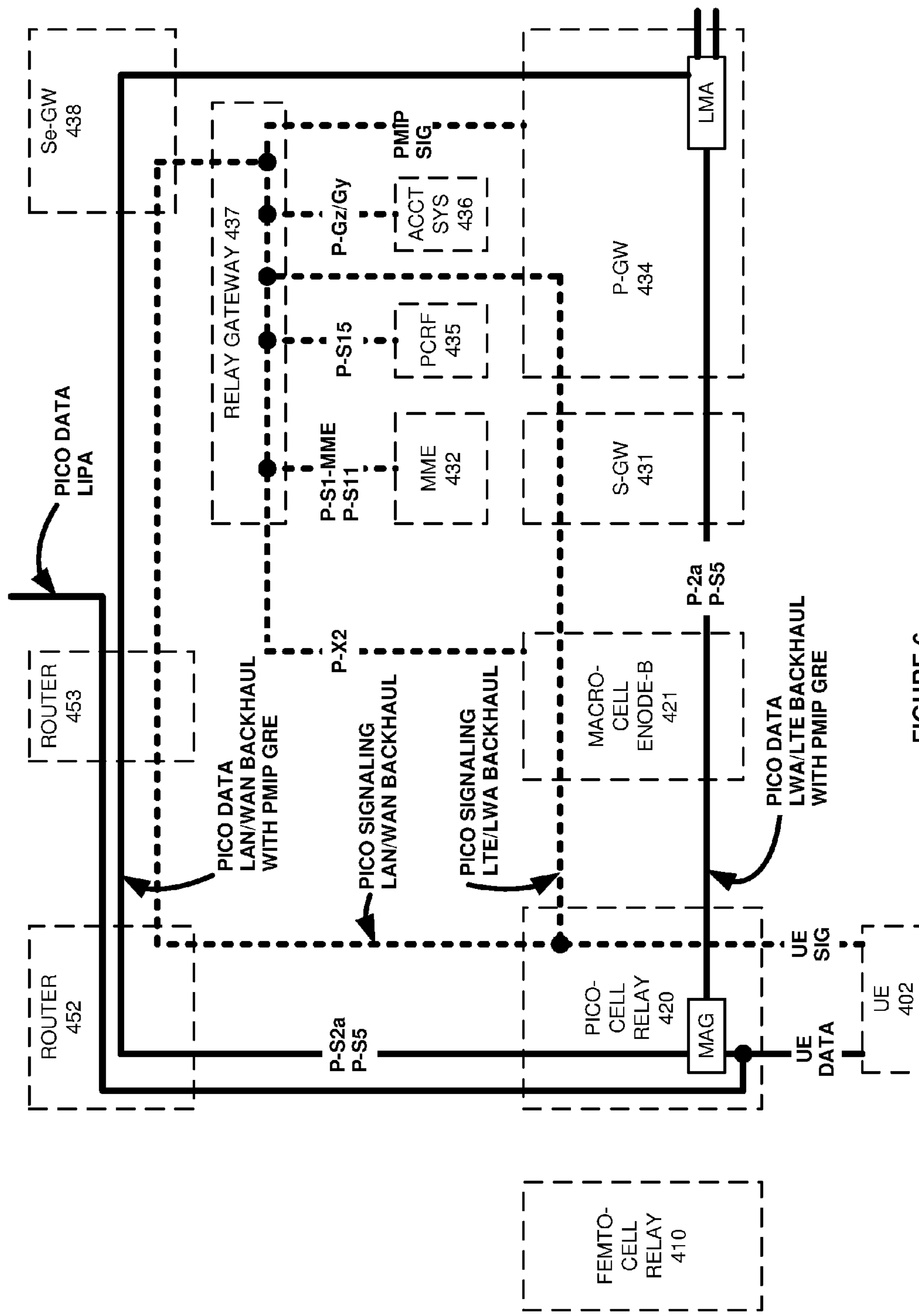

Referring to FIG. 6, a Local Mobility Anchor (LMA) in P-GW 434 is coupled to a Mobile Access Gateway (MAG) in the L-SGW of picocell relay 420. UE 402 has a UE data bearer and a UE signaling bearer with picocell relay 420. The L-SGW in picocell relay 420 may exchange some of the user data with the Internet over routers 452-453 in a LIPA data service. The MAG in picocell relay 420 may exchange some of the user data with the LMA in P-GW 434 over a PMIP GRE tunnel through eNodeB 421 and S-GW 431. The MAG in picocell relay 420 may also exchange some of the user data with the LMA in P-GW 434 over a PMIP GRE tunnel through routers 452-453 and Se-GW 438.

For VoLTE or other IMS services, the MAG in picocell relay 420 and the LMA in a VoLTE P-GW (not shown) establish VoLTE PMIP GRE tunnels upon picocell relay attachment. The VoLTE PMIP GRE tunnels traverse both the LAN/WAN and LWA/LTE interfaces. The VoLTE PMIP GRE tunnels transport P-S2a and P-S5 user data flows that carry user voice data and Session Initiation Protocol (SIP) signaling.

Picocell relay 420 terminates the UE signaling and transfers Non-Access Stratum (NAS) messages between UE 402 and MME 432 in its own LTE Picocell (P) signaling. Picocell relay 420 may exchange its P-signaling with R-GW 437 over eNodeB 421, S-GW 431, and P-GW 434. Picocell relay 420 may also exchange its P-signaling with R-GW 437 over routers 452-453 and Se-GW 438. R-GW 437 exchanges the P-signaling with eNodeB 421 (P-X2), MME 432 (P-S1-MME and P-S11), P-GW 434 and others (PMIP), PCRF 435 (P-S15), and ACCT 436 (F-Gz/Gy).

Picocell relay 420 has associated LTE APNs to establish its user data and signaling bearers. A pico data APN supports the F-S5/2a user data in the PMIP GRE tunnel between the MAG in picocell relay 420 and the LMA in P-GW 434 through eNodeB 421 and S-GW 431. For IMS services like VoLTE, the pico data APN also supports F-S5/2a user data flows in a VoLTE PMIP GRE tunnel between the MAG in picocell relay 420 and the LMA in a VoLTE P-GW (not shown) through eNodeB 421 and S-GW 431. A pico signaling APN supports the LTE signaling tunnel (P-X2, P-S1-MME, P-S11, P-S15, P-PMIP, and P-Gz/Gy) between picocell relay 420 and R-GW 437 through eNodeB 421, S-GW 431, and P-GW 434. R-GW 437 supports the pico signaling APN by exchanging the picocell LTE signaling with eNodeB 421 (P-X2), MME 432 (P-S1-MME, P-S11), P-GW 434 and others (PMIP), PCRF 435 (P-S15), and ACCT 436 (F-Gz/Gy).

Figure 7:
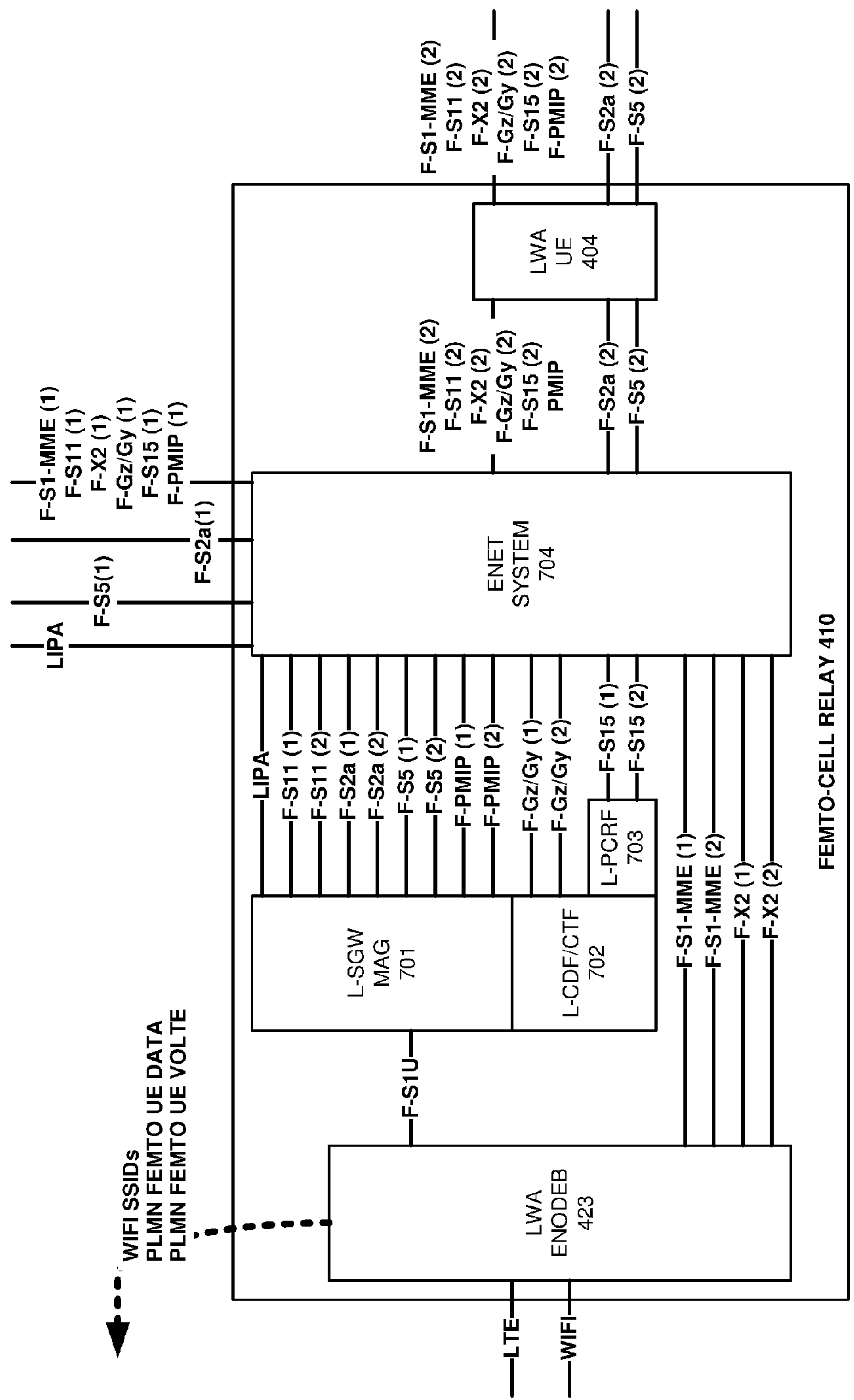

FIG. 7 illustrates femtocell relay 410. Femtocell relay 410 comprises LWA eNodeB 423, L-SGW/MAG 701, Local Charging Data Function and Charging Trigger Function (L-CDF/CTF) 702, Local Policy and Charging Rules Function (L-PCRF) 703, Ethernet system 704, and LWA UE 404. LWA eNodeB 423 exposes LTE and WiFi interfaces to UEs and broadcasts WiFi SSIDs and LTE PLMN IDs for FEMTO UE DATA and FEMTO UE VOLTE.

LWA eNodeB 423 applies RoHC compression/decompression to the user data exchanged with UEs over the LTE and WiFi links. LWA eNodeB 423 applies general compression/decompression to the LTE signaling exchanged with the UEs over the WiFi and LTE links. LWA UE 404 also applies RoHC compression/decompression to the F-S5/2a user data exchanged over the LWA/LTE links. UE 404 applies general compression/decompression to the LTE signaling exchanged over the LWA/LTE links. UE 404 and eNodeB 423 apply LTE QCIs as directed.

For user data, eNodeB 423 exchanges the user data over the F-S1U with L-SGW/MAG 701. L-SGW/MAG 701 terminates the F-S1U user data from eNodeB 423. L-SGW/MAG 701 forms an endpoint for the PMIP GRE tunnels to P-GW 434 over the LAN/WAN and LWA/LTE interfaces. L-SGW/MAG 701 performs bridging, formatting, and filtering on the user data from the F-S1U to form F-S2a and F-S5 user data.

L-SGW/MAG 701 and Ethernet system 704 exchange some user data F-S2a(1) and F-S5(1) over the PMIP GRE tunnels that traverse the LAN/WAN. L-SGW/MAG 701 and Ethernet system 704 exchange other user data F-S2a(2) and F-S5(2) over the other PMIP GRE tunnels that traverse LWA/LTE. L-SGW/MAG 701 and Ethernet system 704 may also exchange user data with the Internet over the LAN/WAN for a LIPA service.

For femtocell signaling, eNodeB 423 and Ethernet system 704 exchange some LTE signaling (F-S1-MME(1) and F-X2 (1)) for LAN/WAN backhaul and exchange other signaling (F-S1-MME(2) and F-X2(2)) for LWA/LTE backhaul. L-SGW/MAG 701 and Ethernet system 704 exchange some LTE signaling (F-S11(1) and F-PMIP (1)) for LAN/WAN backhaul and exchange other signaling (F-S11(2) and F-PMIP (2)) for LWA/LTE backhaul. Likewise, L-CDF/CTF 703 and Ethernet system 704 exchange some LTE signaling (F-Gz/Gy(1)) for LAN/WAN backhaul and exchange other signaling (F-Gz/Gy(2)) for LWA/LTE backhaul. L-PCRF 703 and Ethernet system 704 exchange some LTE signaling (F-S15(1)) for LAN/WAN backhaul and exchange other signaling (F-S15 (2)) for LWA/LTE backhaul.

Advantageously, L-SGW 701 has multiple backhaul options for its LTE signaling and user data through Ethernet system 704. Ethernet system 704 obtains LTE network access over the LAN/WAN. LWA UE 404 obtains LTE network access over LWA/LTE for Ethernet system 704. Ethernet system 704 aggregates and routes femtocell signaling and user data over these interfaces. Like eNodeB 423, L-SGW/MAG 701, and UE 404, Ethernet system 704 applies LTE Quality-of-Service (QoS) to its bearers as indicated by the specified LTE QoS Class Identifiers (QCIs).

To translate between LTE and Ethernet QoS, Ethernet system 704 applies Differentiated Services (DS) to its bearers to match its QoS to the corresponding LTE QCI metrics. Thus, Ethernet system 704 exchanges LTE signaling using DS Point Codes (DSCPs) that correspond to QCI 5. Ethernet system 704 exchanges F-S5/2a user data using DSCPs that correspond to QCI 1, QCI 5, QCI 9, or some other QoS. For VoLTE, L-SGW 701 maps between QCI 1 (voice) and QCI 5 (signaling) on the F-S1U interface and corresponding DSCPs for voice and signaling in the F-S5/S2a PMIP GRE tunnels. The other elements of femtocell relay 410 (423, 702, 703, 404) may also use DSCP in a similar manner for their traffic and QCIs.

L-SGW/MAG 701 has a Children's Internet Protection Act (CIPA) filter application to filter user data. Macrocell PCRF 435 has a CIPA pitcher that transfers CIPA filter flags and configuration data to L-PCRF 703 over the F-S15 links. L-PCRF 703 transfers the CIPA filter flags and configuration data to the CIPA application in L-SGW 701. L-SGW 701 filters the F-S1U user data using in the CIPA filter application as configured by macro PCRF 435.

Figure 8:
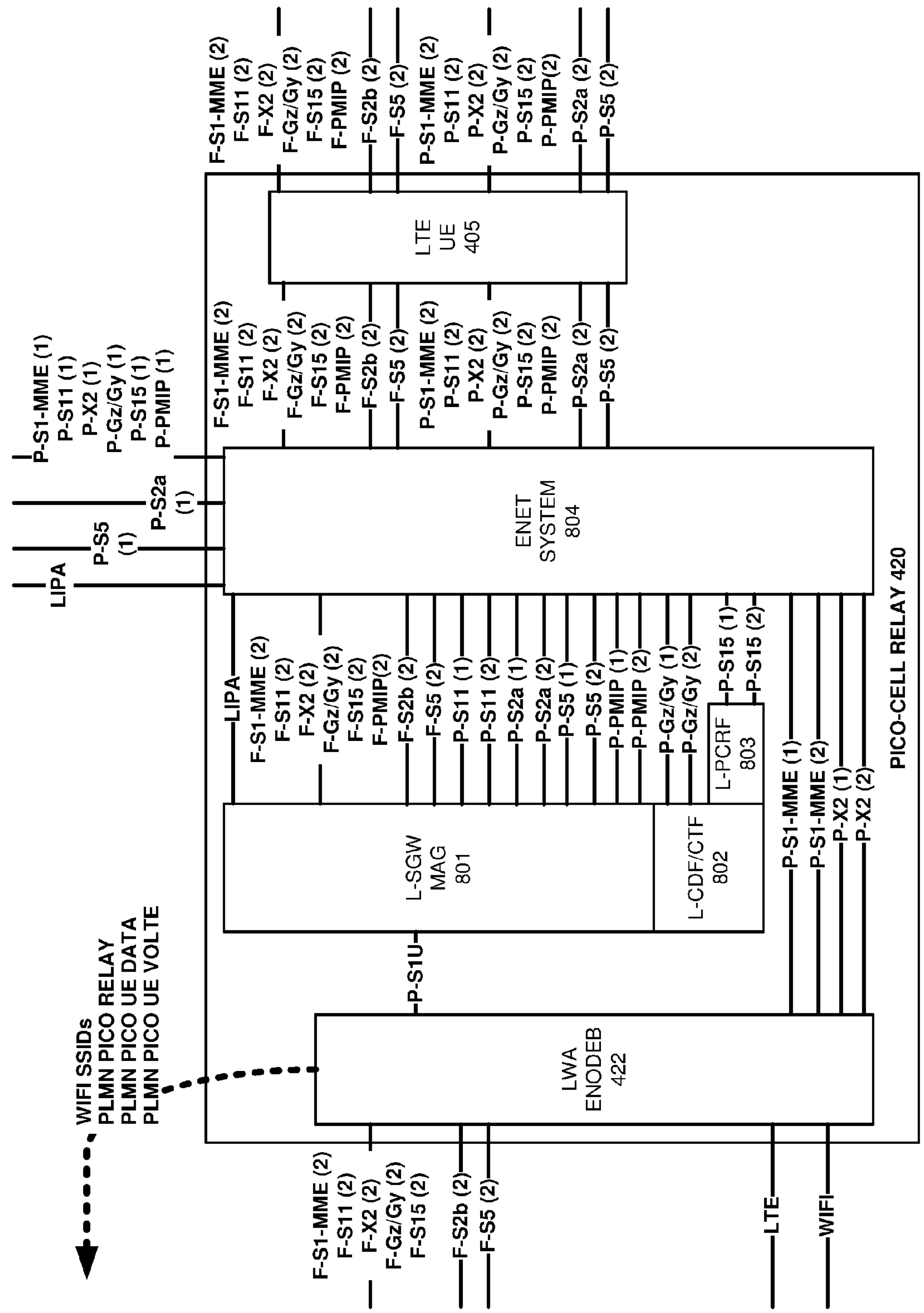

FIG. 8 illustrates picocell relay 420. Picocell relay 420 comprises LWA eNodeB 422, L-SGW/MAG 801, L-CDF/CTF 802, L-PCRF 803, Ethernet system 804, and LTE UE 405. LWA eNodeB 422 exposes LTE and WiFi interfaces to UEs and broadcasts WiFi SSIDs and LTE PLMN IDs for PICO RELAY, PICO UE DATA, and PICO UE VOLTE.

LWA eNodeB 422 applies RoHC compression/decompression to the user data exchanged over the LTE and WiFi links. LWA eNodeB 422 applies general compression/decompression to the LTE signaling exchanged over the LTE and WiFi links. UE 405 applies RoHC compression/decompression to the user data exchanged over the LTE links. UE 405 applies general compression/decompression to the LTE signaling exchanged over the LTE links. UE 405 and eNodeB 422 apply LTE QCIs as directed.

For user data, eNodeB 422 exchanges the user data over the P-S1U with L-SGW/MAG 801. L-SGW/MAG 801 terminates the P-S1U user data from eNodeB 422. L-SGW/MAG 801 forms an endpoint for the PMIP GRE tunnels to P-GW 434. L-SGW/MAG 801 performs bridging, formatting, and filtering on the user data from the P-S1U to form P-S2a and P-S5 user data. L-SGW/MAG 801 and Ethernet system 804 exchange user data P-S2a(1) and P-S5(1) for the PMIP GRE tunnels that traverse the LAN/WAN. L-SGW/MAG 801 and Ethernet system 804 exchange user data P-S2a(2) and P-S5(2) for the PMIP GRE tunnels that traverse LWA/LTE. L-SGW/MAG 801 and Ethernet system 804 may also exchange user data with the Internet over the LAN/WAN for a LIPA service.

For picocell signaling, eNodeB 422 and Ethernet system 804 exchange some LTE signaling (P-S1-MME(1) and P-X2 (1)) for LAN/WAN backhaul and exchange other signaling (P-S1-MME(2) and P-X2(2)) for LTE backhaul. L-SGW/

MAG 801 and Ethernet system 804 exchange some LTE signaling (P-S11(1) and P-PMIP (1)) for LAN/WAN backhaul and exchange other signaling (P-S11(2) and P-PMIP (2)) for LTE backhaul. Likewise, L-CDF/CTF 803 and Ethernet system 804 exchange some LTE signaling (P-Gz/Gy(1)) for LAN/WAN backhaul and exchange other signaling (P-Gz/Gy(2)) for LTE backhaul. L-PCRF 804 and Ethernet system 804 exchange some LTE signaling (P-S15(1)) for LAN/WAN backhaul and exchange other signaling (P-S15 (2)) for LTE backhaul.

Advantageously, L-SGW 801 has multiple backhaul options for its signaling and user data through Ethernet system 804. Ethernet system 804 obtains network access over the LAN/WAN. LTE UE 405 obtains network access over LTE for Ethernet system 804. Ethernet system 804 aggregates and routes picocell signaling and user data Like eNodeB 422, L-SGW 801, and UE 405, Ethernet system 804 applies LTE QoS to its bearers as indicated by the specified LTE QCIs.

To translate between LTE and Ethernet QoS, Ethernet system 804 applies Diff Serv (DS) to its bearers to match its QoS to the corresponding LTE QCI metrics. Thus, Ethernet system 804 exchanges LTE signaling using DS Point Codes (DSCPs) that correspond to QCI 5. Ethernet system 804 exchanges F-S2a user data using DSCPs that correspond to QCI 1, QCI 5, QCI 9, or some other QoS. For VoLTE, L-SGW 801 maps between QCI 1 (voice) and QCI 5 (signaling) on the P-S1U interface and corresponding DSCPs for voice and signaling in the P-S5/S2a PMIP GRE tunnels. The other elements of picocell relay 420 (422, 802, 803, 405) may also use DSCP in a similar manner for their traffic and QCIs.

For the femtocell signaling and user data, LWA eNodeB 422 applies RoHC compression/decompression to the user data (F-S2a(2) and F-S5(2)) that traverses the femtocell's PMIP GRE tunnels. LWA eNodeB 422 applies general compression/decompression to the femtocell LTE signaling (F-S1-MME(2), F-X2(2), F-S11(2), F-S15(2), F-PMIP (2), and F-Gz/Gy(2)) that traverses the signaling tunnel. L-SGW/MAG 801 terminates the P-S1U having picocell user data, femtocell user data, and femtocell signaling. L-SGW 801, Ethernet system 804, and LTE UE 405 exchange the femtocell data over the F-S5 and F-S2a PMIP GRE tunnels using the requisite QCI/DSCP QoS. L-SGW 801, Ethernet system 804, and LTE UE 405 exchange the femtocell signaling over the femto signaling tunnel using the requisite QCI/DSCP QoS.

L-SGW/MAG 801 has a Children's Internet Protection Act (CIPA) filter application to filter user data. Macrocell PCRF 435 has a CIPA pitcher that transfers CIPA filter flags and configuration data to L-PCRF 803 over the P-S15 links. L-PCRF 803 transfers the CIPA filter flags and configuration data to the CIPA application in L-SGW 801. L-SGW 801 filters the P-S1U using in the CIPA filter application as configured by macro PCRF 435.

Figure 9:
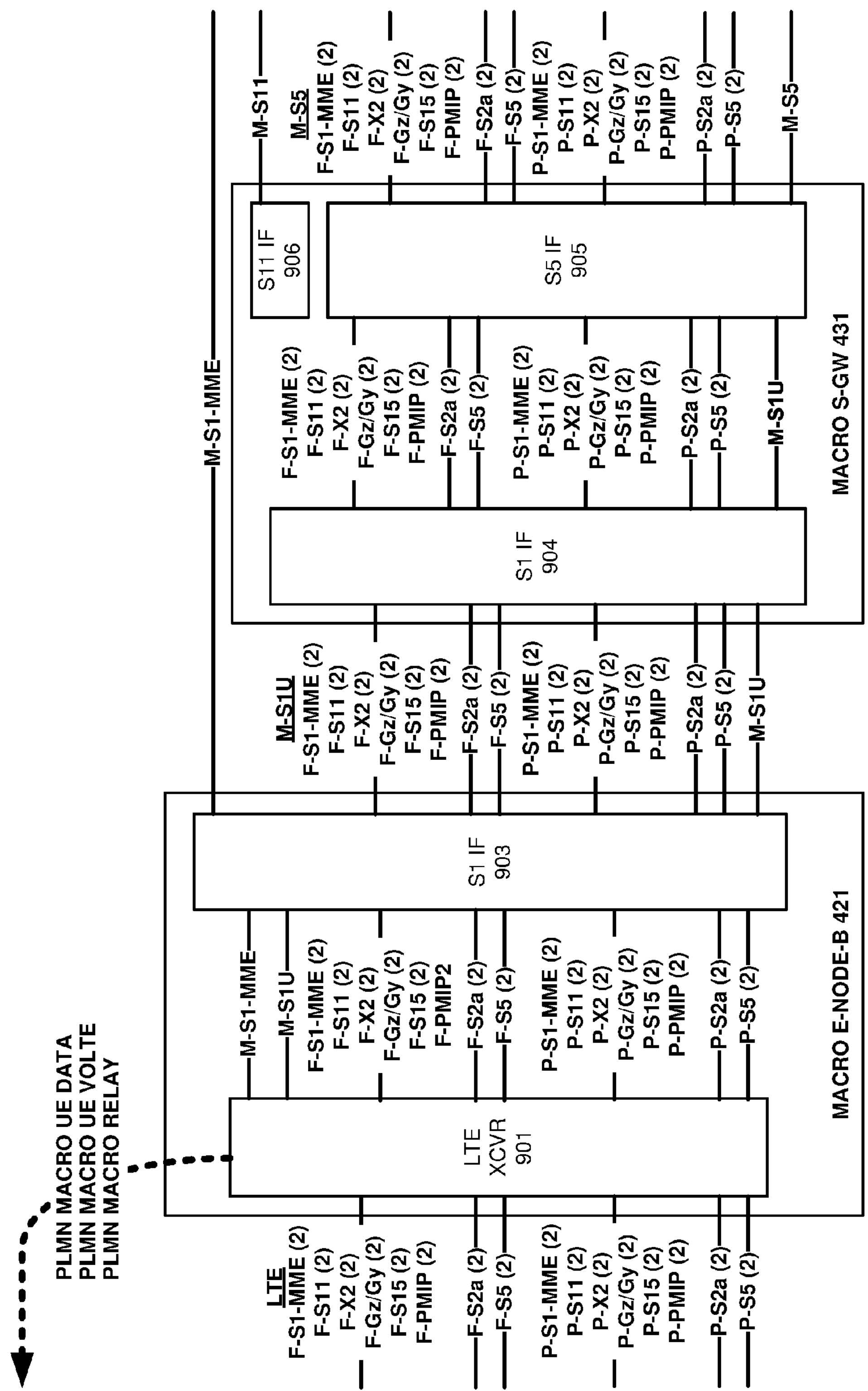

FIG. 9 illustrates macrocell eNodeB 421 and S-GW 431. Macrocell eNodeB 421 comprises LTE transceiver 901 and S1 interface 903. S-GW 431 comprises S1 interface 904, S5 interface 905, and S11 interface 906. LTE transceiver 901 exposes LTE interfaces to UEs, femtocell relays, and picocell relays. LTE transceiver 901 broadcasts LTE PLMN IDs for MACRO UE DATA, MACRO UE VOLTE, and MACRO RELAY.

For the typical UE, LTE transceiver 901 exchanges its LTE signaling and user data (M-S1-MME and M-S1U) with S1 interface 903. For femtocell and picocell relays, LTE transceiver 901 applies RoHC compression/decompression to the user data that traverses F-S5(2), F-S2a(2), P-S5(2), and P-S2a(2) PMIP GRE tunnels. LTE transceiver 901 applies general compression/decompression to the femtocell and picocell signaling (F-S1-MME(2), F-S11(2), F-PMIP (2), F-X2(2), F-Gz/Gy(2), F-S15(2), P-S1-MME(2), P-S11 (2), P-PMIP (2), P-X2(2), P-Gz/Gy(2), and P-S15(2)) exchanged over the LTE signaling tunnels. LTE transceiver 901 and S1 interface 903 exchange the femtocell and picocell signaling and user data.

S1 interface 903 exchanges macro signaling (M-S1-MME) with MME 432. S1 interface 903 exchanges user data (M-S1U) with S1 interface 904 of S-GW 431. The M-S1U interface transports the femtocell and picocell signaling and user data (F-S1-MME(2), F-S11(2), F-PMIP (2), F-X2(2), F-Gz/Gy(2), F-S15(2), P-S1-MME(2), P-S11(2), P-PMIP (2), P-X2(2), P-Gz/Gy(2), P-S15(2), F-S5(2), F-S2a(2), P-S5(2), and P-S2a(2)). S1 interface 904 exchanges the femtocell and picocell signaling and user data with S5 interface 905. S5 interface 905 exchanges user data (M-S5) with P-GW 434. The M-S5 interface transports the femtocell and picocell signaling and user data. S11 interface 906 exchanges macro signaling (M-S11) with MME 432.

Macro eNodeB 421 and S-GW 431 apply LTE QoS to the bearers as indicated by the specified QCIs. Macro eNodeB 421 and S-GW 431 exchange the LTE signaling using QCI 5. Macro eNodeB 421 and S-GW 431 exchange the F-S5/2a and P-S5/2a user data using QCI 1, QCI 5, QCI 9, or some other data QoS.

Figure 10:
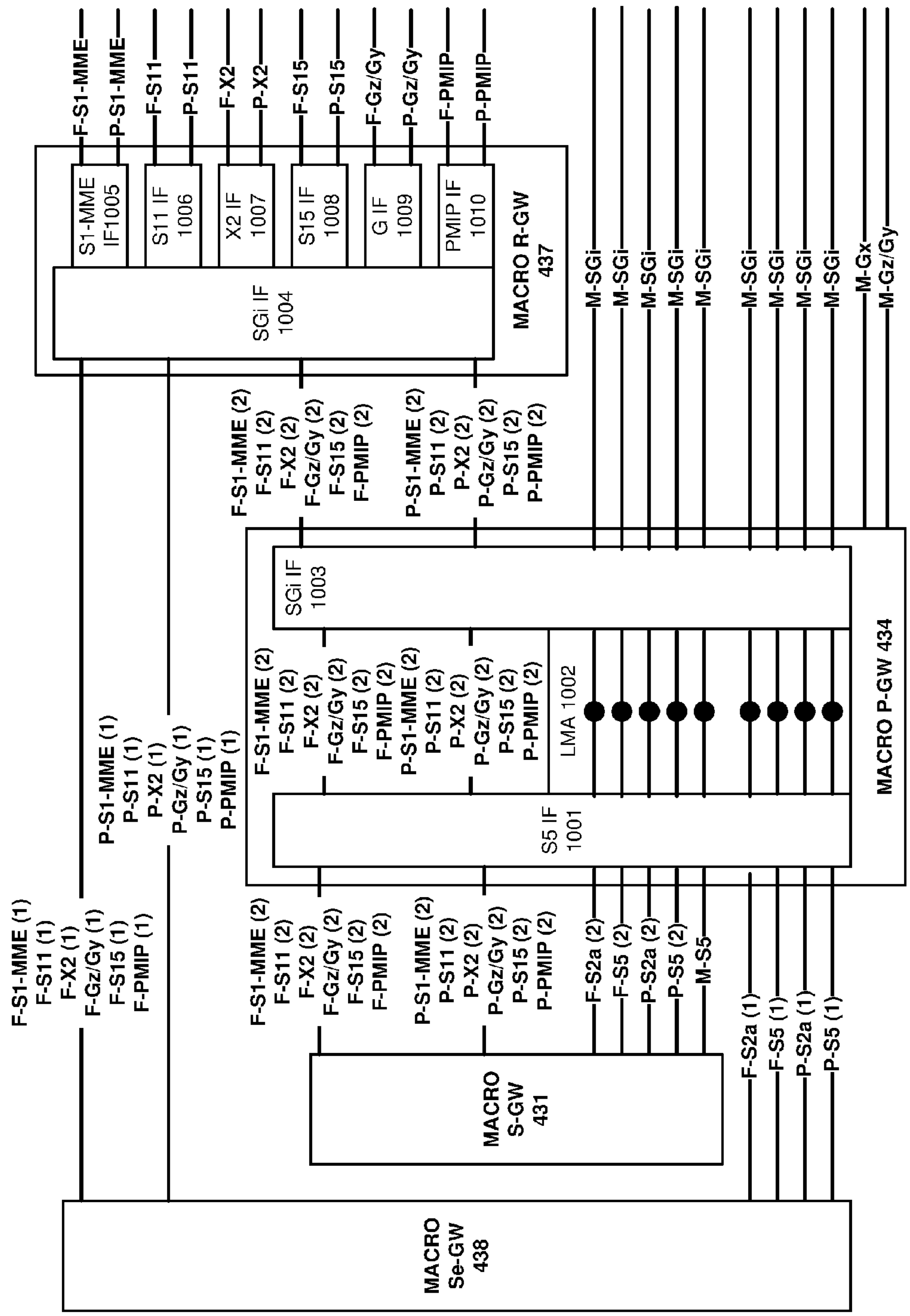

FIG. 10 illustrates macrocell P-GW 434 and R-GW 437. Macro S-GW 431 and Se-GW 438 are shown again for reference. Macrocell P-GW 434 comprises S5 interface 1001, Local Mobility Anchor (LMA) 1002, and SGi interface 1003. R-GW 437 comprises SGi interface 1004, S1-MME interface 1005, S11 interface 1006, X2 interface 1007, S15 interface 1008, G interface 1009, and PMIP interface 1010. Macrocell P-GW 434 exchanges its M-Gx data with PCRF 435 and exchanges its M-Gz/Gy data with ACCT 436.

In P-GW 434, S5 interface 1001 exchanges the user data (F-S2a(1)(2), F-S5(1)(2), P-S2a(1)(2), and P-S5(1)(2)) with LMA 1002 for PMIP GRE tunnel termination. LMA 1002 exchanges the user data with SGi interface 1003. SGi interface 1003 performs functions like routing and filtering on the user data for exchange with the Internet, IMS, or some other system over the SGi links.

In P-GW 434, S5 interface 1001 exchanges LTE signaling (F-S1-MME(2), F-S11(2), F-PMIP (2), F-X2(2), F-Gz/Gy (2), F-S15(2), P-S1-MME(2), P-S11(2), P-PMIP (2), P-X2 (2), P-Gz/Gy(2), and P-S15(2)) with SGi interface 1003. SGi interface 1003 exchanges the LTE signaling with SGi interface 1004 in R-GW 437. In R-GW 437, SGi interface 1004 also receives LTE signaling (F-S1-MME(1), F-S11(1), F-X2(1), F-Gz/Gy(1), F-S15(1), F-PMIP (1), P-S1-MME (1), P-S11(2), P-X2(1), P-Gz/Gy(1), P-S15(1), and P-PMIP (1)) from Se-GW 438. SGi interface 1004 performs functions like routing and filtering on the LTE signaling.

SGi interface 1004 exchanges the LTE signaling with proxy interfaces 1005-1010, and proxy interfaces 1005-1010 exchange the LTE signaling with various systems. Proxy interfaces 1005-1010 aggregate the LTE signaling that was exchanged over the LAN/WAN backhaul and over the LWA/LTE backhaul. S1-MME interface 1005 exchanges the F-S1-MME and P-S1-MME signaling with MME 432. S11 interface 1006 exchanges F-S11 and P-S11 signaling with MME 432. X2 interface 1007 exchanges F-X2 and P-X2 signaling with macrocell eNodeB 421. S15 interface 1008 exchanges F-S15 and P-S15 signaling with PCRF 435. G interface 1009 exchanges F-Gz/Gy and P-Gz/Gy signaling with ACCT 436. PMIP interface 1010 exchanges F-PMIP and P-PMIP signaling with P-GW 434 and other P-GWs.

Macro P-GW 434 applies LTE QoS to the bearers as indicated by the specified QCIs. Macro P-GW 434 exchanges the LTE signaling using QCI 5. P-GW 434 exchanges the user data using a QCI 1, QCI 5, QCI 9, or some other data QoS. R-GW 437 applies a QCI 5 type QoS to its signaling data.

The VoLTE P-GWs are configured in a similar manner to P-GW 434. The VoLTE P-GWs comprise S5 interfaces, LMAs, and SGi interfaces. The VoLTE P-GWs terminate the PMIP GRE tunnels to the femtocell and pico cell relays for user voice data and SIP/IMS signaling. The VoLTE P-GWs perform functions like routing and filtering on the user voice data and signaling for exchange over their SGi links. Typically, the VoLTE P-GWs do not backhaul femtocell and picocell LTE signaling. The VoLTE P-GWs apply LTE QoS to the bearers as indicated by the specified QCIs/DSCPs. The VoLTE P-GWs exchanges the IMS/SIP signaling using QCI 5. The VoLTE P-GWs exchanges the user voice data using a QCI 1.

Figure 11:
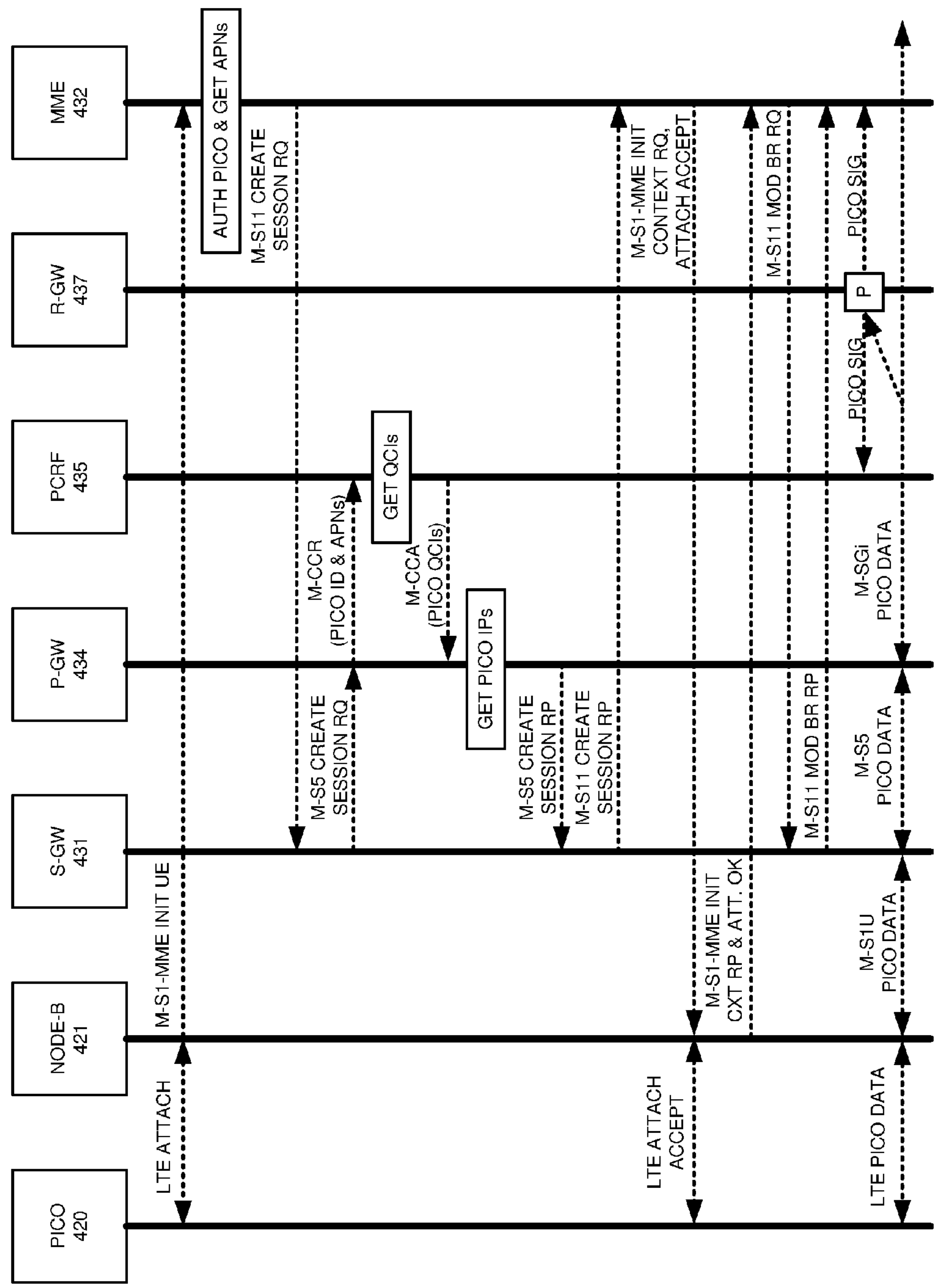

FIG. 11 illustrates picocell relay 420 attachment to macrocell eNodeB 421 to establish the picocell LTE data bearers and the picocell LTE signaling bearer. Picocell relay 420 may also attach to the LAN/WAN and Se-GW 437. These LAN/WAN/LTE attachments could be standard and are not shown for clarity. Picocell relay 420 responds to the PLMN ID of MACRO-RELAY from eNodeB 421 during an LTE attachment session. Picocell relay 420 transfers information for MME 432 to eNodeB 421 in a Non-Access Stratum (NAS) message during the attachment. In response to the LTE attachment, eNodeB 423 transfers a Macro (M) S1-MME initial UE message containing the NAS message to MME 432. MME 432 authorizes picocell relay 420 and retrieves the picocell DATA APN and the picocell signaling (SIG) APN from HSS 433.

MME 432 selects P-GW 434 and a VoLTE P-GW based on the picocell DATA APN and transfers an M-S11 create session request (RQ) having the picocell APNs to S-GW 431. Responsive to the M-S11 create session request, S-GW 431 transfers a corresponding M-S5 create session request having the picocell APNs to P-GW 434. P-GW 434 transfers a Macro (M) Credit Control Request (CCR) with the picocell ID and APNs DATA and SIG to PCRF 435. PCRF returns a Macro Credit Control Answer (M-CCA) that indicates QCI 9 for the DATA APN and QCI 5 for the SIG APN. P-GW 434 selects IP addresses for picocell relay 420 and transfers the pico IP addresses, APNs, and QCIs to S-GW 431 in an M-S5 create session response (RP). S-GW 431 transfers the pico IP addresses, APNs, and QCIs for picocell relay 420 to MME 432 in an M-S11 create session response.

In response to the M-S11 create bearer request for QCIs 9 and 5, MME 432 transfers an M-S1-MME message to eNodeB 421. The M-S1-MME message has an initial context set-up request and Attach (ATT) acceptance that indicate the pico IP addresses, APNs, and QCIs for picocell relay 420. In response to the S1-MME message, eNodeB 421 and picocell 420 perform an LTE attach acceptance session that delivers the pico IP addresses, APNs, and QCIs to picocell relay 420. In response to the LTE attach acceptance, eNodeB 421 transfers an S1-MME initial context response and attach complete (OK) message to MME 432. In response, MME 432 transfers an M-S11 modify bearer request to S-GW 431 which returns an M-S11 modify bearer response to MME 432.

Picocell relay 420 may now exchange picocell user data with P-GW 434 over the PMIP GRE tunnel that traverses the LTE/M-S1U/M-S5 interfaces of eNodeB 421 and S-GW 431. P-GW 434 exchanges the user data with external systems. Picocell relay 420 may now exchange picocell signaling with R-GW 437 over the signaling bearer that traverses the LTE/M-S1U/M-S5/M-SGi interfaces of eNodeB 421, S-GW 431, and P-GW 434. R-GW 437 exchanges this picocell signaling with eNodeB 421, MME 432, P-GW 434, PCRF 435, and ACCT 436.

Figure 14:
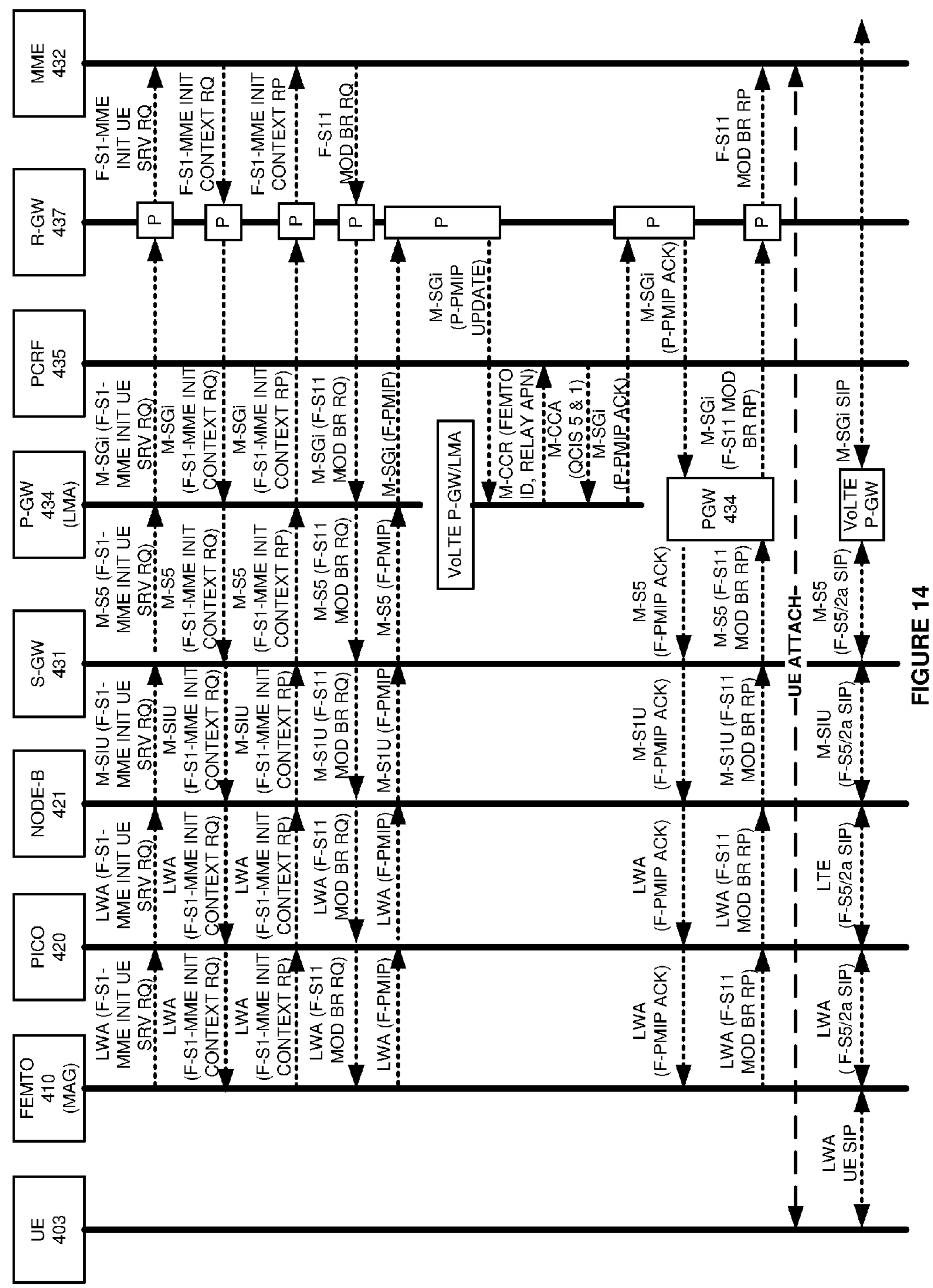

Although not shown for clarity, picocell relay 420 uses its P-S1-MME interface to initiate a VoLTE service request to MME 432 after its LTE attachment is complete. MME 432 and picocell relay 420 then interact to establish VoLTE PMIP GRE tunnels between picocell L-SGW/MAG 801 and the VoLTE P-GW/LMA over the LTE/S1U/S5 interface. Typically, picocell L-SGW/MAG 801 and the VoLTE P-GW/LMA establish another VoLTE PMIP GRE tunnel over the LAN/WAN. FIG. 14 shows this service request procedure for femtocell relay 410.

Figure 12:
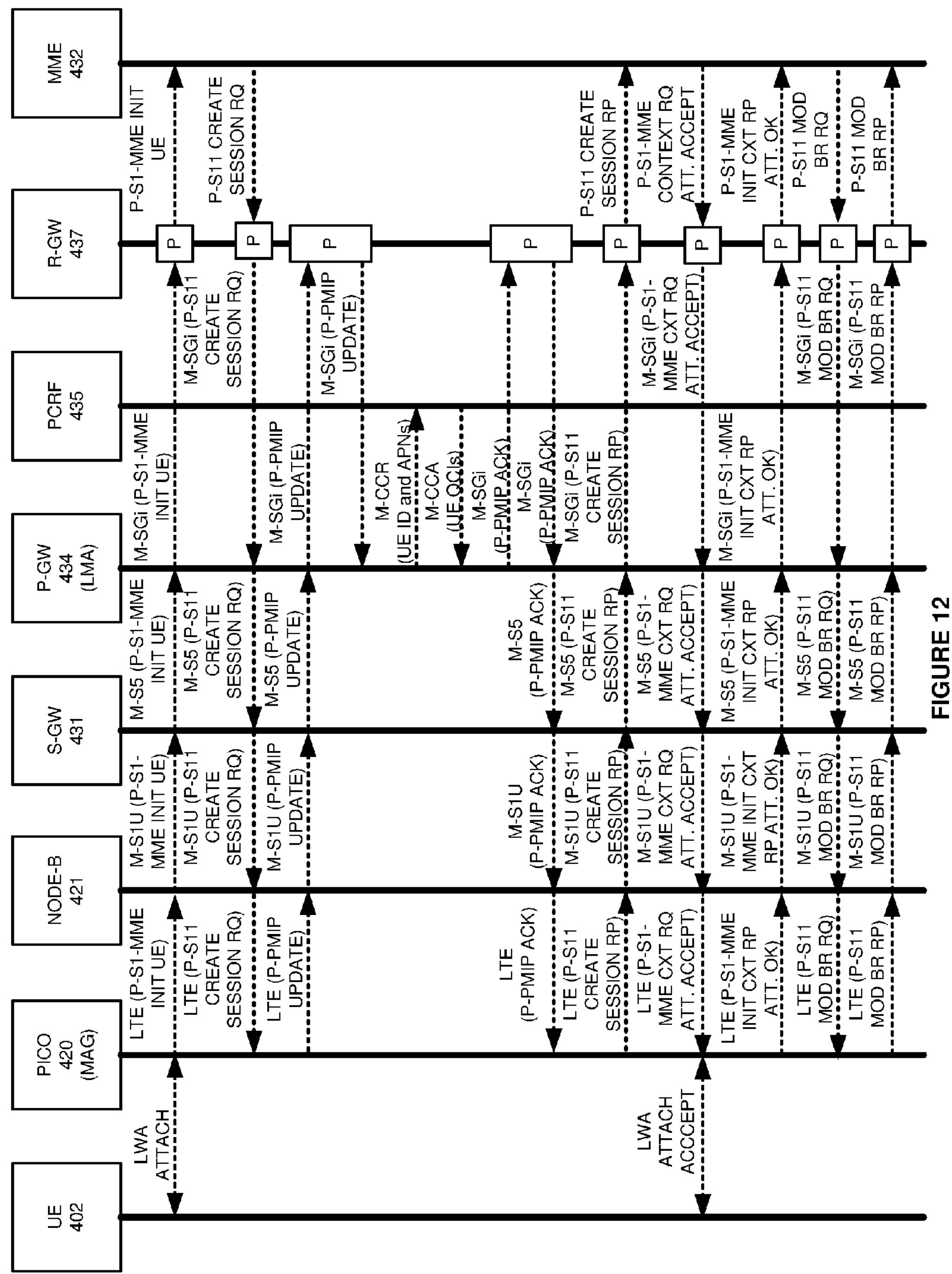

FIG. 12 illustrates UE 402 attachment to picocell 420 to use the PMIP GRE data tunnel. UE 402 responds to the SSIDs or PLMN IDs of PICO UE DATA and PICO UE VoLTE from picocell relay 420 (eNodeB 422) during an LWA attachment session. UE 402 transfers information for MME 432 in a NAS message during LWA attachment. In response to the UE attachment, picocell relay 420 selects R-GW 437 and transfers a Picocell (P) S1-MME initial UE message containing the NAS message to R-GW 437. The P-S1-MME message uses the picocell signaling bearer that traverses the LTE/S1U/S5/SGi interfaces of eNodeB 421, S-GW 431, and P-GW 434. The P-S1-MME initial UE message indicates the IP address for picocell relay 420. R-GW 437 transfers the P-S1-MME initial UE message to MME 432.

MME 432 authorizes UE 402 and retrieves UE APNs DATA and VOLTE from HSS 433 based on the UE ID and the SSID/PLMN IDs. In some examples, additional UE APNs are implemented like VIDEO. MME 432 responds to R-GW 437 with the UE APNs in a P-S11 create session request. R-GW 437 transfers the P-S11 create session request with the UE 402 APNs to picocell relay 420 (L-SGW 801) over the picocell signaling bearer that traverses the SGi/S5/S1U/LTE interfaces of P-GW 434, S-GW 431, and eNodeB 421.

In response to the P-S11 create session message, picocell relay 420 (MAG 801) transfers a P-PMIP proxy binding update message to P-GW 434 (LMA 1002) over the picocell signaling bearer that traverses the LTE/S1U/S5/SGi interfaces of eNodeB 421, S-GW 431, P-GW 434, and R-GW 437. The P-PMIP proxy binding update indicates the IP address of picocell relay 420. In response to the P-PMIP proxy binding update, P-GW 434 (LMA 1002) selects IP addresses for UE 402 and binds UE 402 to the picocell 420 IP address. P-GW 434 sends an M-CCR with the UE ID and APNs to PCRF 435. PCRF 435 returns a CCA for UE 402 that indicates QCI 9 the DATA APN and QCIs 5 and 1 for the VOLTE APN.

P-GW 434 (LMA 1002) returns a P-PMIP proxy binding acknowledgement (ACK) to picocell relay 420 over the picocell signaling bearer that traverses the SGi/S5/S1U/LTE interfaces of R-GW 437, P-GW 434, S-GW 431, and eNodeB 421. The PMIP acknowledgement indicates the UE 402 IP addresses, APNs, and QCIs. In response to the P-PMIP acknowledgement, picocell relay 420 (L-SGW 801) transfers a P-S11 create session response to R-GW 437 over the picocell signaling bearer that traverses the LTE/S1U/S5/SGi interfaces of eNodeB 421, S-GW 431, and P-GW 434. R-GW 437 transfers the P-S11 create session response to MME 432.

In response to the P-S11 create session response for the UE QCIs, MME 432 returns a P-S1-MME message to R-GW 437. The P-S1-MME message has an initial context request and attach acceptance and indicates the IP addresses, APNs, and QCIs for UE 402. R-GW 437 transfers the P-S1-MME message to picocell relay 420 over the picocell signaling bearer that traverses the SGi/S5/S1U/LTE interfaces of P-GW 434, S-GW 431, and eNodeB 421.

In response to the P-S1-MME message, UE 402 and picocell 420 (eNodeB 422) perform an LWA attach acceptance session over LTE or WiFi that delivers the UE IP addresses, APN DATA/QCI 9, and APN VOLTE/QCI 5 & 1 to UE 402. In response to the LTE attach acceptance, picocell relay 420 (eNodeB 422) transfers a P-S1-MME initial context response and attach complete message to R-GW 437 over the picocell signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 over the picocell signaling bearer that traverses the SGi/S5/S1U/LTE interfaces of P-GW 434, S-GW 431, and eNodeB 421. In response to the P-S11 modify bearer request, picocell relay 420 (L-SGW 801) transfers a modify bearer response to R-GW 437 over the picocell signaling bearer that traverses the LTE/S1U/S5 interfaces of eNodeB 421, S-GW 431, and P-GW 434. R-GW 437 transfers the P-S11 modify bearer response to MME 432.

Although not shown for clarity, UE 402 may exchange user data with picocell relay 420 over LWA based on QCIs 1, 5, and 9. Picocell relay 420 may exchange the user data with P-GW 434 over the PMIP GRE tunnel that traverses the LTE/S1U/S5 interfaces of eNodeB 421 and S-GW 431 based on QCI 9. Picocell relay 420 may exchange IMS signaling with the VoLTE P-GW (and IMS) over the VoLTE PMIP GRE tunnel that traverses the LTE/S1U/S5 interfaces of eNodeB 421 and S-GW 431 based on QCI 5. Picocell relay 420 may exchange voice data with the VoLTE P-GW over the VoLTE PMIP GRE tunnel that traverses the LTE/S1U/S5 interfaces of eNodeB 421 and S-GW 431 based on QCI 1.

Figure 13:
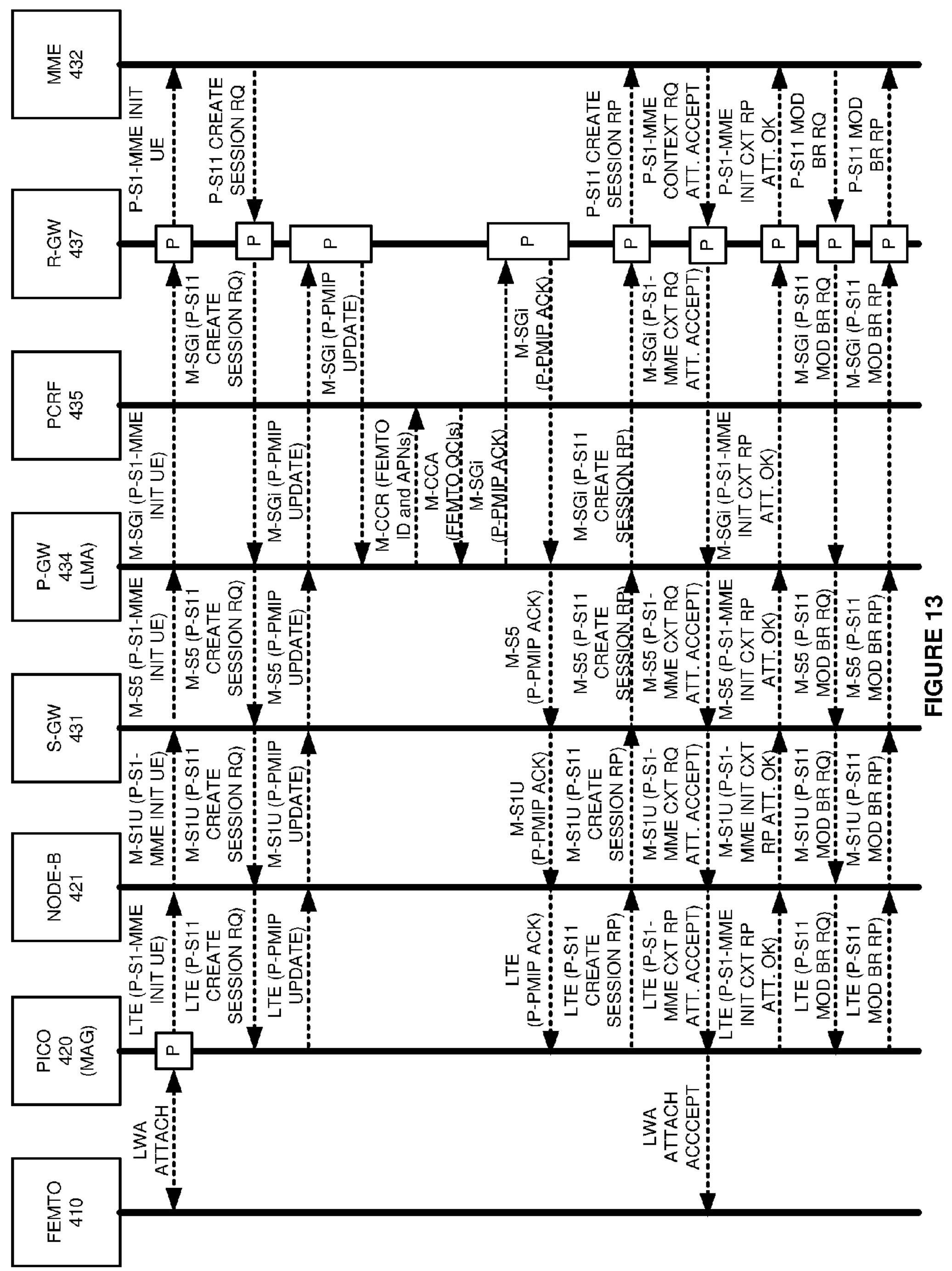

FIG. 13 illustrates femtocell relay 410 attachment to picocell relay 420 to establish the femtocell user data bearer and the femtocell signaling bearer. Femtocell relay 420 also attaches to the LAN/WAN and Se-GW 437. These LAN/WAN/LTE attachments could be standard and are not shown for clarity. Femtocell relay 410 responds to the SSID or PLMN ID of PICO-RELAY from picocell 420 (eNodeB 422) during an LWA attachment session using LTE or WiFi. Femtocell 410 transfers information for MME 432 in a NAS message during LWA attachment. In response to the femtocell attachment, picocell relay 420 transfers a P-S1-MME initial UE message containing the NAS message to R-GW 437. The P-S1-MME message uses the femtocell signaling bearer traverses the LTE/S1U/S5/SGi interfaces of eNodeB 421, S-GW 431, and P-GW 434. R-GW 437 transfers the P-S1-MME initial UE message to MME 432.

MME 432 authorizes femtocell relay 410 and retrieves the femtocell APNs DATA and SIG from HSS 433. MME 432 selects P-GW 434 and a VoLTE P-GW based on the femtocell DATA APN. MME 432 responds to R-GW 437 with the femtocell APNs in a P-S11 create session request. R-GW 437 transfers the P-S11 create session request with the femtocell APNs to picocell relay 420 (L-SGW 801) over the picocell signaling bearer that traverses the SGi/S5/S1U/LTE interfaces of P-GW 434, S-GW 431, and eNodeB 421. In response to the P-S11 create session request, picocell relay 420 (MAG 801) transfers a P-PMIP proxy binding update message to P-GW 434 (LMA 1002) over the picocell signaling bearer that traverses the LTE/S1U/S5/SGi interfaces through eNodeB 421, S-GW 431, P-GW 434, and R-GW 437. The P-PMIP proxy binding update indicates the IP address for picocell relay 420.

In response to the P-PMIP proxy binding update, P-GW 434 (LMA 1002) selects IP addresses for femtocell relay 410 and binds femtocell relay 410 to the IP address for picocell relay 420. P-GW 434 sends an M-CCR to PCRF 435 for the femtocell DATA and SIG APNs. PCRF 435 returns an M-CCA for femtocell relay 410 that typically indicates QCI 9 for the femtocell data APN and QCI 5 for the femtocell signaling APN.

P-GW 434 (LMA 1002) returns a P-PMIP proxy binding acknowledgement to picocell relay 420 over the picocell signaling bearer that traverses the SGi/S5/S1U/LTE interfaces of R-GW 437, P-GW 434, S-GW 431, and eNodeB 421. The PMIP acknowledgement indicates the femtocell relay IP addresses, APNs, and QCIs. In response to the P-PMIP acknowledgement, picocell relay 420 (L-SGW 801) transfers a P-S11 create session response to R-GW 437 over the picocell signaling bearer that traverses the LTE/S1U/S5/SGi interfaces of eNodeB 421, S-GW 431, and P-GW 434. R-GW 437 transfers the P-S11 create session response to MME 432.

In response to the P-S11 create bearer request for QCIs 5 and 9, MME 432 returns a P-S1-MME message to R-GW 437. The P-S1-MME message has an initial context request and attach acceptance that indicate the IP addresses, APNs, and QCIs for femtocell relay 410. R-GW 437 transfers the P-S1-MME message to picocell relay 420 over the picocell signaling bearer that traverses the SGi/S5/S1U/LTE interfaces of P-GW 434, S-GW 431, and eNodeB 421.

In response to the P-S1-MME message, femtocell relay 410 (UE 404) and picocell relay 420 (eNodeB 422) perform an LWA attach acceptance session over LTE or WiFi that delivers the IP addresses, APNs, and QCIs for femtocell relay 410 to femtocell relay 410. In response to the LWA attach acceptance, picocell relay 420 (eNodeB 422) transfers a P-S1-MME initial context response and attach complete (OK) message to R-GW 437 over the picocell signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 over the picocell signaling bearer that traverses the SGi/S5/S1U/LTE interfaces of P-GW 434, S-GW 431, and eNodeB 421. In response to the P-S11 modify bearer request, picocell relay 420 (L-SGW 801) transfers a modify bearer response to R-GW 437 over the picocell signaling bearer that traverses the LTE/S1U/S5/SGi interfaces of eNodeB 421, S-GW 431, and P-GW 434. R-GW 437 transfers the P-S11 modify bearer response to MME 432.

Although not shown for clarity, femtocell relay 410 may exchange user data with P-GW 434 over the PMIP GRE data bearer that traverses the LWA/LTE/S1U/S5 interfaces of picocell relay 420, eNodeB 421, and S-GW 431. Femtocell relay 410 may also exchange femtocell signaling with R-GW 437 over the femtocell signaling bearer that traverses the LWA/LTE/S1U/S5/SGi interfaces of picocell relay 420, eNodeB 421, S-GW 431, and P-GW 434. As shown below, femtocell relay 420 will send a F-S1-MME service request to establish a VoLTE PMIP GRE bearer to the selected VoLTE P-GW after the modify bearer messaging is complete.

FIG. 14 illustrates VoLTE service provisioning for femtocell relay 420. After LTE attachment, femtocell relay 420 (eNodeB 423), transfers an F-S1-MME initial UE service request containing a NAS message with a VoLTE request to R-GW 437. The F-S1-MME initial UE service request uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE service request for VoLTE to MME 432.

In response to the F-S1-MME initial UE service request for VoLTE, MME 432 selects a VoLTE P-GW/LMA for femtocell relay 410 to provide VoLTE QoS to attaching UEs. In response to the VoLTE service request, MME 432 also returns an F-S1-MME initial context request to R-GW 437. R-GW 437 transfers the F-S1-MME initial context request to femtocell relay 410 (eNodeB 423) over the femtocell signaling bearer that traverses the SGi/S5/S1U/LTE/LWA interfaces of P-GW 434, S-GW 431, eNodeB 421, and picocell relay 420.

In response to the F-S1-MME initial context request, femtocell relay 410 (eNodeB 423) returns an F-S1-MME initial context response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial context response to MME 432. In response to the F-S1-MME initial context response, MME 432 transfers an F-S11 modify bearer request indicating the VoLTE P-GW to R-GW 437. R-GW 437 transfers the F-S11 modify bearer request to femtocell relay 410 (L-SGW 701) over the femtocell signaling bearer that traverses the SGi/S5/S1U/LTE/LWA interfaces of P-GW 434, S-GW 431, eNodeB 421, and picocell relay 420.

In response to the F-S11 modify bearer request identifying the VoLTE P-GW, femtocell relay 410 (L-SGW 701) transfers an F-PMIP proxy binding update over the femtocell signaling bearer to the identified VoLTE P-GW/LMA. The F-PMIP proxy binding update traverses the LWA/LTE/S1U/S5/SGi interfaces of picocell relay 420, eNodeB 421, S-GW 431, P-GW 434, and R-GW 437. The F-PMIP proxy binding update indicates the IP address of femtocell relay 410 and APN DATA. In response to the F-PMIP update message, the VoLTE P-GW/LMA sends an M-CCR to PCRF 435 with the femto APN DATA and obtains an M-CCA for femtocell relay 410. The M-CCA is for one or more QCI 5 signaling bearers and QCI 1 voice bearers over the VoLTE PMIP GRE tunnel between femtocell relay 410 and the VoLTE P-GW/LMA.

The VoLTE P-GW/LMA returns an F-PMIP acknowledgement to femtocell relay 410 over the femtocell signaling bearer that traverses the SGi/S5/S1U/LTE/LWA interfaces of R-GW 437, P-GW 434, S-GW 431, eNodeB 421, and picocell relay 420. In response to the F-PMIP acknowledgement, femtocell relay 410 (L-SGW 701) transfers an F-S11 modify bearer response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S11 modify bearer response to MME 432.

After UE 403 performs LWA attachment (FIG. 15), UE 403 may then exchange Session Initiation Protocol (SIP) signaling with femtocell relay 410 over LWA using LTE or WiFi by using its VoLTE APN and QCI 5 signaling bearer. Femtocell relay 410 and the VoLTE P-GW exchange the SIP signaling over the VoLTE PMIP GRE tunnel based on QCI 5. The VoLTE P-GW/LMA typically exchanges the SIP signaling with an IMS (not shown) over an M-SGi link. If an IMS session is established (FIG. 17), then UE 403 may exchange voice data with femtocell relay 410 over LWA using LTE or WiFi by using its VoLTE APN and QCI 1 voice bearer. Femtocell relay 410 and the VoLTE P-GW exchange the voice data signaling over the VoLTE PMIP GRE tunnel based on QCI 1. The VoLTE P-GW/LMA typically exchanges the voice data with a data network over an M-SGi link.

Figure 15:
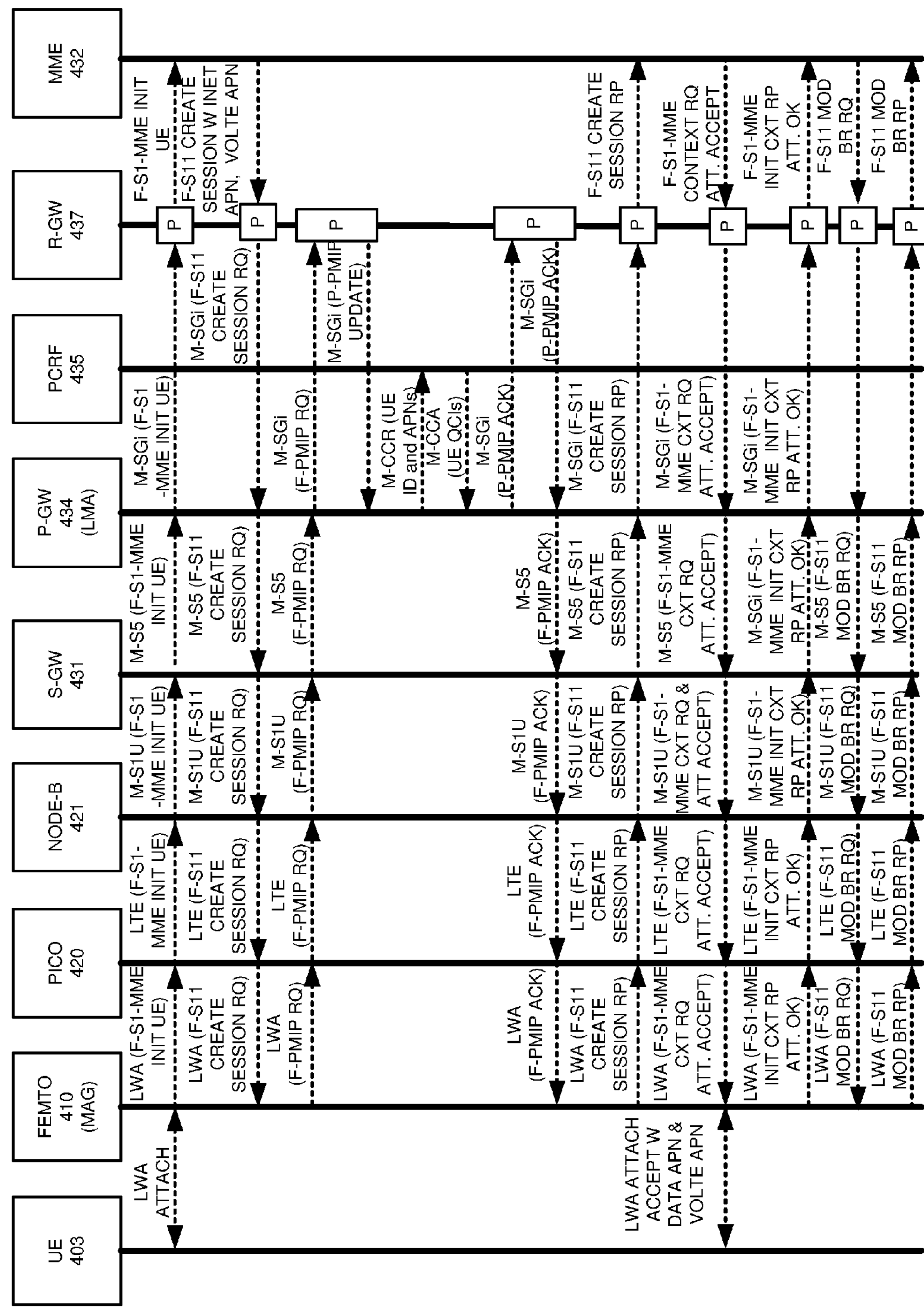

FIG. 15 illustrates UE 403 attachment to femtocell 420 to use the femtocell PMIP GRE data bearer. UE 403 responds to the SSIDs or PLMN IDs of FEMTO UE DATA and FEMTO UE VOLTE from femtocell relay 410 (eNodeB 423) during an LWA attachment session. UE 403 transfers information for MME 432 in a NAS message during LWA attachment. In response to UE 403 attachment, femtocell relay 410 transfers a Femto (F) S1-MME initial UE message containing the NAS message to R-GW 437. The F-S1-MME message uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE message to MME 432.

MME 432 authorizes UE 403 and retrieves UE APNs for DATA and VOLTE from HSS 433. MME 432 selects P-GW 434 for the DATA APN and a VoLTE P-GW for the VoLTE APN. MME 432 responds to R-GW 437 with the UE APNs and P-GW IDs in an F-S11 create session request. R-GW 437 transfers the F-S11 create session request with the UE APNs and P-GW IDs to femtocell relay 410 (L-SGW 701) over the femtocell signaling bearer that traverses the SGi/S5/S1U/LTE/LWA interfaces of P-GW 434, S-GW 431, eNodeB 421, and picocell relay 420.

In response to the P-S11 create session request, femtocell relay 410 (MAG 701) transfers an F-PMIP proxy binding update message to P-GW 434 (LMA 1002) over the femtocell signaling bearer that traverses the LWA/LTE/S1U/S5/SGi interfaces of picocell relay 420, eNodeB 421, S-GW 431, P-GW 434, and R-GW 437. The F-PMIP update indicates the IP address for femtocell relay 410 and the APN DATA for UE 403. In response to the F-PMIP proxy binding update message, P-GW 434 (LMA 1002) selects IP addresses for UE 403 and binds UE 403 to the IP address for femtocell relay 410. P-GW 434 sends an M-CCR to PCRF 435 having the UE 403 APNs. PCRF 435 returns an M-CCA for UE 403 that indicates QCI 9 for DATA and QCIs 5 and 1 for VOLTE.

P-GW 434 (LMA 1002) returns an F-PMIP acknowledgement to femtocell relay 410 over the femtocell signaling bearer that traverses the SGi/S5/S1U/LTE/LWA interfaces of R-GW 437, P-GW 434, S-GW 431, eNodeB, and pico-cell relay 420. The F-PMIP acknowledgement indicates the UE 403 IP addresses and QCIs, and in response to the F-PMIP acknowledgement, femtocell relay 410 (L-SGW 701) transfers an F-S11 create session response for the UE QCIs to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S11 create session response to MME 432.

In response to the F-S11 create session response with the UE QCIs, MME 432 returns an F-S1-MME message to R-GW 437. The F-S1-MME message has an initial context request and attach acceptance and indicates the IP addresses, APNs, QCIs, and P-GWs for UE 403. R-GW 437 transfers the F-S1-MME message to femtocell relay 410 over the femtocell signaling bearer that traverses the SGi/S5/S1U/LTE/LWA interfaces of P-GW 434, S-GW 431, eNodeB 421, and picocell relay 420.

In response to the F-S1-MME message, UE 403 and femtocell relay 420 (eNodeB 423) perform an LWA attach acceptance session over LTE or WiFi that delivers the UE IP addresses, P-GW IDs, APNs DATA and VOLTE, and QCIs 9, 5, and 1 to UE 403. In response to the LWA attach acceptance, femtocell relay 420 (eNodeB 423) transfers an F-S1-MME initial context response and attach complete message to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial context response and attach complete to MME 432.

In response to the F-S1-MME initial context response and attach complete, MME 432 transfers an F-S11 modify bearer request to R-GW 437. R-GW 437 transfers the F-S11 modify bearer request to femtocell relay 420 over the femtocell signaling bearer that traverses the SGi/S5/S1U/LTE/LWA interfaces of P-GW 434, S-GW 431, eNodeB 421, and picocell relay 420. In response to the F-S11 modify bearer request, femtocell relay 420 (L-SGW 701) transfers a modify bearer response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S11 modify bearer response to MME 432.

Although not shown for clarity, UE 403 may then exchange user data with femtocell relay 410 over LWA based on the DATA (QCI 9) and VoLTE APNs (QCI 5 and 1). Femtocell relay 410 may exchange user data with P-GW 434 over the PMIP GRE user data tunnel that traverses the LWA/LTE/S1U/S5 interfaces of picocell 420, eNodeB 421, and S-GW 431. Femtocell relay 410 may also exchange femtocell signaling for UE 403 with R-GW 437 over the signaling bearer that traverses the LWA/LTE/S1U/S5/SGi interfaces of picocell relay 420, eNodeB 421, S-GW 431, and P-GW 434.

Figure 16:
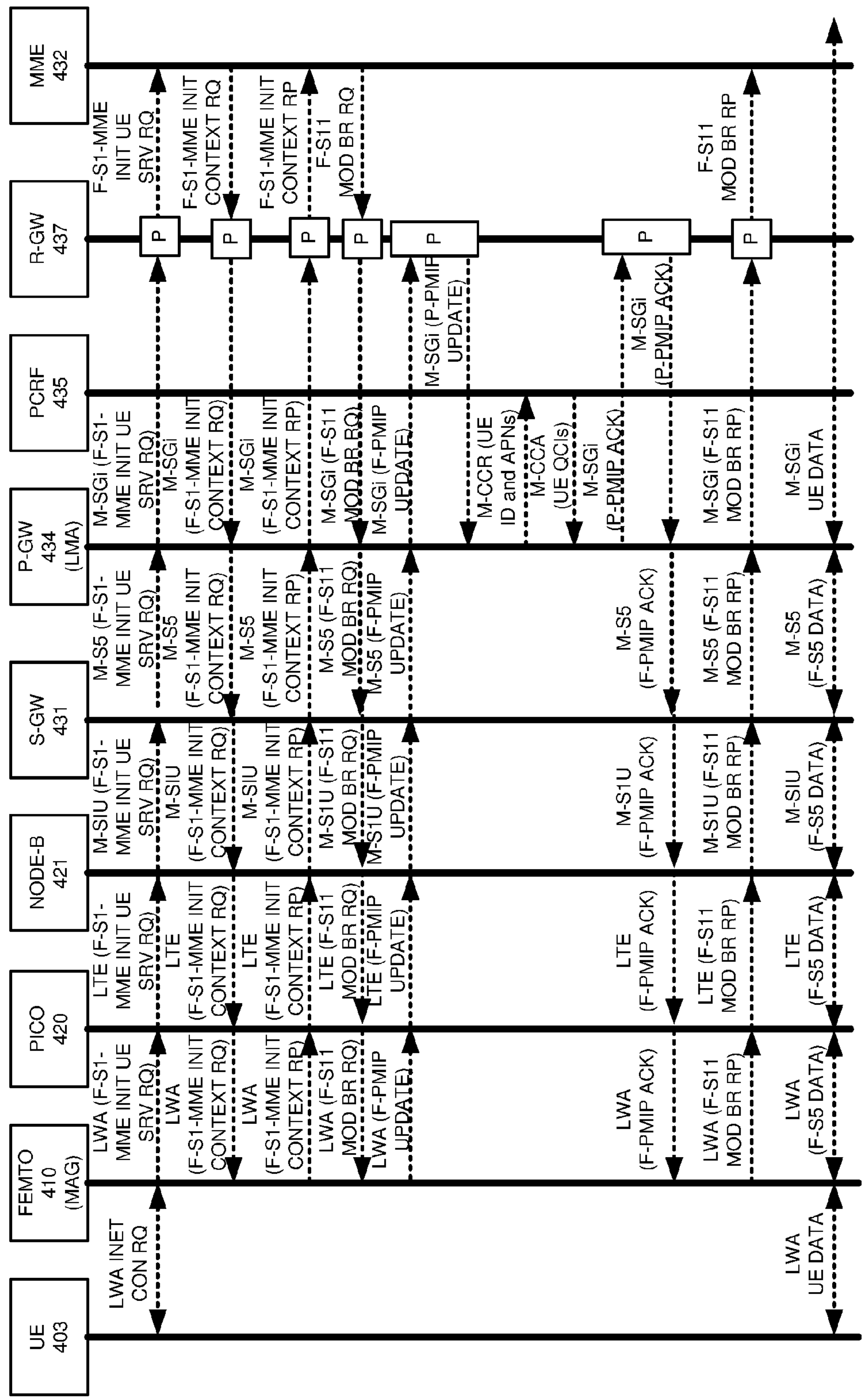

FIG. 16 illustrates UE 403 Internet service from femtocell relay 420. UE 403 transfers an LWA internet connection request to femtocell relay 410 (eNodeB 423). In response to the LWA internet connection request, femtocell relay 410 transfers an F-S1-MME initial UE service request containing a NAS message with the internet connection request to R-GW 437. The F-S1-MME message uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE service request to MME 432.

In response to the F-S1-MME initial UE service request for internet, MME 432 returns an F-S1-MME initial context request to R-GW 437. R-GW 437 transfers the F-S1-MME initial context request to femtocell relay 410 (eNodeB 423) over the femtocell signaling bearer that traverses the SGi/S5/S1U/lte/LWA interfaces of P-GW 434, S-GW 431, eNodeB 421, and picocell relay 420. In response to the F-S1-MME initial context request, femtocell relay 410 (eNodeB 423) returns an F-S1-MME initial context response to R-GW 437 over the femtocell signaling bearer that traverses the LWA/LTE/S1U/S5/M-SGi interfaces of picocell relay 420, eNodeB 421, S-GW 431, and P-GW 434. R-GW 437 transfers the F-S1-MME initial context response to MME 432.

In response to the F-S1-MME initial context response, MME 432 transfers an F-S11 modify bearer request to R-GW 437. R-GW 437 transfers the F-S11 modify bearer request to femtocell relay 410 (L-SGW 701) over the femtocell signaling bearer that traverses the SGi/S5/S1U/LTE/LWA interfaces of P-GW 434, S-GW 431, eNodeB 421, and picocell relay 420. In response to the F-S11 modify bearer request, femtocell relay 410 (L-SGW 701) transfers an F-PMIP proxy binding update over the femtocell signaling bearer that traverses the LWA/LTE/S1U/S5/SGi interfaces of picocell relay 420, eNodeB 421, S-GW 431, P-GW 434, and R-GW 437. The F-PMIP proxy binding update indicates the IP address for femtocell relay 410 and the UE APN DATA and the service request metrics. In response to the F-PMIP proxy binding update message, P-GW 434 (LMA 1002) selects IP addresses for UE 403 and binds UE 403 to the IP address for femtocell relay 410. P-GW 434 also sends an M-CCR with the APN DATA and the service request metrics for UE 403 to PCRF 435. PCRF returns an M-CCA for UE 403 that typically indicates QCI 9 for UE data, although the QCI may be upgraded based on the service request metrics or some other factor.

P-GW 434 (LMA 1002) returns an F-PMIP acknowledgement to femtocell relay 410 over the femtocell signaling bearer that traverses the SGi/S5/S1U/LTE/LWA interfaces of R-GW 437, P-GW 434, S-GW 431, eNodeB 421, and pico-cell relay 420. The F-PMIP acknowledgement indicates the UE 403 IP addresses and QCIs. In response to the F-PMIP acknowledgement, femtocell relay 410 (L-SGW 701) transfers an F-S11 modify bearer response to R-GW 437 over the femtocell signaling bearer that traverses the LTE/S1U/S5/SGi interfaces of picocell relay 420, eNodeB 421, S-GW 431, and P-GW 434. R-GW 437 transfers the F-S11 modify bearer response to MME 432.

UE 403 may then exchange user data with femtocell relay 410 over LWA based on the DATA APN and the specified QCI. Femtocell relay 110 exchanges the user data over the PMIP GRE tunnel with P-GW/MAG 434 based on QCI 9 or some other QCI as specified by PCRF 435.

Figure 17:
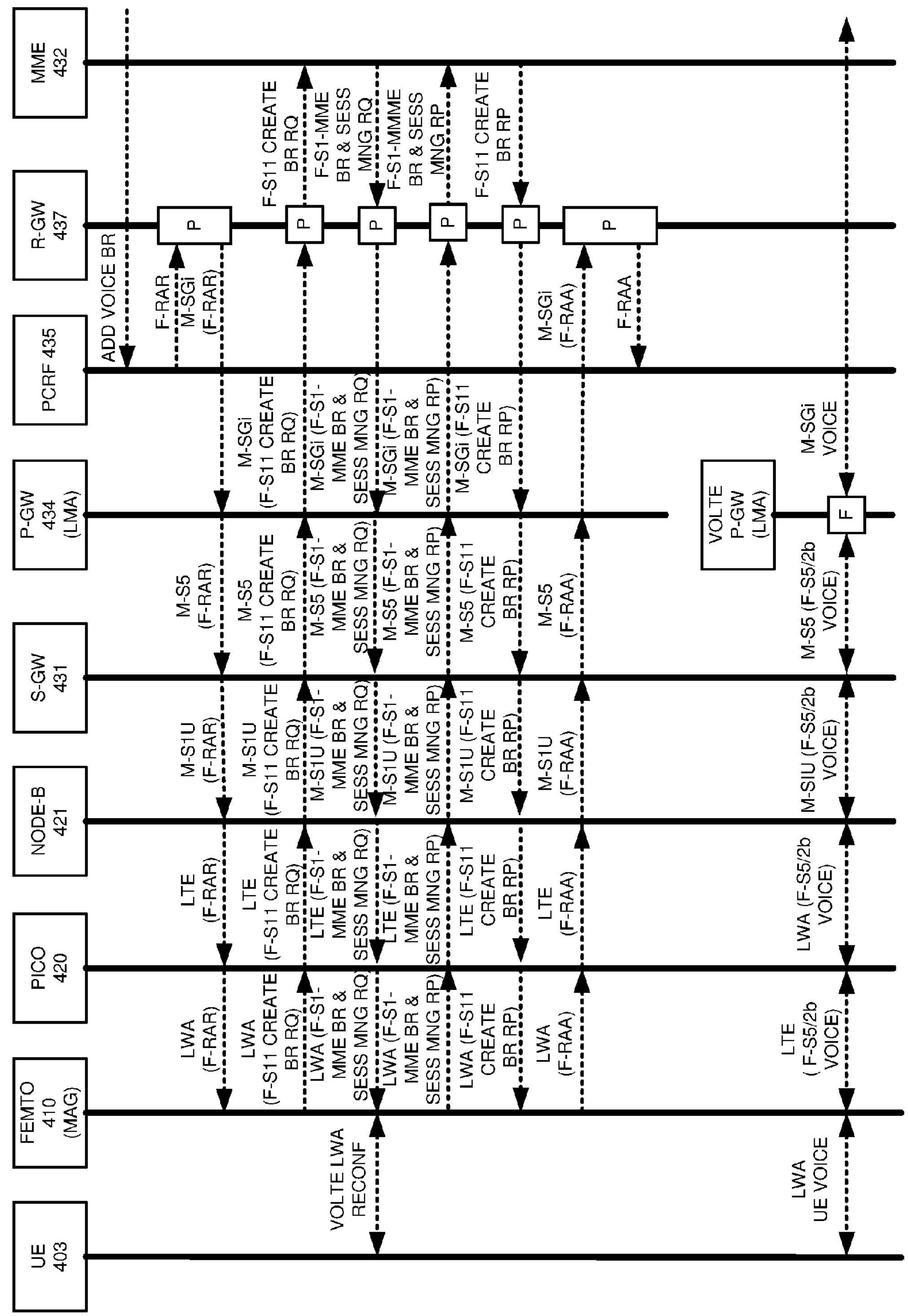

FIG. 17 illustrates UE 403 VoLTE service from femtocell relay 420. After LTE attachment, IMS registration, and SIP messaging by UE 403 (not shown), macro PCRF 435 receives an add VoLTE bearer request from IMS. In response to the VoLTE bearer request, macro PCRF 435 transfers a Femtocell Re-Authorization Request (F-RAR) for a VoLTE to R-GW 434. R-GW 434 transfers the F-RAR to femtocell relay 410 (L-PCRF 703) over the SGi/S5/S1U/LTE/LWA interfaces of P-GW 434, S-GW 431, eNodeB 421, and picocell relay 420.

In response to the F-RAR for VoLTE in femtocell relay 420, L-PCRF 703 transfers a gateway control request to L-SGW 701. In femtocell relay 420, L-SGW 701 responsively transfers an F-S11 create bearer request for VoLTE to MME 432. The F-S11 create bearer request traverses the LWA/LTE/S1U/S5/SGi interfaces of picocell relay 420, eNodeB 421, S-GW 431, and P-GW 434. R-GW 437 transfers the F-S11 create bearer request to MME 432.

In response to the M-S11 create bearer request for VoLTE, MME 432 transfers an F-S1-MME create bearer/session management request for VoLTE to R-GW 437 for eNodeB 423. R-GW 437 transfers the F-S1-MME create bearer/session management request to femtocell relay 410 (eNodeB 423) over the femtocell signaling bearer that traverses the SGi/S5/S1U/LTE/LWA interfaces of P-GW 434, S-GW 431, eNodeB 421, and picocell relay 420. In response to the F-S1-MME create bearer/session management request for VoLTE, femtocell relay 410 (eNodeB 423) sends a VoLTE LWA reconfiguration request to UE 403 and UE 403 reconfigures itself for a QCI 1 voice bearer on the LWA access link.

After VoLTE LWA reconfiguration, femtocell relay 410 (eNodeB 423) returns an F-S1-MME create bearer/session management response to R-GW 437 over the femtocell signaling bearer that traverses the LWA/LTE/S1U/S5/SGi interfaces of picocell relay 420, eNodeB 421, S-GW 431, and P-GW 434. R-GW 437 transfers the F-S1-MME create bearer/session management response to MME 432. In response to the F-S1-MME create bearer/session management response for VoLTE, MME 432 transfers an F-S11 create bearer response for VoLTE to R-GW 437. R-GW 437 transfers the F-S11 create bearer response to femtocell relay 410 (L-SGW 701) over the femtocell signaling bearer that traverses the SGi/S5/S1U/LTE/LWA interfaces of P-GW 434, S-GW 431, eNodeB 421, and picocell relay 420.

In response to the F-S11 modify bearer request for VoLTE in femtocell relay 410, L-SGW 701 transfers a gateway control response for VoLTE to L-PCRF 703. In femtocell relay 410, L-PCRF 703 responsively sends an F-RAA for VoLTE to PCRF 435 over the femtocell signaling bearer that traverses the LWA/LTE/S1U/S5/SGi interfaces of picocell relay 420, eNodeB 421, S-GW 431, P-GW 434, and R-GW 437.

UE 403 may now exchange user voice data with femtocell relay 410 over LWA using LTE or WiFi based on the VoLTE APN and QCI 1. Femtocell relay 410 and the VoLTE P-GW exchange the user voice over the VoLTE PMIP GRE tunnel based on QCI 1. In femtocell relay 410, L-SGW 701 maps the QCI 1 voice data on the LWA access link into a DSCP flow in the PMIP GRE tunnel that has a QCI 1-level QoS. The VoLTE P-GW/LMA exchanges the user voice data with external systems over its SGi interface. Other IMS services like video and audio data conferencing could be implemented in a similar manner.

Figure 18:
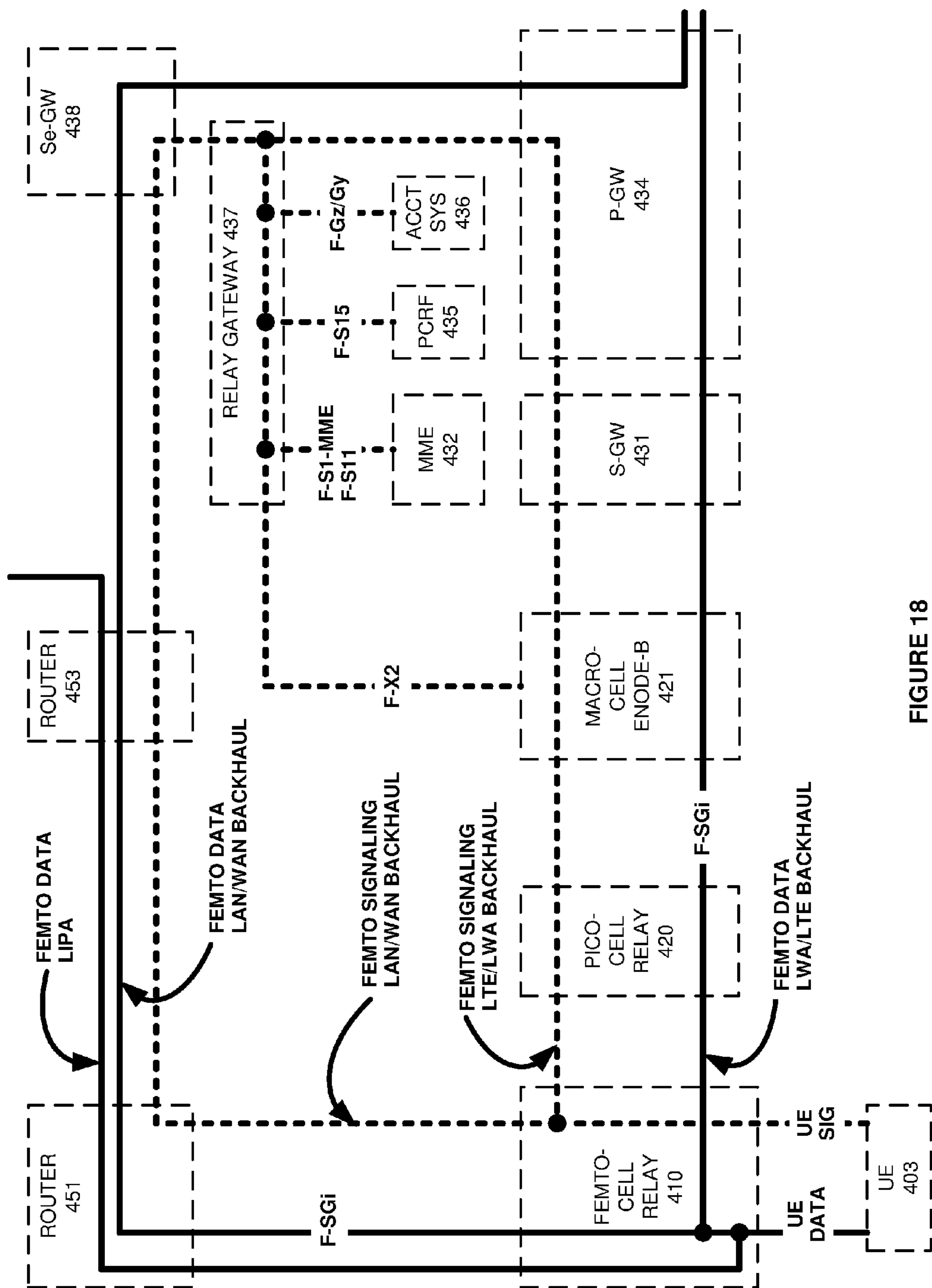
FIGS. 18-28 illustrate a variant of the LTE data communication system that uses SGi tunnels between Local Packet Data Network Gateways (L-PGWs) in the relays and macro P-GWs.

FIGS. 18-28 illustrate a variant of LTE data communication system 400 that uses SGi tunnels between L-PGWs in relays 410 and 420 and macro P-GW 434. Referring to FIG. 18, UE 403 has a UE data bearer and a UE signaling bearer with femtocell relay 410. The L-SGW in femtocell relay 410 may exchange some of the UE data with the Internet over routers 451 and 453 in a LIPA data service. The L-SGW in femtocell relay 410 may exchange some of the UE data with P-GW 434 over an SGi tunnel through picocell relay 420, eNodeB 421, and S-GW 431. The L-SGW in femtocell relay 410 may also exchange some of the UE data with P-GW 434 over an SGi tunnel through router 451, router 453, and Se-GW 438.

Femtocell relay 410 terminates the UE signaling and transfers Non-Access Stratum (NAS) messages between UE 403 and MME 432 in its own LTE Femtocell (F) signaling. Femtocell relay 410 may exchange its F-signaling with R-GW 437 in a signaling tunnel through picocell relay 420, eNodeB 421, S-GW 431, and P-GW 434. Femtocell relay 410 may also exchange its F-signaling with R-GW 437 in a signaling tunnel through router 451, router 453, and Se-GW 438. R-GW 437 exchanges the femtocell LTE signaling with eNodeB 421 (F-X2), MME 432 (F-S1-MME and F-S11), PCRF 435 (F-S15), and ACCT 436 (F-Gz/Gy).

Femtocell relay 410 has associated LTE Access Point Names (APNs) to establish its user data and signaling bearers. A femto APN DATA supports the F-SGi user data bearer between the femtocell relay 410 and P-GW 434 through picocell relay 420, eNodeB 421, and S-GW 431. A femto APN SIG supports the signaling tunnel (F-X2, F-S1-MME, F-S11, F-S15, and F-Gz/Gy) between femtocell relay 410 and R-GW 437 through picocell relay 420, eNodeB 421, S-GW 431, and P-GW 434. R-GW 437 supports the femto SIG APN by exchanging LTE signaling with eNodeB 421 (F-X2), MME 432 (F-S1-MME and F-S11), PCRF 435 (F-S15), and ACCT 436 (F-Gz/Gy).

Figure 19:
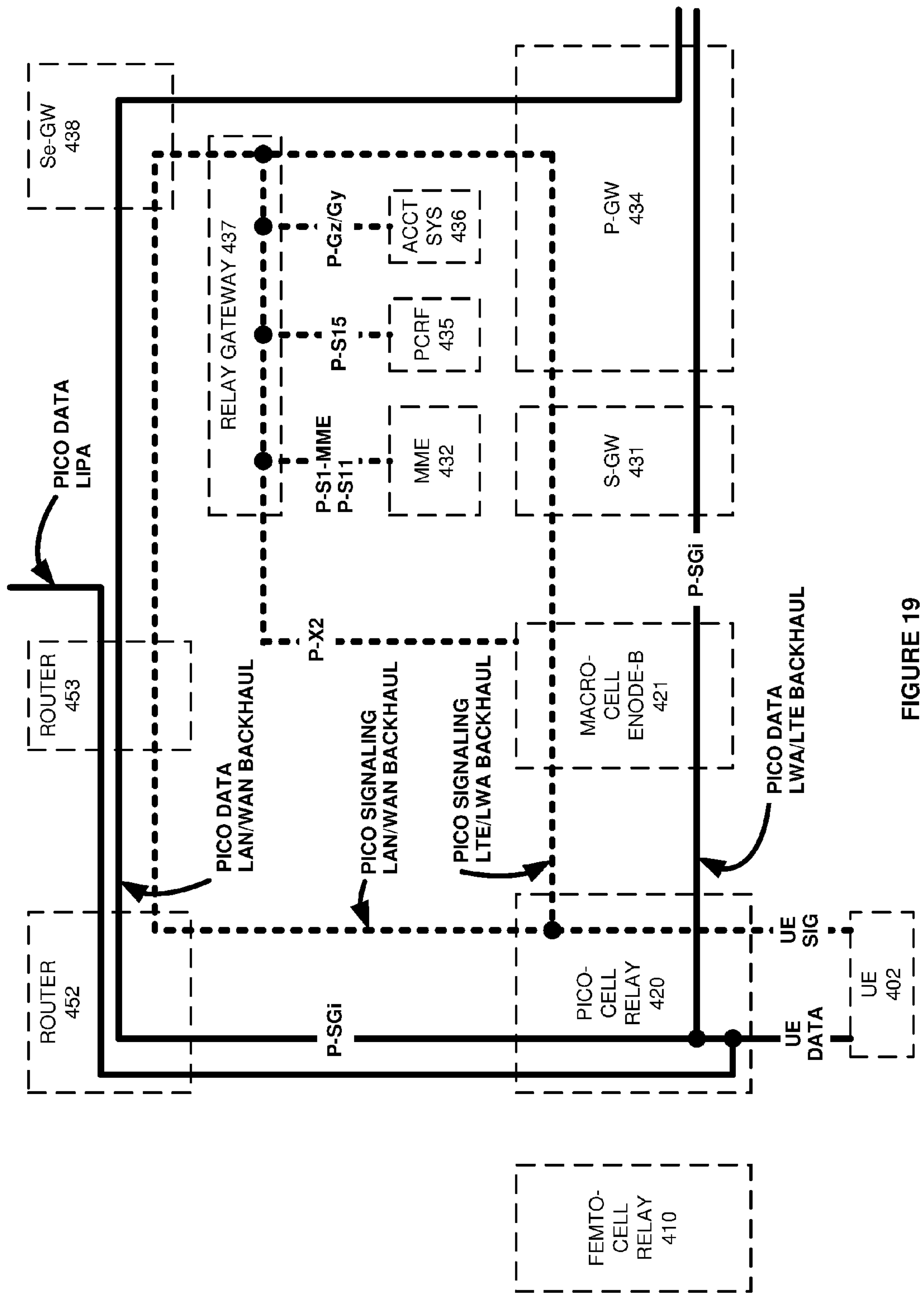

Referring to FIG. 19, UE 402 has a UE data bearer and a UE signaling bearer with picocell relay 420. The L-SGW in picocell relay 420 may exchange some of the UE data with the Internet over routers 452-453 in a LIPA data service. The L-SGW in picocell relay 420 may exchange some of the UE data with P-GW 434 over an SGi tunnel through eNodeB 421 and S-GW 431. The L-SGW in picocell relay 420 may also exchange some of the UE data with P-GW 434 over an SGi tunnel through routers 452-453 and Se-GW 438.

Picocell relay 420 terminates the UE signaling and transfers NAS messages between UE 402 and MME 432 in its own LTE Picocell (P) signaling. Picocell relay 420 may exchange its P-signaling with R-GW 437 in a signaling tunnel through eNodeB 421, S-GW 431, and P-GW 434. Picocell relay 420 may also exchange its P-signaling with R-GW 437 in a signaling tunnel through routers 452-453 and Se-GW 438. R-GW 437 exchanges the picocell LTE signaling with eNodeB 421 (P-X2), MME 432 (P-S1-MME and P-S11), PCRF 435 (P-S15), and ACCT 436 (F-Gz/Gy).

Picocell relay 420 has associated LTE APNs to establish its user data and signaling bearers. A pico APN DATA supports the F-SGi user data tunnel between the L-SGW picocell relay 420 and P-GW 434 through eNodeB 421 and S-GW 431. A pico APN SIG supports the signaling tunnel (P-X2, P-S1-MME, P-S11, P-S15, and P-Gz/Gy) between picocell relay 420 and R-GW 437 through eNodeB 421, S-GW 431, and P-GW 434. R-GW 437 supports the pico SIG APN by exchanging picocell LTE signaling with eNodeB 421 (P-X2), MME 432 (P-S1-MME, P-S11), PCRF 435 (P-S15), and ACCT 436 (F-Gz/Gy).

Figure 20:
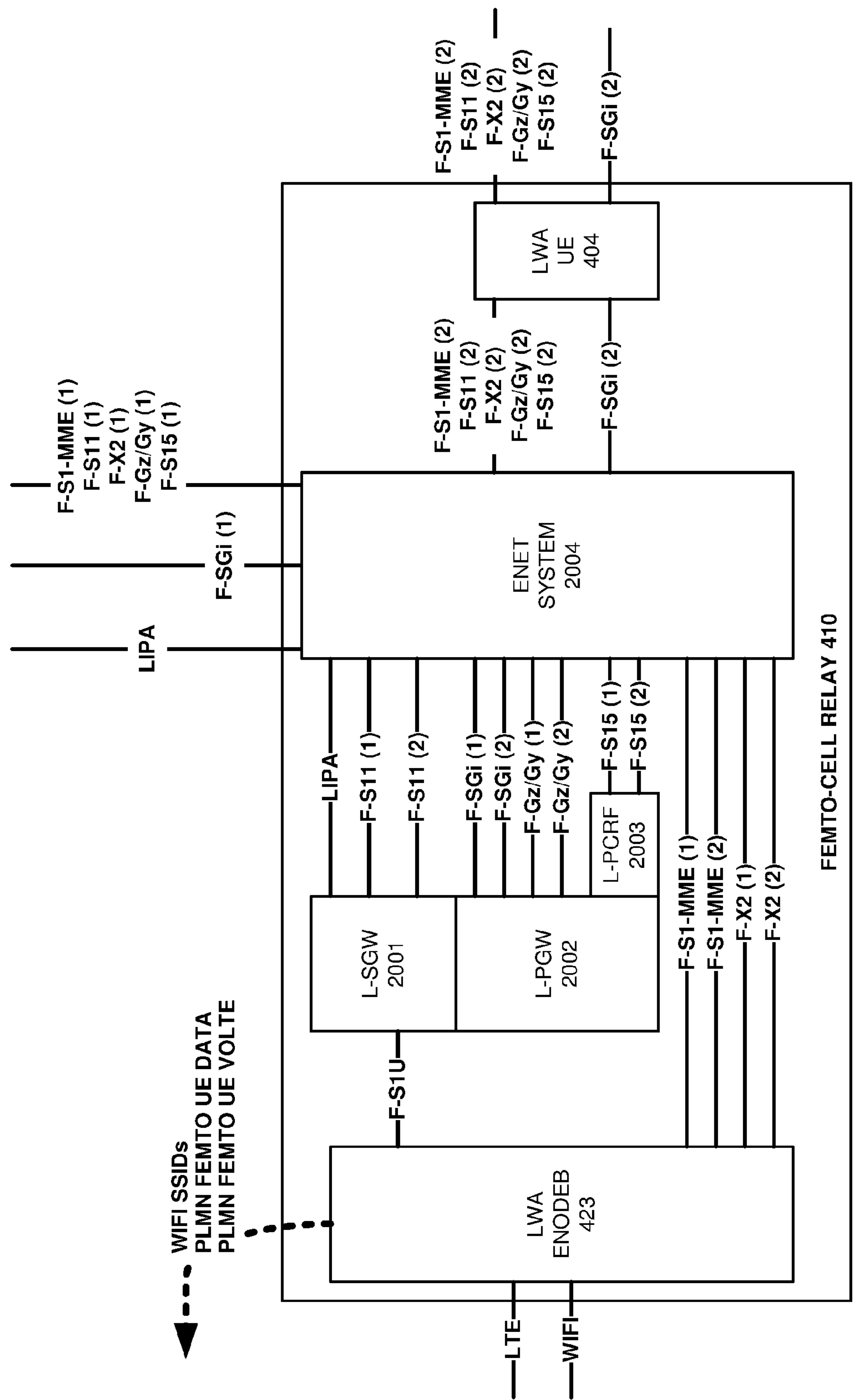

FIG. 20 illustrates femtocell relay 410. Femtocell relay 410 comprises LWA eNodeB 423, L-SGW 2001, Local Packet Data Network Gateway (L-PGW) 2002, Local Policy and Charging Rules Function (L-PCRF) 2003, Ethernet system 2004, and LWA UE 404. LWA eNodeB 423 exposes LTE and WiFi interfaces to UEs and broadcasts WiFi SSIDs and LTE PLMN IDs for FEMTO UE DATA and FEMTO UE VOLTE. LWA eNodeB 423 applies RoHC compression/decompression to the user data exchanged with UEs over the LTE and WiFi links. LWA eNodeB 423 applies general compression/decompression to the LTE signaling exchanged with the UEs over the WiFi and LTE links. LWA UE 404 applies RoHC compression/decompression to the F-SGi user data exchanged over the LWA/LTE links. UE 404 applies general compression/decompression to the LTE signaling exchanged over the LWA/LTE links.

For user data, eNodeB 423 exchanges the user data over the F-S1U with L-SGW 2001. L-SGW 2001 terminates the F-S1U user data from eNodeB 423. L-SGW 2001 performs bridging, formatting, and filtering on the user data. L-SGW 2001 and Ethernet system 2004 may exchange some of the user data with the Internet over the LAN/WAN for the LIPA service. L-SGW 2001 and L-PGW 2002 exchange the other user data. L-PGW 2002 forms an endpoint for SGi data tunnels to macro P-GW 434 and LTE signaling tunnels to R-GW 437. L-PGW 2002 and Ethernet system 2004 exchange some user data over the F-SGi (1) tunnel that traverses the LAN/WAN. L-PGW 2002 and Ethernet system 2004 exchange other user data over the F-SGi (2) tunnel that traverses LWA/LTE.

Advantageously, L-PGW 2002 has multiple backhaul options for its signaling and user data through Ethernet system 2004. Ethernet system 2004 obtains network access over the LAN/WAN. LWA UE 404 obtains network access over LWA/LTE for Ethernet system 2004. Ethernet system 2004 aggregates and routes femtocell signaling and user data Like eNodeB 423, L-SGW 2001, L-PGW 2002, and UE 404, Ethernet system 2004 applies LTE Quality-of-Service (QoS) to its bearers as indicated by the specified LTE QoS Class Identifiers (QCIs).

To translate between LTE and Ethernet QoS, Ethernet system 2004 applies Differentiated Services (DS) to its bearers to match its QoS to the corresponding LTE QCI metrics. Thus, Ethernet system 2004 exchanges LTE signaling using DS Point Codes (DSCPs) that correspond to QCI 5. Ethernet system 2004 exchanges F-SGi user data using DSCPs that correspond to QCI 1, QCI 5, QCI 9, or some other QoS. For VoLTE, L-SGW 2001 maps between QCI 1 (voice) and QCI 5 (signaling) on the F-S1U interface and corresponding DSCPs for voice and signaling in the F-SGi tunnels. The other elements of femtocell relay 410 (423, 2002, 2003, 2004) may also use DSCP in a similar manner for their traffic and QCIs.

For femtocell signaling, eNodeB 423 and Ethernet system 2004 exchange some LTE signaling (F-S1-MME(1) and F-X2(1)) for LAN/WAN backhaul and exchange other signaling (F-S1-MME(2) and F-X2(2)) for LWA/LTE backhaul. L-SGW 2001 and Ethernet system 2004 exchange some LTE signaling (F-S11(1)) for LAN/WAN backhaul and exchange other signaling (F-S11(2)) for LWA/LTE backhaul. Likewise, L-PGW 2003 and Ethernet system 704 exchange some LTE signaling (F-Gz/Gy(1)) for LAN/WAN backhaul and exchange other signaling (F-Gz/Gy(2)) for LWA/LTE backhaul. L-PCRF 2003 and Ethernet system 2004 exchange some LTE signaling (F-S15(1)) for LAN/WAN backhaul and exchange other signaling (F-S15 (2)) for LWA/LTE backhaul.

L-SGW 2001 has a Children's Internet Protection Act (CIPA) filter application to filter user data. Macrocell PCRF 435 has a CIPA pitcher that transfers CIPA filter flags and configuration data to L-PCRF 2003 over the F-S15 links. L-PCRF 2003 transfers the CIPA filter flags and configuration data to the CIPA application in L-SGW 2001. L-SGW 2001 filters the F-S1U user data using in the CIPA filter application as configured by macro PCRF 435.

Figure 21:
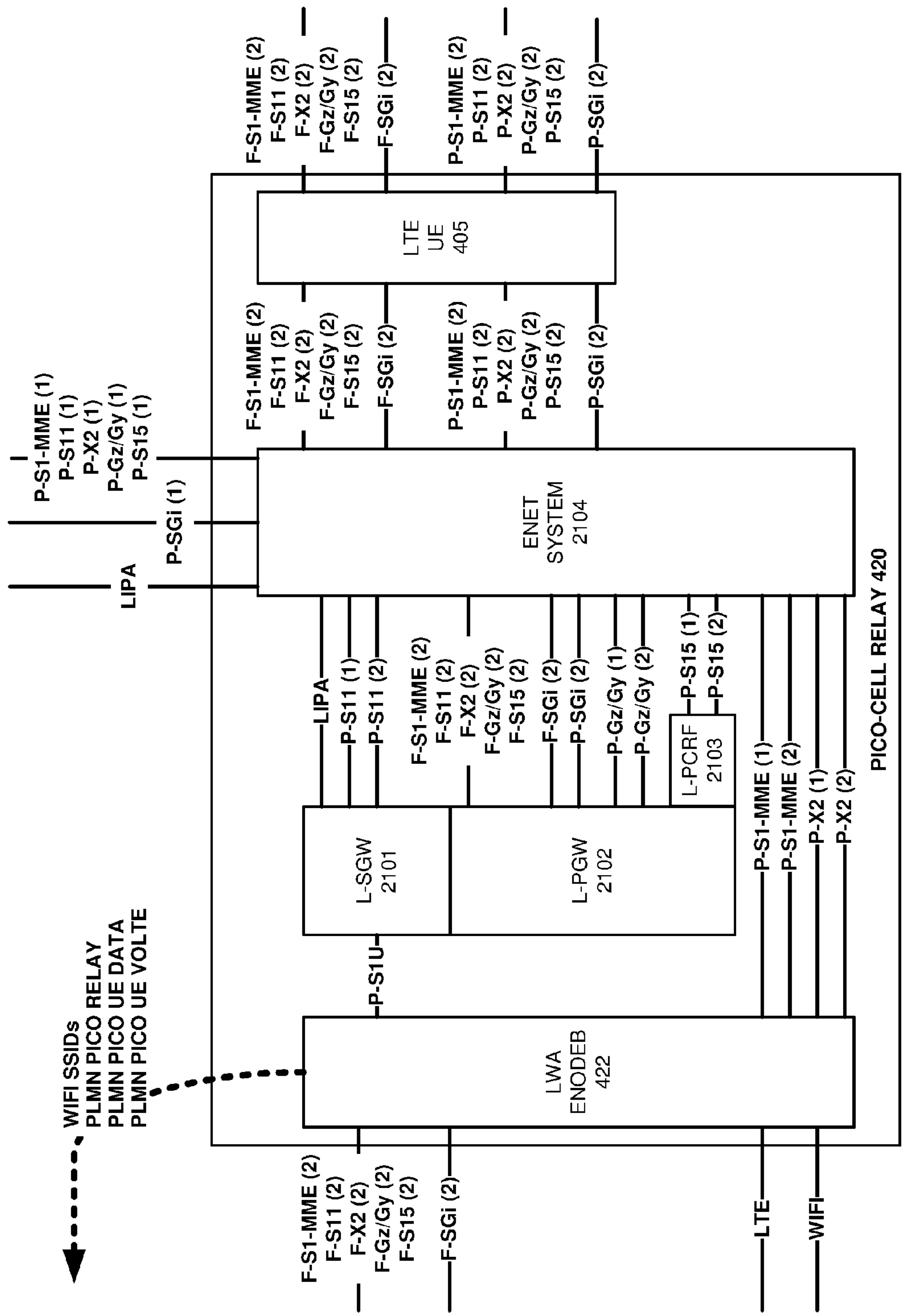

FIG. 21 illustrates picocell relay 420. Picocell relay 420 comprises LWA eNodeB 422, L-SGW 2101, L-PGW 2102, L-PCRF 2103, Ethernet system 2104, and LTE UE 405. LWA eNodeB 422 exposes LTE and WiFi interfaces to UEs and broadcasts WiFi SSIDs and LTE PLMN IDs for PICO RELAY, PICO UE DATA, and PICO UE VOLTE. LWA eNodeB 422 applies RoHC compression/decompression to the user data exchanged over the LTE and WiFi links. LWA eNodeB 422 applies general compression/decompression to the LTE signaling exchanged over the LTE and WiFi links. LTE UE 405 applies RoHC compression/decompression to the P-SGi user data exchanged over the LWA/LTE links. UE 405 applies general compression/decompression to the LTE signaling exchanged over the LWA/LTE links.

For user data, eNodeB 422 exchanges the user data over the P-S1U with L-SGW 2101. L-SGW 2101 terminates the F-S1U user data from eNodeB 422. L-SGW 2101 performs bridging, formatting, and filtering on the user data. L-SGW 2101 and Ethernet system 2104 may exchange some of the user data with the Internet over the LAN/WAN for the LIPA service. L-SGW 2101 and L-PGW 2102 exchange the other user data. L-PGW 2102 forms an endpoint for SGi data tunnels to macro P-GW 434 and LTE signaling tunnels to R-GW 437. L-PGW 2102 and Ethernet system 2104 exchange some user data over the P-SGi (1) tunnel that traverses the LAN/WAN. L-PGW 2102 and Ethernet system 2104 exchange other user data over the P-SGi (2) tunnel that traverses LWA/LTE.

Advantageously, L-PGW 2102 has multiple backhaul options for its signaling and user data through Ethernet system 2104. Ethernet system 2104 obtains network access over the LAN/WAN. LTE UE 405 obtains network access over LTE for Ethernet system 2104. Ethernet system 2104 aggregates and routes femtocell signaling and user data Like eNodeB 422, L-SGW 2101, L-PGW 2102, and UE 405, Ethernet system 2104 applies LTE QoS to its bearers as indicated by the specified LTE QCIs.

To translate between LTE and Ethernet QoS, Ethernet system 2104 applies Differentiated Services (DS) to its bearers to match its QoS to the corresponding LTE QCI metrics. Thus, Ethernet system 2104 exchanges LTE signaling using DSCPs that correspond to QCI 5. Ethernet system 2104 exchanges F-SGi user data using DSCPs that correspond to QCI 1, QCI 5, QCI 9, or some other QoS. For VoLTE, L-SGW 2101 maps between QCI 1 (voice) and QCI 5 (signaling) on the F-S1U interface and corresponding DSCPs for voice and signaling in the F-5/S2a PMIP GRE tunnels. The other elements of picocell relay 420 (423, 2102, 2103, 404) may also use DSCP in a similar manner for their traffic and QCIs.

For picocell signaling, eNodeB 422 and Ethernet system 2104 exchange some LTE signaling (P-S1-MME(1) and P-X2(1)) for LAN/WAN backhaul and exchange other signaling (P-S1-MME(2) and P-X2(2)) for LWA/LTE backhaul. L-SGW 2101 and Ethernet system 2104 exchange some LTE signaling (P-S11(1)) for LAN/WAN backhaul and exchange other signaling (P-S11(2)) for LWA/LTE backhaul. Likewise, L-PGW 2103 and Ethernet system 2104 exchange some LTE signaling (P-Gz/Gy(1)) for LAN/WAN backhaul and exchange other signaling (P-Gz/Gy(2)) for LWA/LTE backhaul. L-PCRF 2103 and Ethernet system 2104 exchange some LTE signaling (P-S15(1)) for LAN/WAN backhaul and exchange other signaling (P-S15 (2)) for LWA/LTE backhaul.

For the femtocell signaling and user data, LWA eNodeB 422 applies RoHC compression/decompression to the user data (F-SGi(2)) that traverses the femtocell's SGi tunnels. LWA eNodeB 422 applies general compression/decompression to the femtocell LTE signaling (F-S1-MME(2), F-X2(2), F-S11(2), F-S15(2), and F-Gz/Gy(2)) that traverses the signaling tunnel. L-SGW/MAG 2101 terminates the P-S1U having picocell user data, femtocell user data, and femtocell signaling. L-SGW 2101, L-PGW 2102, Ethernet system 2104, and LTE UE 405 exchange the femtocell data over the F-SGi tunnels using the requisite QCI/DSCP QoS. L-SGW 2101, L-PGW 2102, Ethernet system 2104, and LTE UE 405 exchange the femtocell signaling over the femto signaling tunnel using the requisite QCI/DSCP QoS.

L-SGW 2101 has a Children's Internet Protection Act (CIPA) filter application to filter user data. Macrocell PCRF 435 has a CIPA pitcher that transfers CIPA filter flags and configuration data to L-PCRF 2103 over the P-S15 links. L-PCRF 2103 transfers the CIPA filter flags and configuration data to the CIPA application in L-SGW 2101. L-SGW 2101 filters the P-S1U user data using in the CIPA filter application as configured by macro PCRF 435.

Figure 22:
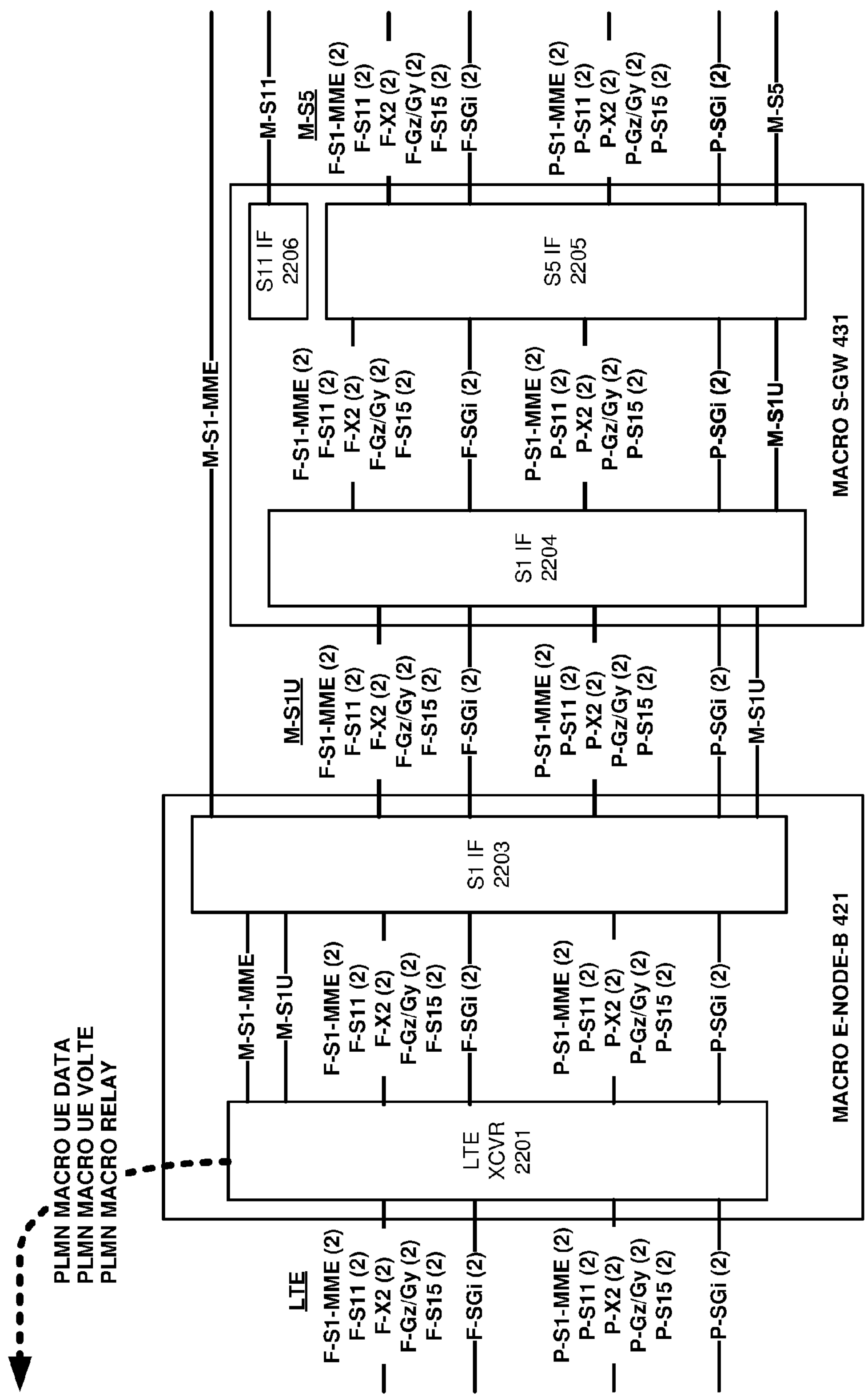

FIG. 22 illustrates macrocell eNodeB 421 and S-GW 431. Macrocell eNodeB 421 comprises LTE transceiver 2201 and S1 interface 2203. S-GW 431 comprises S1 interface 2204, S5 interface 2205, and S11 interface 2206. LTE transceiver 2201 exposes LTE interfaces to UEs, femtocell relays, and picocell relays. LTE transceiver 2201 broadcasts LTE PLMN IDs for MACRO UE DATA, MACRO UE VOLTE, and MACRO RELAY.

For the typical UE, LTE transceiver 2201 exchanges its LTE signaling and user data (M-S1-MME and M-S1U) with S1 interface 2203. For femtocell and picocell relays, LTE transceiver 901 applies RoHC compression/decompression to the user data that traverses F-SGi (2) and P-SGi (2) tunnels. LTE transceiver 2201 applies general compression/decompression to the femtocell and picocell signaling (F-S1-MME(2), F-S11(2), F-X2(2), F-Gz/Gy(2), F-S15(2), P-S1-MME(2), P-S11(2), P-X2(2), P-Gz/Gy(2), and P-S15 (2)) exchanged over the LTE signaling tunnels. LTE transceiver 2201 and S1 interface 2203 exchange the femtocell and picocell signaling and user data.

S1 interface 2203 exchanges macro signaling (M-S1-MME) with MME 432. S1 interface 2203 exchanges user data (M-S1U) with S1 interface 2204 of S-GW 431. The M-S1U interface transports the femtocell and picocell signaling and user data (F-S1-MME(2), F-S11(2), F-X2(2), F-Gz/Gy(2), F-S15(2), P-S1-MME(2), P-S11(2), P-X2(2), P-Gz/Gy(2), P-S15(2), F-S5(2), F-S2a(2), P-S5(2), and P-S2a(2)). S1 interface 2204 exchanges the femtocell and picocell signaling and user data with S5 interface 2205. S5 interface 2205 exchanges user data (M-S5) with P-GW 434. The M-S5 interface transports the femtocell and picocell signaling and user data. S11 interface 906 exchanges macro signaling (M-S11) with MME 432.

Macro eNodeB 421 and S-GW 431 apply LTE QoS to the bearers as indicated by the specified QCIs. Macro eNodeB 421 and S-GW 431 exchange the LTE signaling using QCI 5. Macro eNodeB 421 and S-GW 431 exchange the F-SGi user data using QCI 1, QCI 5, QCI 9, or some other data QCI.

Figure 23:
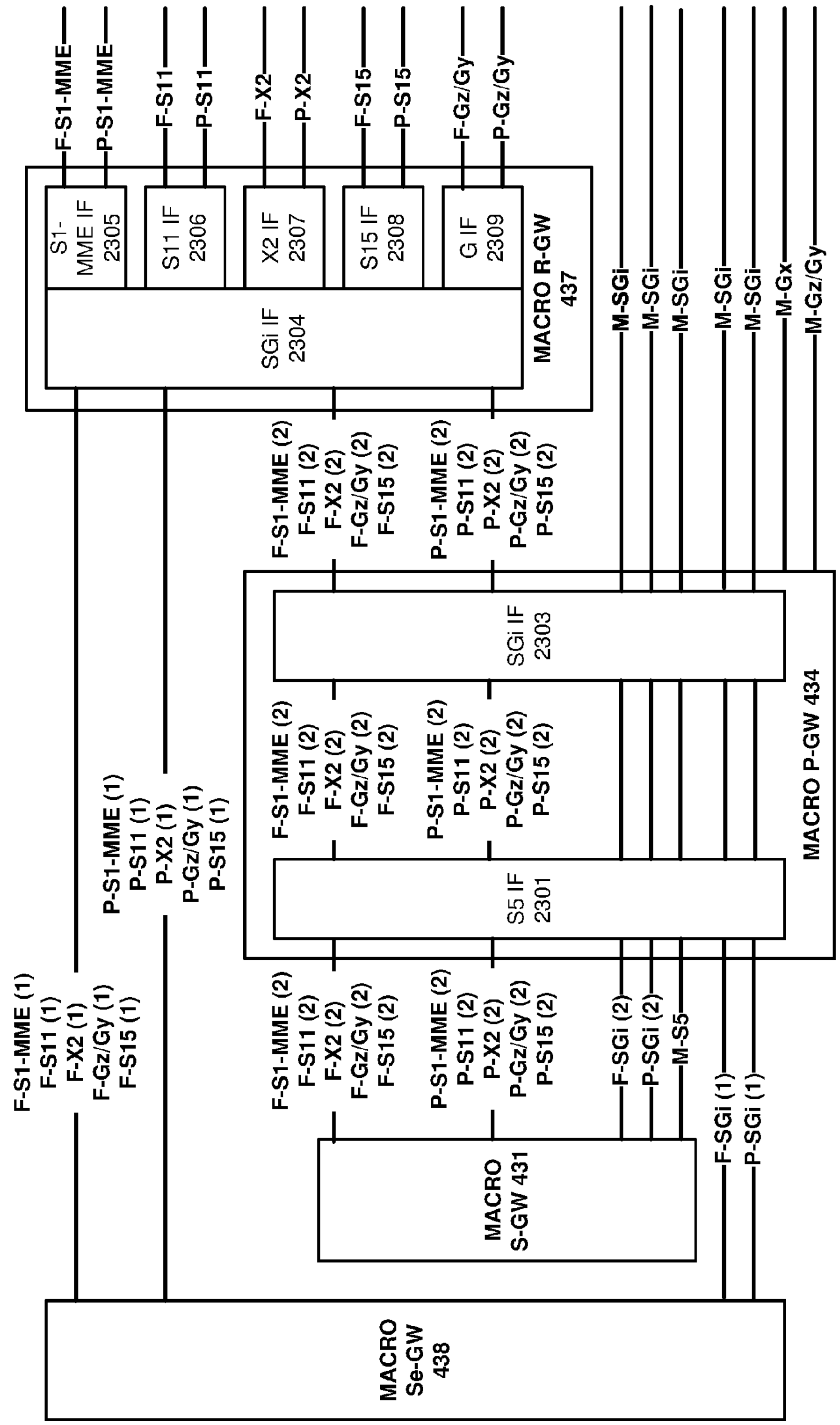

FIG. 23 illustrates macrocell P-GW 434 and R-GW 437. Macro S-GW 431 and Se-GW 438 are shown again for reference. Macrocell P-GW 434 comprises S5 interface 2301 and SGi interface 2303. R-GW 437 comprises SGi interface 2304, S1-MME interface 2305, S11 interface 2306, X2 interface 2307, S15 interface 2308, and G interface 2309. Macrocell P-GW 434 exchanges its M-Gx data with PCRF 435 and exchanges its M-Gz/Gy data with ACCT 436.

In P-GW 434, S5 interface 2301 exchanges the user data (F-SGi (1)(2) and P-SGi(1)(2)) with SGi interface 2303. SGi interface 2303 performs functions like routing and filtering on the user data for exchange with the Internet, IMS, or some other system over the SGi links. S5 interface 2301 exchanges LTE signaling (F-S1-MME(2), F-S11(2), F-X2 (2), F-Gz/Gy(2), F-S15(2), P-S1-MME(2), P-S11(2), P-X2 (2), P-Gz/Gy(2), and P-S15(2)) with SGi interface 2303. SGi interface 2303 exchanges the LTE signaling with SGi interface 2304 in R-GW 437. In R-GW 437, SGi interface 2304 also receives LTE signaling (F-S1-MME(1), F-S11(1), F-X2(1), F-Gz/Gy(1), F-S15(1), P-S1-MME(1), P-S11(2), P-X2(1), P-Gz/Gy(1), and P-S15(1)) from Se-GW 438. SGi interface 2304 performs functions like routing and filtering on the LTE signaling.

SGi interface 2304 exchanges the LTE signaling with proxy interfaces 2305-2309, and proxy interfaces 2305-2309 exchange the LTE signaling with various systems. Proxy interfaces 2305-2309 aggregate the LTE signaling that was exchanged over the LAN/WAN backhaul and over the LWA/LTE backhaul. S1-MME interface 2305 exchanges the F-S1-MME and P-S1-MME signaling with MME 432. S11 interface 2306 exchanges F-S11 and P-S11 signaling with MME 432. X2 interface 2307 exchanges F-X2 and P-X2 signaling with macrocell eNodeB 421. S15 interface 2308 exchanges F-S15 and P-S15 signaling with PCRF 435. G interface 2309 exchanges F-Gz/Gy and P-Gz/Gy signaling with ACCT 436.

Macro P-GW 434 applies LTE QoS to the bearers as indicated by the specified QCIs. Macro P-GW 434 exchanges the LTE signaling using QCI 5. P-GW 434 exchanges the user data using a QCI 1, QCI 5, QCI 9, or some other data QoS. R-GW 437 applies at least a QCI 5 type QoS to its signaling data.

Figure 24:
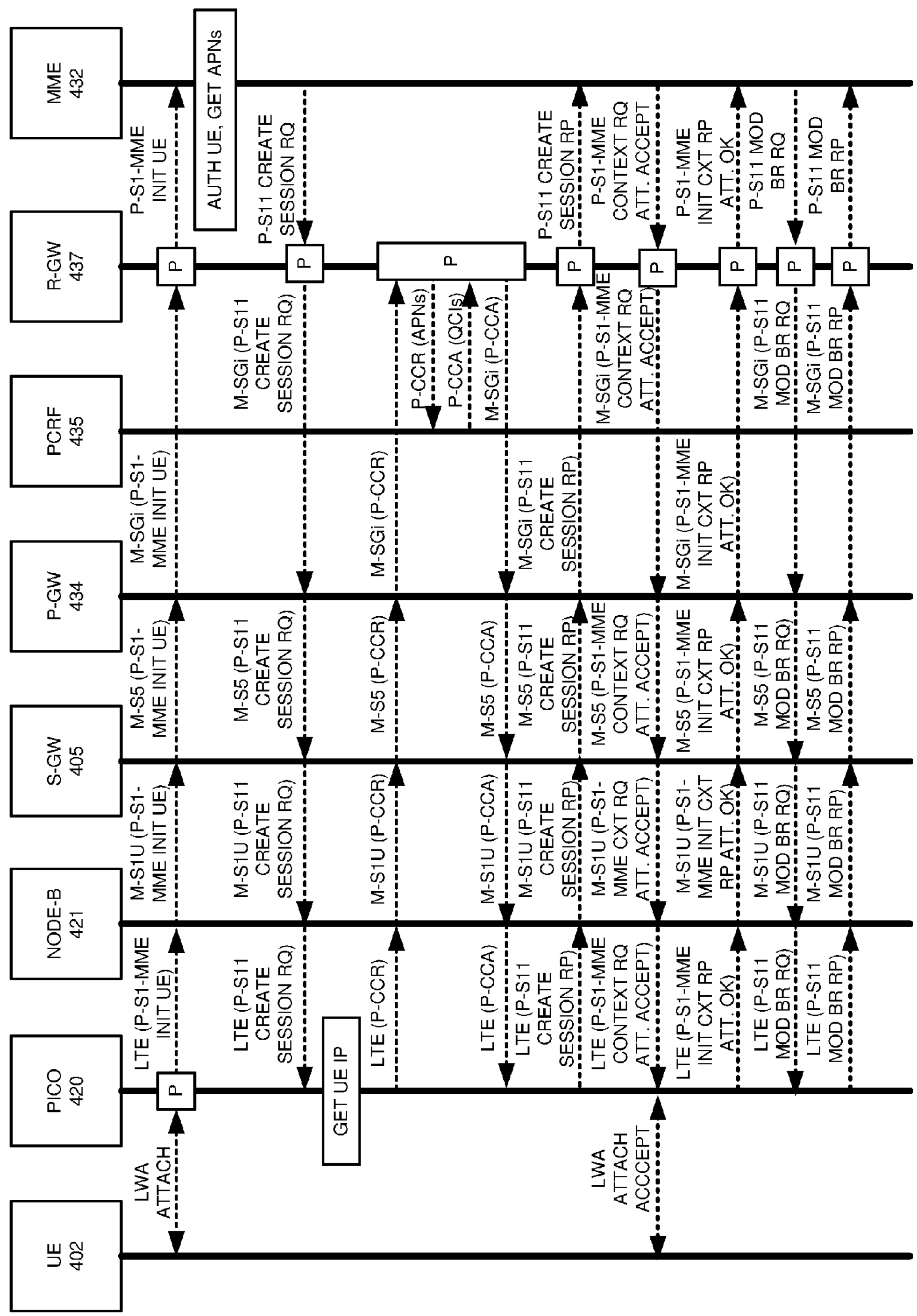

FIG. 24 illustrates UE 402 attachment to picocell 420 to use the P-SGi data bearer. The prior attachment of picocell relay 420 to macrocell eNodeB 421 to establish the P-SGi data bearer is like that shown in FIG. 11 and is omitted for brevity. UE 402 responds to the SSIDs or PLMN IDs of PICO UE DATA and PICO UE VOLTE from picocell relay 420 (eNodeB 422) during an LWA attachment session using LTE or WiFi. UE 402 transfers information for MME 432 in a NAS message during LWA attachment. In response to the UE 402 attachment, picocell relay 420 selects R-GW 437 and transfers a Picocell (P) S1-MME initial UE message containing the NAS message to R-GW 437. The P-S1-MME message uses the signaling bearer that traverses the LTE/S1-MME/S5/SGi interfaces of eNodeB 421, S-GW 431, and P-GW 434. The P-S1-MME initial UE message indicates the IP address for picocell relay 420. R-GW 437 transfers the P-S1-MME initial UE message to MME 432.

MME 432 authorizes UE 402 and retrieves UE APNs DATA and VOLTE from HSS 433. In some examples, additional UE APNs are implemented like VIDEO. MME 432 responds to R-GW 437 with the UE APNs in a P-S11 create session request. R-GW 437 transfers the compressed P-S11 create session request with the UE 402 APNs to picocell relay 420 (L-SGW 2101) over the signaling bearer that traverses the SGi/S5/S1U/LTE interfaces of P-GW 434, S-GW 431, and eNodeB 421.

Responsive to the P-S11 create session request in picocell relay 420, L-SGW 2101 passes an internal P-S5 create session request to L-PGW 2102, and L-PGW 2102 selects IP addresses for UE 402. L-PGW 2102 may subnet one of its own IPv6 addresses or perform Network Address Port Translation (NAPT) on one of its IPv4 addresses. L-PGW 2102 transfers a P-CCR to L-PCRF 2103. The P-CCR indicates the IP address and ID of UE 402 and indicates the IP address of picocell relay 420. L-PCRF 2103 adds QCIs 1, 5, and 9 to serve the UE APN VOLTE and DATA over the picocell LWA access link. Picocell relay 420 (L-PCRF 2103) transfers the P-CCR to R-GW 437 over the signaling bearer that traverses the LTE/S1U/S5/SGi interfaces of eNodeB 421, S-GW 431, and P-GW 434. R-GW 437 transfers the P-CCR to PCRF 435.

PCRF 435 returns a P-CCA to R-GW 437 which transfers the P-CCA to picocell relay 420 (L-PCRF 2103) over the signaling bearer that traverses the SGi/S5/S1U/LTE interfaces of P-GW 434, S-GW 431, and eNodeB 421. The P-CCA indicates the QCI 1, QCI 5, and QCI 9 bearers for the UE APNs over the LWA access link and the picocell data and signaling bearers. In picocell relay 420, L-PCRF 2103 transfers the P-CCA to L-PGW 2002 which transfers a P-S5 create bearer request to L-SGW 2101. In response to the P-S5 create bearer request, picocell relay 420 (L-SGW 2001) transfers a P-S11 create session response to R-GW 437 over the signaling bearer that traverses the LTE/S1U/

S5/SGi interfaces of eNodeB 421, S-GW 431, and P-GW 434. R-GW 437 transfers the P-S11 create session response to MME 432.

In response to the P-S11 create session response for the UE APNs and QCIs, MME 432 returns a P-S1-MME message to R-GW 437. The P-S1-MME message has an initial context request and attach acceptance and indicates the IP addresses, APNs, and QCIs for UE 402. R-GW 437 transfers the P-S1-MME message to picocell relay 420 (eNodeB 422) over the signaling bearer that traverses the SGi/S5/S1U/LTE interfaces of P-GW 434, S-GW 431, and eNodeB 421.

In response to the P-S1-MME message, UE 402 and picocell 420 (eNodeB 422) perform an LWA attach acceptance session over LTE or WiFi that delivers the IP addresses, APNs, and QCIs for UE 402 to UE 402. In response to the UE 402 attach acceptance, picocell relay 420 (eNodeB 422) transfers a P-S1-MME initial context response and attach complete (OK) message to R-GW 437 over the signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 (L-SGW 2101) over the signaling bearer that traverses the SGi/S5/S1U/LTE interfaces through P-GW 434, S-GW 431, and eNodeB 421. Responsive to the P-S11 modify bearer request, picocell relay 420 (L-SGW 2101) transfers a P-S11 modify bearer response to R-GW 437 over the signaling bearer that traverses the LTE/S1U/S5/SGi interfaces of eNodeB 421, S-GW 431, and P-GW 434. R-GW 437 transfers the P-S11 modify bearer response to MME 432.

Although not shown for clarity, UE 402 may exchange user data with picocell relay 420 over LWA based on the specified APNs and QCIs. Picocell relay 420 may exchange the user data with P-GW 434 over the P-SGi data bearer that traverses the LTE/S1U/S5 interfaces of eNodeB 421 and S-GW 431.

Figure 25:
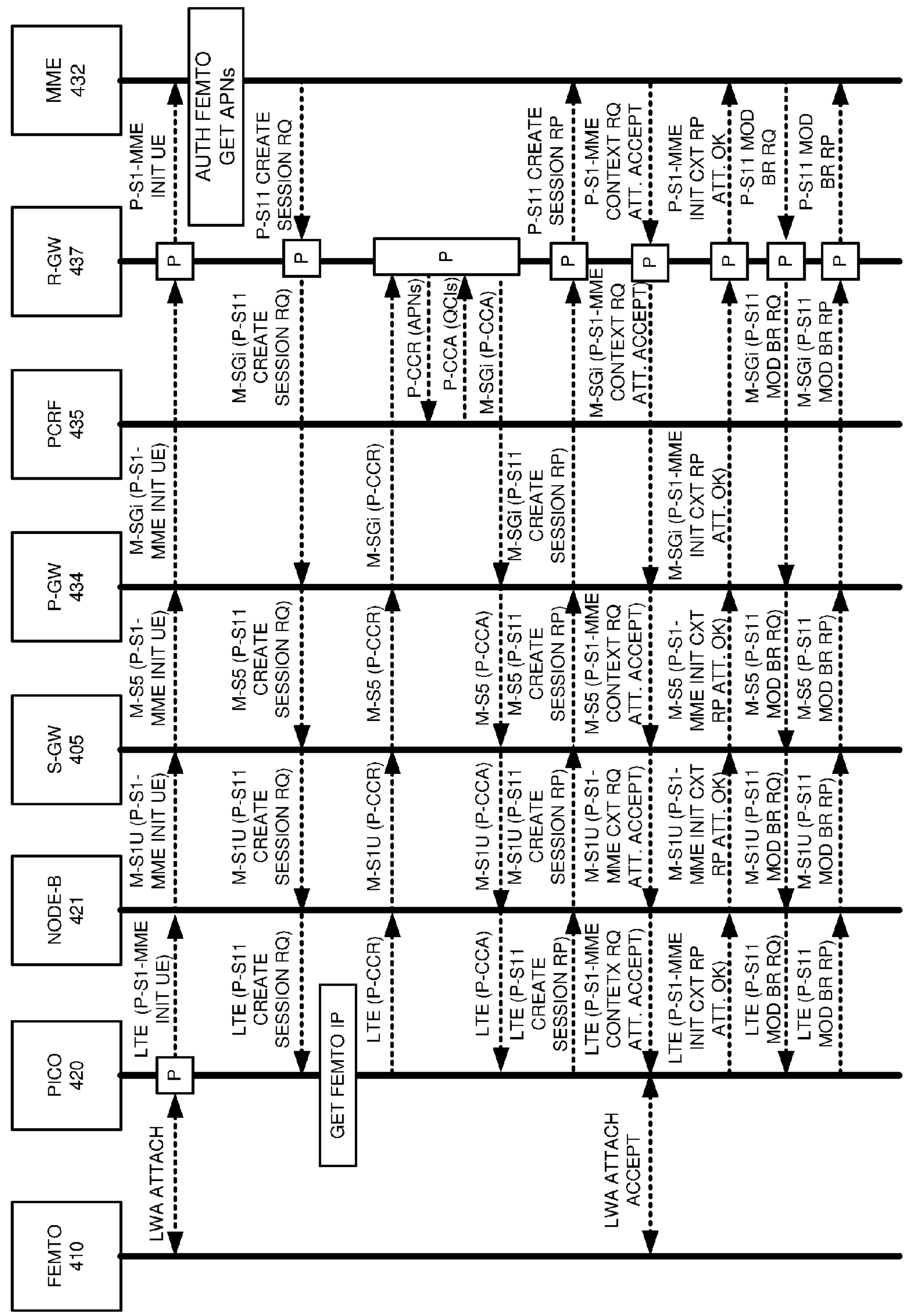

FIG. 25 illustrates femtocell relay 410 attachment to picocell relay 420 to establish the femtocell F-SGi user data bearer and the femtocell signaling bearer. Femtocell relay 410 also attaches to the LAN/WAN and Se-GW 437. These attachments could be standard and are not shown for clarity. Femtocell relay 410 responds to the SSIDs or PLMN IDs of PICO RELAY from picocell relay 420 (eNodeB 422) during an LWA attachment session using LTE or WiFi. Femtocell relay 410 transfers information for MME 432 in a NAS message during LWA attachment. In response to femtocell relay 410 attachment, picocell relay 420 selects R-GW 437 and transfers an P-S1-MME initial UE message containing the NAS message to R-GW 437. The P-S1-MME message uses the signaling bearer that traverses the LTE/S1-MME/S5/SGi interfaces of eNodeB 421, S-GW 431, and P-GW 434. The P-S1-MME initial UE message indicates the IP address for picocell relay 420. R-GW 437 transfers the P-S1-MME initial UE message to MME 432.

MME 432 authorizes femtocell relay 410 and retrieves femtocell APNs for DATA and SIG from HSS 433. MME 432 responds to R-GW 437 with the femtocell APNs in a P-S11 create session request. R-GW 437 transfers the P-S11 create session request with the femtocell APNs to picocell relay 420 (L-SGW 2101) over the signaling bearer that traverses the SGi/S5/S1U/LTE interfaces of P-GW 434, S-GW 431, and eNodeB 421.

Responsive to the P-S11 create session message in picocell relay 420, L-SGW 2101 passes an internal P-S5 create session message to L-PGW 2102 with the femtocell APNs. In response, L-PGW 2102 selects IP addresses for femtocell relay 410. L-PGW 2102 may subnet one of its own IPv6 addresses or NAPT one of its IPv4 addresses. L-PGW 2102 transfers a P-CCR to L-PCRF 2103 indicating the femtocell ID, IP addresses, and APNs. L-PCRF 2003 adds QCIs 5 and 9 to service the femtocell APNs over the picocell LWA access links. The P-CCR also indicates the IP address of picocell relay 420. Picocell relay 420 (L-PCRF 2103) transfers the P-CCR to R-GW 437 over the signaling bearer that traverses the LTE/S1U/S5/SGi interfaces of eNodeB 421, S-GW 431, and P-GW 434. R-GW 437 transfers the P-CCR to PCRF 435. PCRF 435 returns a P-CCA to R-GW 437 that has QCI 9 for data bearer and QCI 5 for the signaling bearer. R-GW 437 transfers the P-CCA to picocell relay 420 (L-PCRF 2003) over the signaling bearer that traverses the SGi/S5/S1U/LTE interfaces of P-GW 434, S-GW 431, and eNodeB 421.

In picocell relay 420, L-PCRF 2103 transfers the P-CCA with the femtocell QCIs to L-PGW 2102 which transfers a P-S5 create session response to L-SGW 2101. In response to the P-S5 create session response, picocell relay 420 (L-SGW 2101) transfers a P-S11 create session response for the femtocell APNs and QCIs to R-GW 437 over the signaling bearer that traverses the LTE/S1U/S5/SGi interfaces of eNodeB 421, S-GW 431, and P-GW 434. R-GW 437 transfers the P-S11 create session response to MME 432. In response to the P-S11 create session response for the femtocell QCIs, MME 432 returns a P-S1-MME message to R-GW 437. The P-S1-MME message has an initial context request and attach acceptance and indicates the IP addresses, APNs, and QCIs for femtocell relay 410. R-GW 437 transfers the P-S1-MME message to picocell relay 420 (eNodeB 422) over the signaling bearer that traverses the SGi/S5/S1U/LTE interfaces of P-GW 434, S-GW 431, and eNodeB 421.

In response to the P-S1-MME message, femtocell relay 410 (UE 404) and picocell 420 relay (eNodeB 422) perform an LWA attach acceptance session over LTE or WiFi that delivers the IP addresses, APNs, and QCIs for femtocell relay 410 to relay 410. In response to the femtocell attach acceptance, picocell relay 420 (eNodeB 422) transfers a P-S1-MME initial context response and attach complete (OK) message to R-GW 437 over the signaling bearer that traverses the LTE/S1U/S5/SGi interfaces of eNodeB 421, S-GW 431, and P-GW 434. R-GW 437 transfers the P-S1-MME initial context response and attach complete to MME 432.

In response to the P-S1-MME initial context response and attach complete, MME 432 transfers a P-S11 modify bearer request to R-GW 437. R-GW 437 transfers the P-S11 modify bearer request to picocell relay 420 (L-SGW 2101) over the signaling bearer that traverses the SGi/S5/S1U/LTE interfaces through P-GW 434, S-GW 431, and eNodeB 421. Responsive to the P-S11 modify bearer request, picocell relay 420 (L-SGW 2101) transfers a P-S11 modify bearer response to R-GW 437 over the signaling bearer that traverses the LTE/S1U/S5/SGi interfaces of eNodeB 421, S-GW 431, and P-GW 434. R-GW 437 transfers the P-S11 modify bearer response to MME 432.

Although not shown for clarity, femtocell relay 410 may exchange user data with picocell relay 420 over LWA based on the femtocell APNs and QCIs. Femtocell relay 410 may exchange user data with P-GW 434 over the F-SGi user data bearer that traverses the LWA/LTE/S1U/S5 interfaces of picocell relay 420, eNodeB 421 and S-GW 431. Femtocell relay 410 may exchange LTE signaling with R-GW 437 over the signaling bearer that traverses the LWA/LTE/S1U/S5/SGi interfaces of picocell relay 420, eNodeB 421, S-GW 431, and P-GW.

Figure 26:
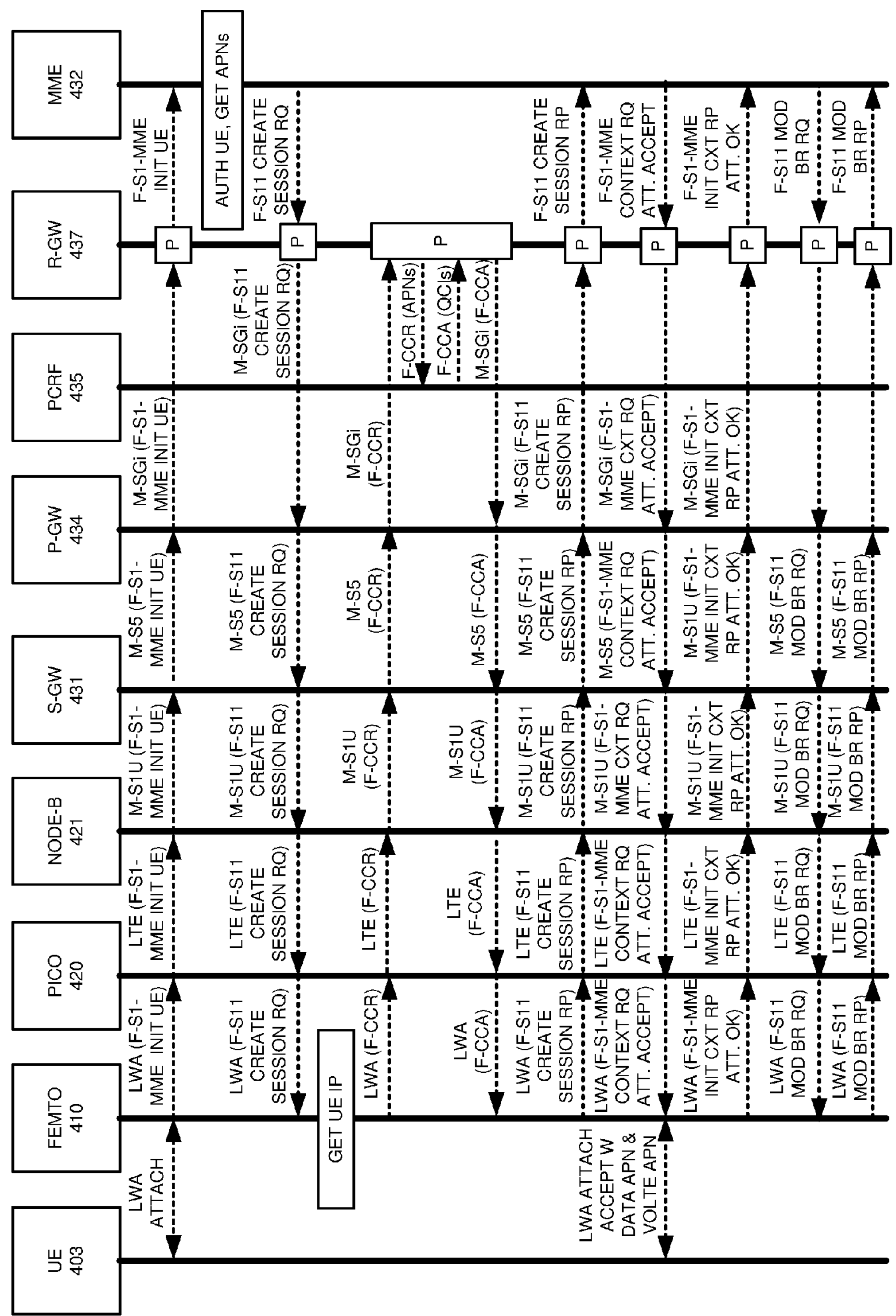

FIG. 26 illustrates UE 403 attachment to femtocell 420 to use the F-SGi user data bearer. UE 403 responds to the SSIDs or PLMN IDs of FEMTO UE DATA and FEMTO UE VOLTE from femtocell relay 410 (eNodeB 423) during an LWA attachment session using LTE or WiFi. UE 403 transfers information for MME 432 in a NAS message during LWA attachment. In response to the UE 402 attachment, femtocell relay 410 selects R-GW 437 and transfers an F-S1-MME initial UE message containing the NAS message to R-GW 437. The F-S1-MME message uses the signaling bearer that traverses the LWA/LTE/S1-MME/S5/SGi interfaces of picocell 420, eNodeB 421, S-GW 431, and P-GW 434. The P-S1-MME initial UE message indicates the IP address for femtocell relay 410. R-GW 437 transfers the P-S1-MME initial UE message to MME 432.

MME 432 authorizes UE 403 and retrieves UE APNs like DATA and VOLTE from HSS 433. In some examples, additional UE APNs are implemented like VIDEO. MME 432 responds to R-GW 437 with the UE APNs in an F-S11 create session request. R-GW 437 transfers the F-S11 create session request with the UE 403 APNs to femtocell relay 410 (L-SGW 2001) over the signaling bearer that traverses the SGi/S5/S1U/LTE/LWA interfaces of P-GW 434, S-GW 431, eNodeB 421, and picocell 420.

Responsive to the F-S11 create session message in femtocell relay 410, L-SGW 2001 passes an internal F-S5 create session message to L-PGW 2002 with the UE APNs DATA and VOLTE. In response, L-PGW 2002 selects IP addresses for UE 403. L-PGW 2002 may subnet one of its IPv6 addresses or NAPT on one of its IPv4 addresses. L-PGW 2002 transfers an F-CCR with the UE ID and UE APNs to L-PCRF 2003. L-PCRF 2003 adds QCIs 9 and 5 to serve the UE APNs over the femtocell LWA access link. The F-CCR also indicates the IP address of femtocell relay 410. Femtocell relay 410 (L-PCRF 2003) transfers the F-CCR to R-GW 437 over the signaling bearer that traverses the LWA/LTE/S1U/S5/SGi interfaces of picocell relay 420, eNodeB 421, S-GW 431, and P-GW 434. R-GW 437 transfers the P-CCR to PCRF 435.

PCRF 435 returns an F-CCA having the UE QCIs 5 and 9 to R-GW 437 which proxies the F-CCA to femtocell relay 410 (L-PCRF 2003) over the signaling bearer that traverses the SGi/S5/S1U/LTE/LWA interfaces of P-GW 434, S-GW 431, eNodeB 421, and picocell relay 420. In femtocell relay 410, L-PCRF 2003 transfers the F-CCA to L-PGW 2002 which transfers an F-S5 create session response to L-SGW 2001, In response to the F-S5 create session response, femtocell relay 410 (L-SGW 2001) transfers an F-S11 create session response to R-GW 437 over the signaling bearer that traverses the LWA/LTE/S1U/S5/SGi interfaces of picocell 420, eNodeB 421, S-GW 431, and P-GW 434. R-GW 437 transfers the F-S11 create session response to MME 432.

In response to the F-S11 create session response with the UE QCIs, MME 432 returns an F-S1-MME message to R-GW 437. The F-S1-MME message has an initial context request and attach acceptance and indicates the IP addresses, APNs, and QCIs for UE 403. R-GW 437 transfers the F-S1-MME message to femtocell relay 410 (eNodeB 423) over the signaling bearer that traverses the SGi/S5/S1U/LTE/LWA interfaces of P-GW 434, S-GW 431, eNodeB 421, and picocell 420.

In response to the P-S1-MME message, UE 403 and femtocell relay 410 (eNodeB 423) perform an LWA attach acceptance session over LTE or WiFi that delivers the IP addresses, APNs, and QCIs for UE 403 to UE 403. In response to the UE 403 attach acceptance, femtocell relay 410 (eNodeB 423) transfers an F-S1-MME initial context response and attach complete (OK) message to R-GW 437 over the signaling bearer that traverses the LWA/LTE/S1U/S5/SGi interfaces of picocell 420, eNodeB 421, S-GW 431, and P-GW 434. R-GW 437 transfers the F-S1-MME initial context response and attach complete to MME 432.

In response to the F-S1-MME initial context response and attach complete, MME 432 transfers an F-S11 modify bearer request to R-GW 437. R-GW 437 transfers the F-S11 modify bearer request to femtocell relay 410 (L-SGW 2001) over the signaling bearer that traverses the SGi/S5/S1U/LTE/LWA interfaces of P-GW 434, S-GW 431, eNodeB 421, and picocell 420. Responsive to the F-S11 modify bearer request, femtocell relay 410 (L-SGW 2001) transfers an F-S11 modify bearer response to R-GW 437 over the signaling bearer that traverses the LWA/LTE/S1U/S5/SGi interfaces of picocell 420, eNodeB 421, S-GW 431, and P-GW 434. R-GW 437 transfers the F-S11 modify bearer response to MME 432.

Although not shown for clarity, UE 403 may exchange user data with femtocell relay 410 over LWA based on the specified APNs and QCIs. Femtocell relay 410 may exchange the user data with P-GW 434 over the F-SGi data bearer that traverses the LWA/LTE/S1U/S5 interfaces of picocell 420, eNodeB 421, and S-GW 431.

Figure 27:
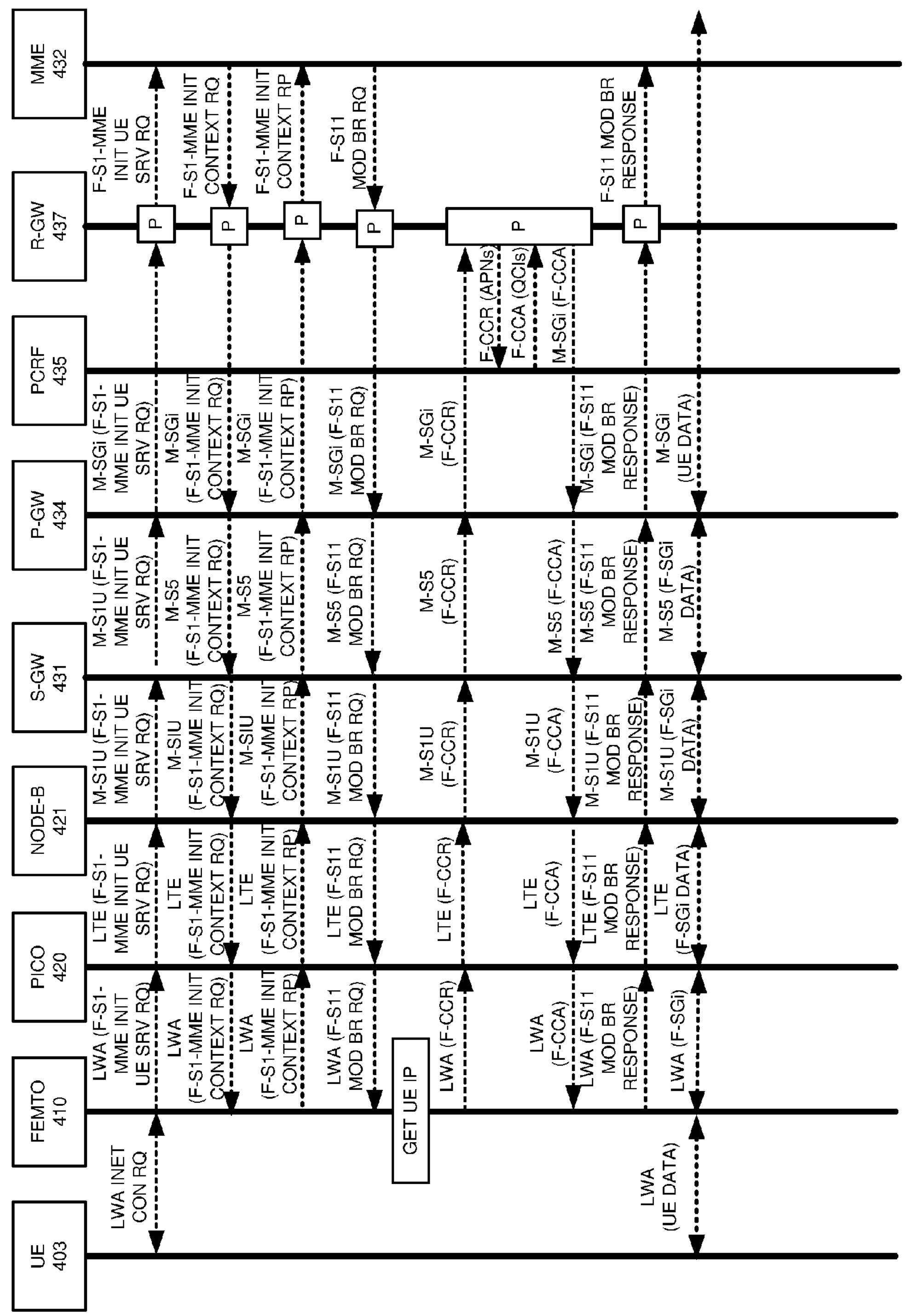

FIG. 27 illustrates Internet service from femtocell relay 420. UE 403 transfers an LWA internet connection request to femtocell relay 410 (eNodeB 423). In response to the LWA internet connection request, femtocell relay 410 transfers an F-S1-MME initial UE service request containing a NAS message with the internet request to R-GW 437. The F-S1-MME message uses the femtocell signaling bearer that traverses the LWA/LTE/S1U/S5/SGi interfaces of picocell relay 420, eNodeB 421, S-GW 431, and P-GW 434. R-GW 437 transfers the F-S1-MME initial UE service request to MME 432.

In response to the F-S1-MME initial UE service request with the internet request, MME 432 returns an F-S1-MME initial context request to R-GW 437. R-GW 437 transfers the F-S1-MME initial context request to femtocell relay 410 (eNodeB 423) over the femtocell signaling bearer that traverses the SGi/S5/S1U/LTE/LWA interfaces of P-GW 434, S-GW 431, eNodeB 421, and picocell relay 420.

In response to the F-S1-MME initial context request, femtocell relay 410 (eNodeB 423) returns an F-S1-MME initial context response to R-GW 437 over the femtocell signaling bearer that traverses the LWA/LTE/S1U/S5/M-SGi interfaces of picocell relay 420, eNodeB 421, S-GW 431, and P-GW 434. R-GW 437 transfers the F-S1-MME initial context response to MME 432. In response to the F-S1-MME initial context response, MME 432 transfers an F-S11 modify bearer request to R-GW 437. R-GW 437 proxies the F-S11 modify bearer request to femtocell relay 410 (L-SGW 2001) over the femtocell signaling bearer that traverses the SGi/S5/S1U/LTE/LWA interfaces of P-GW 434, S-GW 431, eNodeB 421, and picocell relay 420.

Responsive to the F-S11 modify bearer request in femtocell relay 410, L-SGW 2001 passes an internal F-S5 modify bearer request to L-PGW 2002, and L-PGW 2002 selects IP addresses for UE 403. L-PGW 2002 may subnet one of its own IPv6 addresses or NAPT one of its IPv4 addresses. L-PGW 2002 transfers an F-CCR to L-PCRF 2003 with the UE APN DATA and the IP address of the signaling bearer for femtocell relay 410. L-PCRF 2003 adds QCI 9 (or another QCI based on the service request) for the femtocell LWA access link. Femtocell relay 410 (L-PCRF 2003) transfers the F-CCR to R-GW 437 over the signaling bearer that traverses the LWA/LTE/S1U/S5/SGi interfaces of picocell relay 420, eNodeB 421, S-GW 431, and P-GW 434. R-GW 437 transfers the F-CCR to PCRF 435.

PCRF 435 returns an F-CCA to R-GW 437 with QCI 9 for the F-SGi data bearer for UE 403. R-GW 437 transfers the F-CCA to femtocell relay 410 (L-PCRF 2003) over the signaling bearer that traverses the SGi/S5/S1U/LTE/LWA interfaces of P-GW 434, S-GW 431, eNodeB 421, and picocell relay 420. In femtocell relay 410, L-PCRF 2003 transfers the F-CCA to L-PGW 2002 which transfers an F-S5 modify bearer response to L-SGW 2001, In response to the F-S5 modify bearer response, femtocell relay 410 (L-SGW 2001) transfers an F-S11 modify bearer response to R-GW 437 over the signaling bearer that traverses the LWA/LTE/S1U/S5/SGi interfaces of picocell 420, eNodeB 421, S-GW 431, and P-GW 434. R-GW 437 transfers the F-S11 modify bearer response to MME 432.

Although not shown for clarity, UE 403 may exchange user data with femtocell relay 410 over LWA based on the specified DATA APN and QCI 9 or some other QCI as requested. Femtocell relay 410 may exchange the user data with P-GW 434 over the F-SGI data bearer that traverses the LWA/LTE/S1U/S5 interfaces of picocell 420, eNodeB 421, and S-GW 431.

Figure 28:
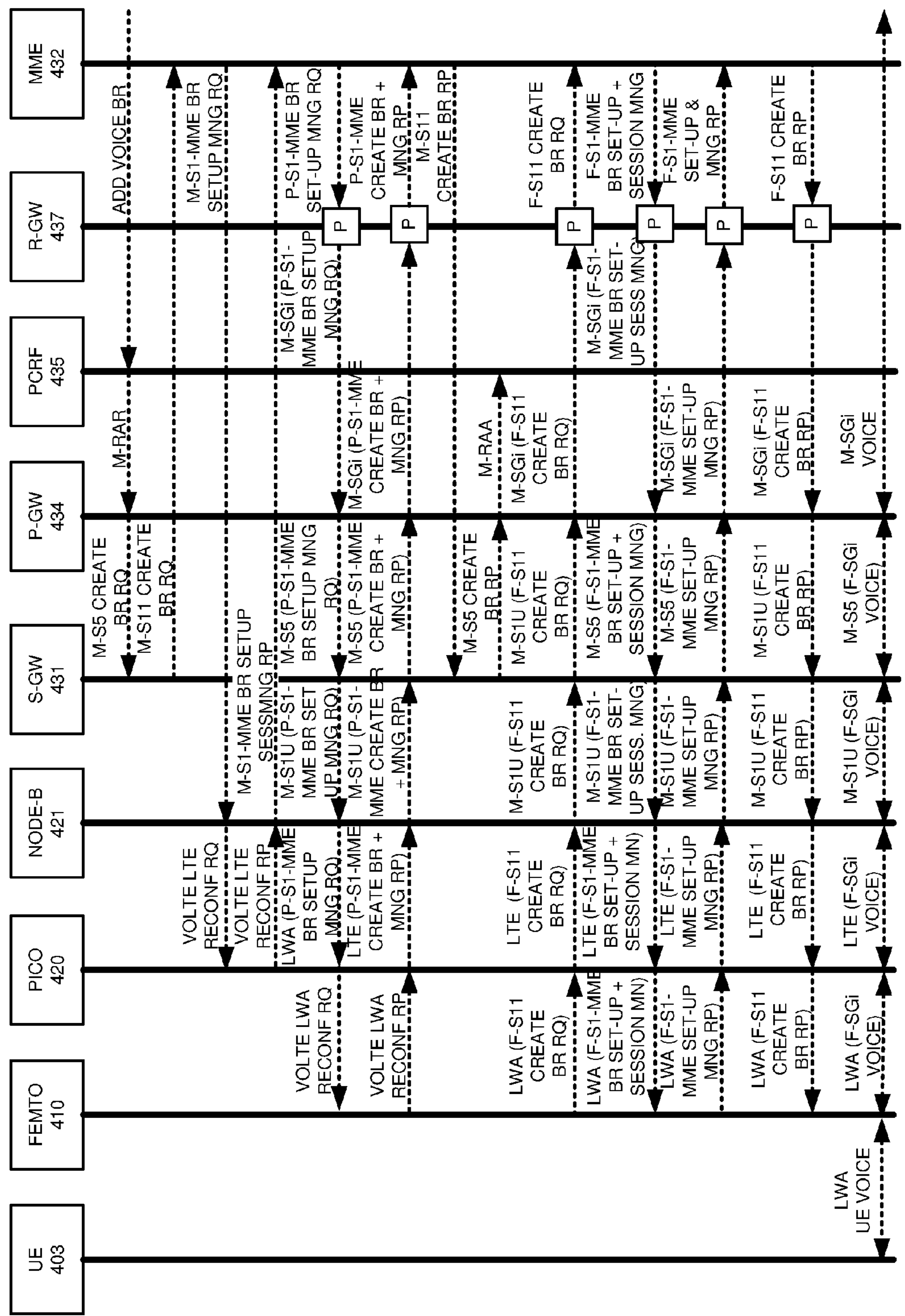

FIG. 28 illustrates UE VoLTE service from femtocell relay 420 for UE 403. Macro PCRF 435 receives an add VoLTE bearer request from IMS for UE 403. In response to the VoLTE bearer request, macro PCRF 435 transfers a Re-Authorization Request (RAR) for VoLTE/QCI 1 to P-GW 434. In response to the RAR, P-GW 434 transfers an M-S5 create bearer request for QCI 1 to S-GW 431 which transfers an M-S11 create bearer request for QCI 1 to MME 432.

In response to the M-S11 create bearer request for QCI 1, MME 432 transfers an M-S1-MME VoLTE create bearer/session management request macrocell eNodeB 421. In response to the M-S1-MME VoLTE bearer set-up/session management request, eNodeB 421 sends an LTE VoLTE reconfiguration request to picocell relay 420 (UE 405) and picocell relay 420 (UE 405) reconfigures itself for QCI 1 on the F-SGi data bearer and responds back to eNodeB 421. Macrocell eNodeB 421 transfers an M-S1-MME create bearer/session management response for VoLTE to MME 432.

Also in response to the M-S11 create bearer request for VoLTE through a picocell, MME 432 transfers a P-S1-MME VoLTE create bearer/session management request to picocell relay 420 (eNodeB 422) over the signaling bearer that traverses the SGi/S5/S1U/LTE/LWA interfaces of R-GW 437, P-GW 434, S-GW 431, and eNodeB 421. In response to the P-S1-MME VoLTE create bearer/session management request, picocell relay 420 (eNodeB 422) sends a VoLTE LWA reconfiguration request to femtocell relay 410 (UE 404) and femtocell relay 410 (UE 404) reconfigures itself for QCI 1 on the F-SGi data bearer and responds back to picocell relay 420 (eNodeB 422). In picocell relay 420, eNodeB 422 transfers a P-S1-MME create bearer/session management response for VoLTE to MME 432 over the signaling bearer that traverses the LTE/S1U/S5/SGi interfaces of picocell relay 420, eNodeB 421, S-GW 431, P-GW 434, and R-GW 437.

In response to the M-S1-MME and the P-S1-MME create bearer/session management responses for VoLTE, MME 432 transfers an M-S11 create bearer response for VoLTE to S-GW 431. S-GW 431 forwards an M-S5 create bearer response to P-GW 434, and P-GW 434 returns an M-RAA to PCRF 435.

In femtocell relay 410 responsive to the VoLTE reconfiguration, UE 404 transfers a VoLTE F-RAR to L-PCRF 2003, and L-PCRF 2003 transfers the F-RAR to L-PGW 2002. In response, L-PGW 2002 transfers an F-S5 add bearer request to L-SGW 2001. In femtocell relay 410, L-SGW 2001 responsively transfers an F-S11 add bearer request to MME 432 over the signaling bearer that traverses the LWA/LTE/S1U/S5/SGi interfaces of picocell relay 420 eNodeB 421, S-GW 431, P-GW 434, and R-GW 437.

In response to the F-S11 create bearer request for the VoLTE, MME 432 transfers an F-S1-MME bearer set-up/session management request for VoLTE to femtocell relay 410 (eNodeB 423). The F-S1-MME bearer set-up/session management request traverses the SGi/S5/S1U/LTE/LWA interfaces of R-GW 437, P-GW 434, S-GW 431, eNodeB 421, and picocell relay 420. In response to the F-S1-MME bearer set-up/session management request for the VoLTE, femtocell relay 410 (eNodeB 423) reconfigures itself and UE 403 for QCI 1 over the LWA access link. Femtocell relay 410 (eNodeB 423) transfers an F-S1-MME bearer set-up/session management response to MME 432 over the signaling bearer that traverses the LWA/LTE/S1U/S5/SGi interfaces of picocell relay 420, eNodeB 421, S-GW 431, P-GW 434, and R-GW 437.

In response to the F-S1-MME bearer set-up/session management response, MME 432 transfers an F-S11 create bearer response to femtocell relay 410 over the SGi/S5/S1U/LTE/LWA interfaces of R-GW 437, P-GW 434, S-GW 431, eNodeB 421, and picocell relay 410. In femtocell relay 410, L-SGW 2001 responsively transfers an F-S5 create bearer response to L-PGW 2002, and L-PGW 2002 transfers an F-RAA to L-PCRF 2003.

UE 403 may now exchange user voice with femtocell relay 410 over LTE or WiFi based on QCI 1. Femtocell relay 410 and the P-GW 434 exchange the user voice over the QCI 1 F-SGi data bearer. P-GW 434 performs formatting and filtering on the user voice data and exchanges the user voice data with external systems.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless relay to serve User Equipment (UE) over a wireless Proxy Mobile Internet Protocol (PMIP) tunnel and a wireline PMIP tunnel, the method comprising:

the wireless relay receiving a wireless network address for use over a wireless network and receiving a wireline network address for use over a wireline network;

the wireless relay receiving a bearer request transferred by a network controller that identifies a gateway network address and an Access Point Name (APN);

the wireless relay selecting one of the wireless network address and the wireline network address responsive to the bearer request, generating a PMIP update that indicates the APN and the selected one of the wireless network address and the wireline network address, and transferring the PMIP update to the gateway network address;

the wireless relay receiving a PMIP response indicating a Quality-of-Service Class Identifier (QCI); and the wireless relay wirelessly exchanging user data with the UE and responsively exchanging the user data for the UE over the wireless PMIP tunnel based on the QCI if the wireless network address was selected and exchanging the user data for the UE over the wireline PMIP tunnel based on the QCI if the wireline network address was selected.

2. The method of claim 1 wherein selecting the wireline network address responsive to the bearer request comprises entering a data structure with a UE ID to select the wireline network address.

3. The method of claim 2 wherein the wireless relay exchanging the user data for the UE over the wireline PMIP tunnel comprises the wireless relay exchanging the user data for the UE over a one of a Data Over Cable System Interface Specification (DOCSIS) link and a Wavelength Data Multiplexing (WDM) link.

4. The method of claim 3 wherein:

the wireless relay wirelessly exchanging the user data with the UE comprises an eNodeB exchanging the user data with the UE; and further comprising the eNodeB and a Local Gateway (L-GW) exchanging the user data over an S1-U link; and wherein the wireless relay exchanging the user data for the UE comprises the L-GW exchanging the user data over the wireline PMIP tunnel.

5. The method of claim 1 wherein:

the APN comprises a voice service APN; and the QCI comprises a voice service QCI.

6. The method of claim 1 wherein:

the APN comprises a video service APN; and the QCI comprises a video service QCI.

7. The method of claim 1 wherein receiving the wireless network address for use over the wireless PMIP tunnel comprises:

the wireless relay receiving a session request with the gateway network address and the APN;

the wireless relay sending a first PMIP message indicating the APN to the gateway network address;

the wireless relay receiving a second PMIP message indicating the wireless network address for use over the wireless PMIP tunnel.

8. The method of claim 1 wherein receiving the wireless network address for use over the wireless PMIP tunnel comprises:

the wireless relay receiving a session request with another gateway address and the APN;

the wireless relay sending a first PMIP message indicating the APN to the other gateway address;

the wireless relay receiving a second PMIP message indicating the wireless network address for use over the wireless PMIP tunnel.

9. The method of claim 1 wherein the wireless relay exchanging the user data for the UE over the wireless PMIP tunnel comprises the wireless relay terminating a General Purpose Radio Service Transfer Protocol (GTP) link and exchanging the user data using Generic Routing Encapsulation (GRE).

10. A wireless relay to serve User Equipment (UE) over a wireless Proxy Mobile Internet Protocol (PMIP) tunnel and a wireline PMIP tunnel, the wireless relay comprising:

a wireless User Equipment (UE) transceiver configured to wirelessly exchange user data with the UE;

a wireless network transceiver configured to exchange the user data with a wireless network;

a wireline network transceiver configured to exchange the user data with a wireline network;

a Local Gateway (L-GW) configured to receive a wireless network address for use over the wireless network and receive a wireline network address for use over the wireline network;

the L-GW configured to receive a bearer request transferred by a network controller that identifies a gateway network address and an Access Point Name (APN) and responsively select one of the wireless network address and the wireline network address responsive to the bearer request;

the L-GW configured to generate a PMIP update that indicates the APN and the selected one of the wireless network address and the wireline network address; and the L-GW configured to process a PMIP response that indicates a Quality-of-Service Class identifier (QCI) to direct the wireless network transceiver to exchange the user data for the UE over the wireless PMIP tunnel based on the QCI if the wireless network address was selected and to direct the wireline network transceiver to exchange the user data for the UE over the wireline PMIP tunnel based on the QCI if the wireline network address was selected.

11. The wireless relay of claim 10 wherein the L-GW is configured to enter a data structure with a UE ID to select the wireline network address.

12. The wireless relay of claim 11 wherein the wireline PMIP tunnel comprises one of a Data Over Cable System Interface Specification (DOCSIS) link and a Wavelength Data Multiplexing (WDM) link.

13. The wireless relay of claim 12 wherein:

the wireless UE transceiver comprises an eNodeB that is configured to exchange the user data with the UE; and the eNodeB and the L-GW are configured to exchange the user data over an S1-U link.

14. The wireless relay of claim 10 wherein:

the APN comprises a voice service APN; and the QCI comprises a voice service QCI.

15. The wireless relay of claim 10 wherein:

the APN comprises a video service APN; and the QCI comprises a video service QCI.

16. The wireless relay of claim 10 wherein:

the L-GW is configured to receive a session request with the gateway network address and the APN;

the L-GW is configured to send a first PMIP message indicating the APN to the gateway network address; and the L-GW is configured to receive a second PMIP message indicating the wireless network address for use over the wireless PMIP tunnel.

17. The wireless relay of claim 10 wherein:

the L-GW is configured to receive a session request with another gateway network address and the APN;

the L-GW is configured to send a first PMIP message indicating the APN to the other gateway network address; and the L-GW is configured to receive a second PMIP message indicating the wireless network address for use over the wireless PMIP tunnel.

18. The wireless relay of claim 10 wherein the L-GW is configured to terminate a General Purpose Radio Service Transfer Protocol (GTP) link and exchange the user data using Generic Routing Encapsulation (GRE).

* * * * *